United States Patent [19]
Shimizu et al.

[11] Patent Number: 5,821,929
[45] Date of Patent: Oct. 13, 1998

[54] IMAGE PROCESSING METHOD AND APPARATUS

[75] Inventors: Takayuki Shimizu, Kawasaki; Yasuo Fukuda, Yokohama, both of Japan

[73] Assignee: Canon Kabushiki Kaisha, Tokyo, Japan

[21] Appl. No.: 562,450

[22] Filed: Nov. 24, 1995

[30] Foreign Application Priority Data

Nov. 30, 1994 [JP] Japan .................................. 6-296674
Dec. 12, 1994 [JP] Japan .................................. 6-307489
Jan. 27, 1995 [JP] Japan .................................. 7-011696
Jan. 31, 1995 [JP] Japan .................................. 7-013789

[51] Int. Cl.⁶ .................................................. G06F 15/00
[52] U.S. Cl. ...................................................... 345/338
[58] Field of Search ................................. 395/141, 142, 395/147; 345/333, 334, 335, 336, 337, 338

[56] References Cited

U.S. PATENT DOCUMENTS 5,454,072 9/1995 Aoyama .................................. 395/146
5,553,217 9/1996 Hart et al. .............................. 395/148

*Primary Examiner*—Phu K. Nguyen
*Attorney, Agent, or Firm*—Fitzpatrick, Cella, Harper & Scinto

[57] ABSTRACT

An image processing apparatus reads a document image, detects a specific character region of the read document image, and performs character recognition on the detected specific character region. A predetermined number of characters in a character string is extracted and recognized. An extracted character string is registered as an index of the read document image.

113 Claims, 51 Drawing Sheets

FIG.9

Important Document

Kannon Corporation

NEW PRODUCT PRESENTATION

Iwao Daibutsu
President

Kannon Corporation

Dear Sirs,
We expect that your corporation is always enjoying business expansion.
We cordially invite you to the new product presentation which will be held
before putting our new products on the market.
Sincerely, Note:

Date : XX,X  8:00a.m.~5:00p.m.
location : Chartered hall, 1-2-3, X City, X Prefecture
(See the map below)

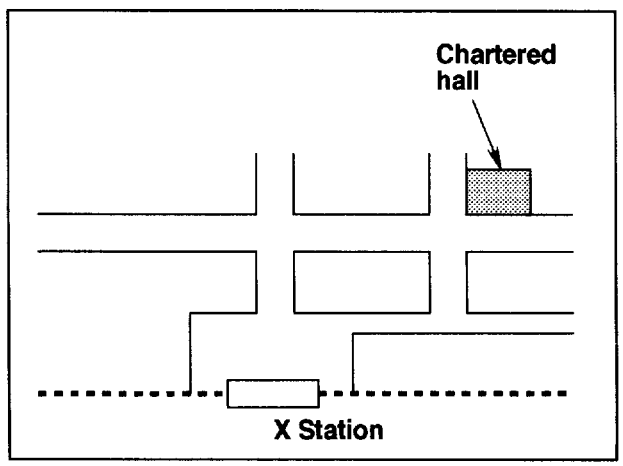

FIG.37

```
CHARACTER REGION1 (LEFT,TOP,RIGHT,BOTTOM,DIRECTION OF SET)
CHARACTER STRING1 (LENGTH OF CHARACTER STRING,CHARACTER1
              (CHARACTER CODE,LEFT,TOP,RIGHT,BOTTOM),
              ····,CHARACTER STRINGn)

•
                         •
                         •

CHARACTER REGIONn (LEFT,TOP,RIGHT,BOTTOM,DIRECTION OF SET)
CHARACTER STRINGn (LENGTH OF CHARACTER STRING,CHARACTER1
              (CHARACTER CODE,LEFT,TOP,RIGHT,BOTTOM),
              ····,CHARACTER STRINGn)
```

FIG.38

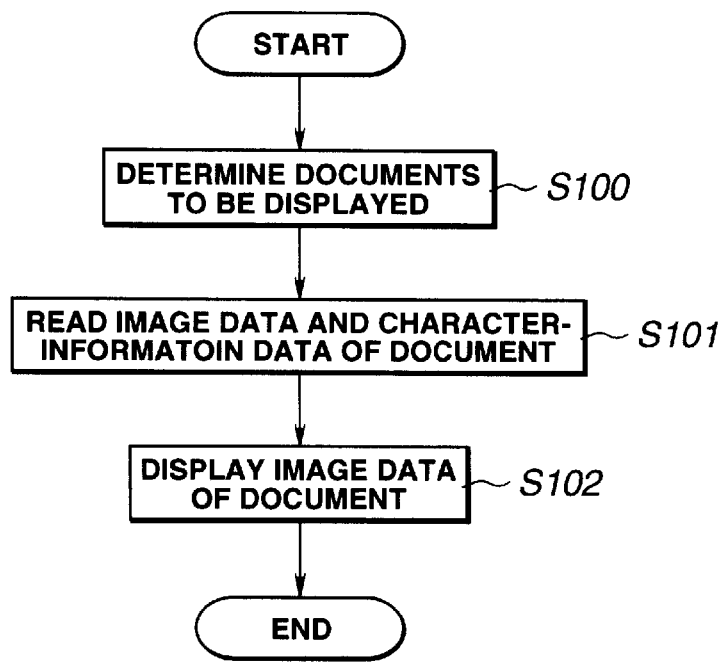

| LINE1 (NUMBER OF LEADING CHARACTER,NUMBER OF FINAL CHARACTER, UPPER POSITION,LOWER POSITOIN) |
|---|
| LINE2 (NUMBER OF LEADING CHARACTER,NUMBER OF FINAL CHARACTER, UPPER POSITION,LOWER POSITOIN) |
| ⋮ |
| LINEn (NUMBER OF LEADING CHARACTER,NUMBER OF FINAL CHARACTER, UPPER POSITION,LOWER POSITOIN) |

| |
|---|
| LINE1 (1,7,top1,bottom1) |
| LINE2 (8,12,top2,bottom2) |
| LINE3 (13,21,top3,bottom3) |
| LINE4 (22,25,top4,bottom4) |

FIG.47

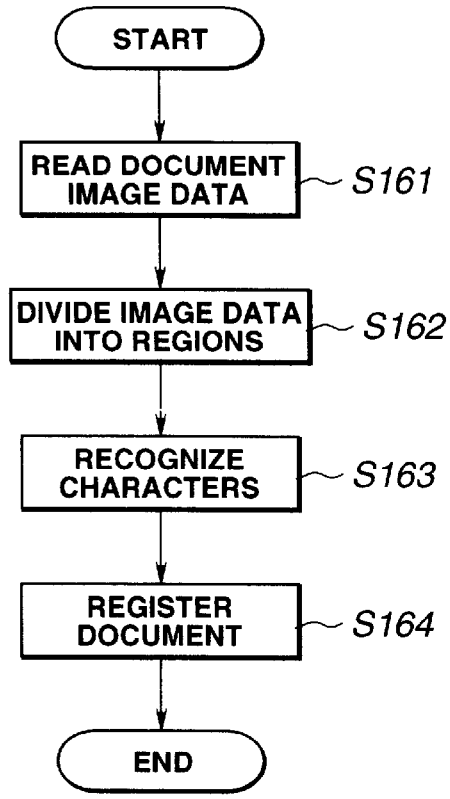

FIG.48

| |
|---|
| CHARACTER REGION1 (HORIZONTAL POSITION, VERTICAL POSITION, WIDTH,HEIGHT),<br>CHARACTER STRING1 (CHARACTER CODES,····,NULL) |
| CHARACTER REGION2 (HORIZONTAL POSITION, VERTICAL POSITION, WIDTH,HEIGHT),<br>CHARACTER STRING2 (CHARACTER CODES,····,NULL) |
| ⋮ |
| CHARACTER REGIONn (HORIZONTAL POSITION, VERTICAL POSITION, WIDTH,HEIGHT),<br>CHARACTER STRINGn (CHARACTER CODES,····,NULL) |

| |
|---|
| CHARACTER1 (CHARACTER CODE,HORIZONTAL POSITION, VERTICAL POSITION,WIDTH,HEIGHT) |
| CHARACTER2 (CHARACTER CODE,HORIZONTAL POSITION, VERTICAL POSITION,WIDTH,HEIGHT) |
| • • • • • |
| CHARACTERn (CHARACTER CODE,HORIZONTAL POSITION, VERTICAL POSITION,WIDTH,HEIGHT) |

IMAGE PROCESSING METHOD AND APPARATUS

BACKGROUND OF THE INVENTION

1. Field of the Invention

This invention relates to an image processing method and apparatus in which characteristic images are determined and stored from input image information.

The invention also relates to an image processing method and apparatus in which image data of a document is stored so as to correspond to document control information, comprising keywords or the like, and retrieval, display, printing or the like of the stored information is performed.

The invention also relates to an image processing method and apparatus in which keywords and a title suitable for input image information can be automatically determined from the input image information.

The invention also relates to an image processing method and apparatus in which keywords and a title suitable for input image information can be automatically extracted from the input image information.

2. Description of the Related Art

Recently, there exist, for example, electronic filing apparatuses, in which image data of a document formed, for example, by reading the document by a scanner or the like is stored so as to correspond to document control information, comprising keywords or the like, and retrieval, display, printing or the like of the stored information is performed. In such a conventional apparatus, however, keywords must be input by a manual operation of an operator when registering a document or an image, so that the operator must use his hand.

Recently, there have been announced, for example, electronic filing apparatuses in which character recognition is performed for image data of a document, and character strings as a result of the recognition are automatically registered as keywords. In such an apparatus, character recognition is performed for the entire document, and, for example, nouns are extracted from character strings obtained as a result of the recognition, and the extracted nouns are registered as keywords. In such an approach, since character recognition is performed for the entire document, much time is required for the character recognition processing. Hence, in some apparatuses, the user assigns an image region which is considered to be suitable for registration of keywords, images included within the region are subjected to character recognition, and character strings as a result of the recognition are registered as keywords. In such an approach, however, the user must perform an operation of assigning a region for character recognition, and therefore registration cannot be automatically performed. In addition, in order to register images, the user cannot leave the apparatus until there remains no region for character recognition.

There have been, for example, electronic filing apparatuses in which a document image input from a scanner or the like is stored so as to correspond to document control information, and retrieval, display, printing or the like is performed for the stored information. In such an apparatus, the name of a document, the number of pages, the date of registration, keywords and the like are used for document control information. However, it is difficult for the user to know the summary of a document from such document control information. Hence, in some apparatuses, a reduced image of a document is formed and registered, the reduced image is displayed in a summary of documents, a list of result of retrieval, or the like, and the operator confirms the registered image from the reduced image.

As shown in FIG. 56, such an electronic filing apparatus includes a document reading unit 2000, a reduced-image forming unit 2001, a document storage unit 2002, and a display control unit 2003. The document reading unit 2000 reads image data of a document read from a scanner device or the like (not shown). The reduced-image forming unit 2001 forms image data reduced to an appropriate size from the image data of the document read by the document reading unit 2000. The document storage unit 2002 stores the image data of the document read by the document reading unit 2000 so as to correspond to the reduced image data of the document formed by the reduced-image forming unit 2001. The display control unit 2003 controls display of the image data of the document and the reduced image data stored in the document storage unit 2002, and displays, for example, a summary of documents using reduced images as shown in FIG. 57.

Recently, there have been developed electronic filing apparatuses in which formed image data of a document is stored so as to correspond to document control information, comprising keywords or the like, and retrieval, display, printing or the like is performed for the stored information. Conventionally, keywords must be input by a manual operation of the user when registering a document. Recently, however, there have been announced apparatuses in which character recognition is performed for image data of a document, character strings resulting from the recognition are automatically registered so as to correspond to the document, and retrieval is performed for all of the registered character strings. In such apparatuses, it is unnecessary to register keywords.

In such an electronic filing apparatus, it is possible not only to perform retrieval for registered character strings of a document, but also to extract a specific character string from among the character strings of the document and to store the extracted character string in a separate file or to copy it to another application. In such a case, the specific character string is selected from among the character strings of the document.

FIG. 58 illustrates an example of such an electronic filing apparatus. The apparatus shown in FIG. 58 includes a document reading unit 3001, a character recognition unit 3002, a document storage unit 3003, an image display unit 3004 comprising a display device (not shown) or the like, a character reading unit 3005, a character display unit 3006 comprising the same display device as the image display unit 3004, or the like, a selected-range assigning unit 3007 comprising a pointing device or the like, and a selected-character acquisition unit 3008.

The document reading unit 3001 reads, for example, image data of a document read from a scanner device or the like, and supplies the character recognition unit 3002 and the document storage unit 3003 with the read image data. The character recognition unit 3002 performs character recognition for the image data supplied from the document reading unit 3001, extracts character strings described in the document, and supplies the document storage unit 3003 with the extracted character strings. The document storage unit 3003 receives the image data of the document and the character strings of the document from the document reading unit 3001 and the character recognition unit 3002, respectively, and stores the received data so as to correspond to other document control information.

The image display unit 3004 reads the image data of the document from the document storage unit 3003, and displays the read image data. The character reading unit 3005 reads the character strings of the document from the document storage unit 3003, and supplies the character display unit 3006 with the read character strings. The character display unit 3006 receives the character strings of the document from the character reading unit 3005, displays the received character strings at predetermined positions, and supplies the selected-character acquisition unit 3008 with the character strings and information relating to positions of the display of the respective character strings. When the operator has selected a specific character string, the character display unit 3006 receives information relating to the position of a selected range from the selected-range assigning unit 3007, and performs reversal display of the selected range.

The selected-range assigning unit 3007 supplies the character display unit 3006 and the selected-character acquisition unit 3008 with information relatine to the position of the selected range assigned by the operator on the display surface of the character display unit 3006. The selected-character acquisition unit 3008 receives information relating to the positions of display of the character strings and respective characters of the document from the character display unit 3006, receives information relating to the position of the selected range from the selected-range assigning unit 3007, and acquires character strings within the selected range from the character strings of the document.

FIG. 59 illustrates an example of a display picture surface of a document in such an electronic filing apparatus. As shown in FIG. 59, image data of a document is displayed by the image display unit 3004 at a position 4001, character strings of the document are displayed by the character display unit 3006 at a position 4002, and a character string within a range 4003 is selected by the selected-range assigning unit 3007.

However, in the above-described conventional electronic filing apparatus, a reduced image of a document permits the user to recognize an outline of the document and the layout of the entire document, the user cannot recognize characters in the document. Accordingly, it is very difficult to identify, for example, a document from among documents having similar layouts, or a document having a less characteristic layout because it does not have large characters and drawings.

Furthermore, in the conventional electronic filing apparatus shown in FIG. 58, when selecting a specific character string from among character strings of a document, the selection must be performed on the character display unit 3006 for displaying the character strings of the document. Usually, in the electronic filing apparatus, the operator must first confirm the contents of the document on the image display unit 3004 for displaying image data of the document, and then confirm a character string to be selected also on the image display unit 3004. Hence, when selecting a character string, it is necessary to confirm the contents of the document and the character string to be selected on the image display unit 3004, and to search and select again the character string to be selected by displaying character strings of the document on the character display unit 3006, thereby causing a troublesome character selection operation.

SUMMARY OF THE INVENTION

According to the present invention, regions appropriate for performing character recognition used as indices or the like provided for an input image are automatically extracted. Hence, provision of indices can be automatized without assignment of regions for character recognition by the user.

According to the present invention, words having high frequencies of appearance are selected from an input image as keywords provided for the input image. Hence, keywords can be selected with high accuracy without a manual operation of a keyboard by the user.

According to the present invention, character recognition is performed after selecting image regions having patterns of words to be registered as keywords. Hence, it is unnecessary to perform character recognition of unnecessary character regions, and therefore it is possible to shorten the time required for recognition processing until keywords are selected.

According to the present invention, words of a specific part of speech are selected as objects for keyword selection processing. Hence, it is possible to shorten the time required for selection processing, and to automatize selection of words suitable as keywords.

According to the present invention, words to be stored together with an image input from a scanner are extracted from the input image. Hence, an operation using a keyboard becomes unnecessary, thereby improving operability.

According to the present invention, keywords are generated by extracting character strings having a large character size by paying attention to the sizes of characters present in image information to be registered in a data base. Hence, processing of registered images in the data base while providing the images with keywords can be automatized.

According to the present invention, characters used as keywords are selected according to a reference size determined from the sizes of characters recognized from image information. Hence, it is possible to select characters suitable for an input image as keywords.

According to the present invention, characters selected according to the size of the characters are recognized and registered as keywords. Hence, registration of keywords suitable for retrieval can be automatized.

According to the present invention, keywords to be registered are automatically extracted in units of a word. Hence, extraction of meaningful keywords can be automatized.

According to the present invention, even when filing and retrieving images, it is possible to easily identify a document from among documents having similar layouts, or to identify a document having a less characteristic layout on the display of a summary of documents, a list of the result of retrieval, or the like.

According to the present invention, it is possible to appropriately extract and display image data of a character region irrespective of the direction of the set of the character region in an input image.

According to the present invention, it is possible to easily select character strings appropriate for the image of an input document from among character strings of the document.

According to one aspect, the present invention relates to an image processing method, including the steps of inputting a document image, registering related information relating to the input document image so as to correspond to the input document image, reading the registered document image in accordance with assignment of the related information, extracting a specific character region from the document image in accordance with image characteristics of the document image, and using information relating to the extracted character region as the related information.

According to another aspect, the present invention relates to an image processing apparatus, including an image input unit for inputting a document image, an image registration unit for registering related information relating to the input document image so as to correspond to the input document image, an image reading unit for reading the registered document information in accordance with assignment of the related information, and a specific-character-region extraction unit for extracting a specific character region from the document information in accordance with image characteristics of the document image. Information relating to the extracted character region is used as the related information.

According to still another aspect, the present invention relates to an image processing method, including the steps of reading a document image, detecting a specific character region in the read document image, performing character recognition for the image of the detected specific character region, extracting a predetermined character string from among character strings recognized as a result of the character recognition processing, and registering the extracted character string as an index of the read document image.

According to still another aspect, the present invention relates to an image processing apparatus, including a reading unit for reading a document image, a detection unit for detecting a specific character region from the document image read by the reading unit, a recognition unit for performing character recognition for the image of the specific character region detected by the detection unit, an extraction unit for extracting a predetermined number of characters within a character string recognized by the recognition unit, and a registration unit for registering a character string extracted by the extraction unit as an index of the document image read by the reading unit.

According to still another aspect, the present invention relates to an image processing method, including the steps of recognizing characters included in an input image, extracting words from the recognized characters, determining the frequency of appearance of each of the extracted words in the input image, and registering a word having a high frequency of appearance together with the input image.

According to still another aspect, the present invention relates to an image processing method, including the steps of extracting words having high frequencies of appearance included in an input image, and registering a result of character recognition for the extracted words having high frequencies of appearance together with the input image.

According to still another aspect, the present invention relates to an image processing apparatus, including a recognition unit for recognizing characters included in an input image, a word extraction unit for extracting words from the recognized characters, an appearance-frequency determination unit for determining the frequency of appearance of each of the extracted words in the input image, and a registration unit for registering words having high frequencies of appearance together with the input image.

According to still another aspect, the present invention relates to an image processing apparatus, including a word extraction unit for extracting words having high frequencies of appearance included in an input image, a recognition unit for performing character recognition for the words having high frequencies of appearance extracted by the word extraction unit, and a registration unit for registering a result of the recognition by the recognition unit together with the input image.

According to still another aspect, the present invention relates to an image processing method, including the steps of inputting image information, identifying the size of each character present in the input image information, selecting the images of arbitrary characters in accordance with the identified size, and using the selected character images as keywords to be registered together with the input image information.

According to still another aspect, the present invention relates to an image processing apparatus, including an image input unit for inputting image information, a character-size identification unit for identifying the size of each character present in the input image information input by the image input unit, a character-image selection unit for selecting arbitrary character images in accordance with the size identified by the character-size identification unit, and a keyword determination unit for determining keywords to be registered together with the input image information using the character images selected by the character image selection unit.

According to still another aspect, the present invention relates to an electronic filing method for retrieving a plurality of read documents, including the steps of dividing image data of the read documents into regions, discriminating character regions from among the divided regions, specifying, when a plurality of character regions are present, one character region from among the plurality of character regions, extracting image data having a specific size from the specified character region, storing the extracted image data so as to correspond to the image data of the read document, and outputting the stored image data in accordance with the retrieval.

According to still another aspect, the present invention relates to an electronic filing apparatus for retrieving a plurality of read documents, including a region division unit for dividing image data of the read documents into regions, a character-region discrimination unit for discriminating character regions from among the regions divided by the region division unit, a character-region specification unit for specifying, when a plurality of character regions discriminated by the character-region discrimination unit are present, one character region from among the plurality of character regions, an image-data extraction unit for extracting image data having a specific size from the character region specified by the character-region specification unit, a storage unit for storing the extracted image data so as to correspond to the image data of the read documents, and an output unit for outputting the stored image data in accordance with the retrieval.

The foregoing and other objects, advantages and features of the present invention will become more apparent from the following description of the preferred embodiments taken in conjunction with the accompanying drawings.

BRIEF DESCRIPTION OF THE DRAWINGS

FIG. 9 is a diagram illustrating an input image;

FIG. 37 is a diagram illustrating character-information data which is formed;

FIG. 38 is a flowchart illustrating document display processing in the eighth embodiment;

FIG. 47 is a flowchart illustrating document registration processing in the first modification of the eighth embodiment;

FIG. 48 is a diagram illustrating character-information data comprising region information and a character string of each character region;

DESCRIPTION OF THE PREFERRED EMBODIMENTS

Figure 1:
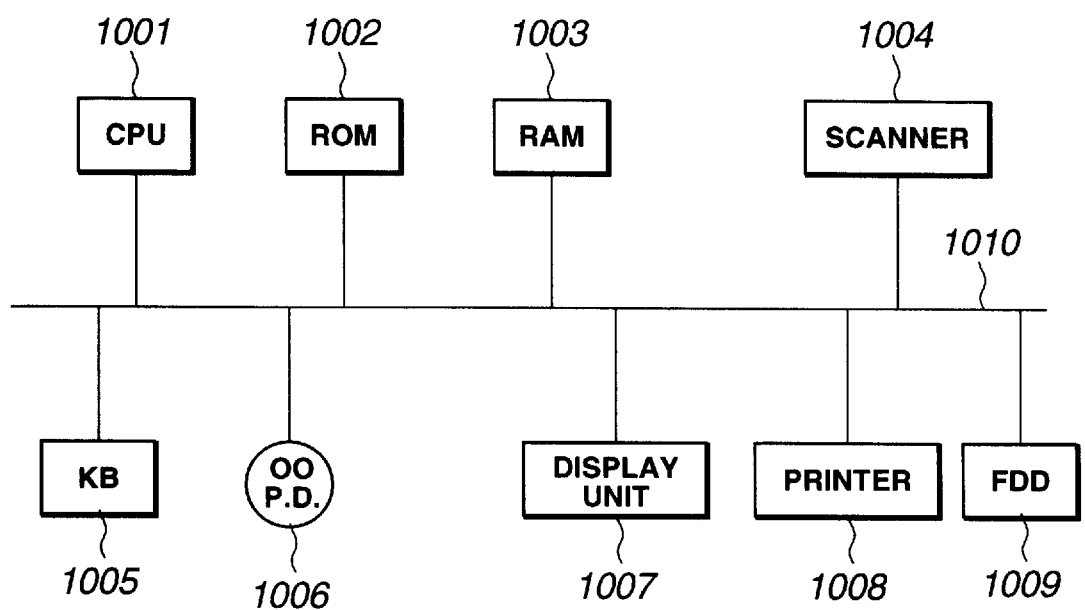
FIG. 1 is a block diagram illustrating the configuration of each apparatus used in embodiments of the present invention.

FIG. 1 is a block diagram illustrating the configuration of the apparatuses used in first through eighth embodiments of the present invention. In FIG. 1, a CPU 1001 executes processing of the entire apparatus, and controls determination and processing in accordance with control programs stored in a ROM (read-only memory) 1002 or a RAM (random access memory) 1003. The ROM 1002 stores control programs for flowcharts to be described in the embodiments, predetermined parameters used for processing, and the like. Dictionaries used for character recognition processing and word separation processing are also stored in the ROM 1002. The RAM 1003 includes a working-memory area for storing data being processed. When control programs used to execute processing in each of the eight embodiments are supplied from a detachable storage medium, such as a FD (floppy disk) or the like, the control programs are stored in the RAM 1003. Data bases formed in the embodiments are also stored in the RAM 1003. A scanner 1004 optically reads an image of an original. Read image data can be stored in the RAM 1003. Various kinds of codes, and instructions of the operator can be input through a keyboard 1005. A pointing device 1006 can indicate a desired position on the display picture surface of a display unit 1007, and can also input an instruction of selection or cancel by clicking a button. The display unit 1007 comprises a CRT (cathode-ray tube) or a liquid-crystal display. A printer 1008 comprises an LBP (laser-beam printer), an ink-jet printer or the like. A floppy-disk drive (FDD) 1009 mounts floppy disks and performs read/write of data. A data bus 1010 exchanges data between these components.

First Embodiment

Figure 2:
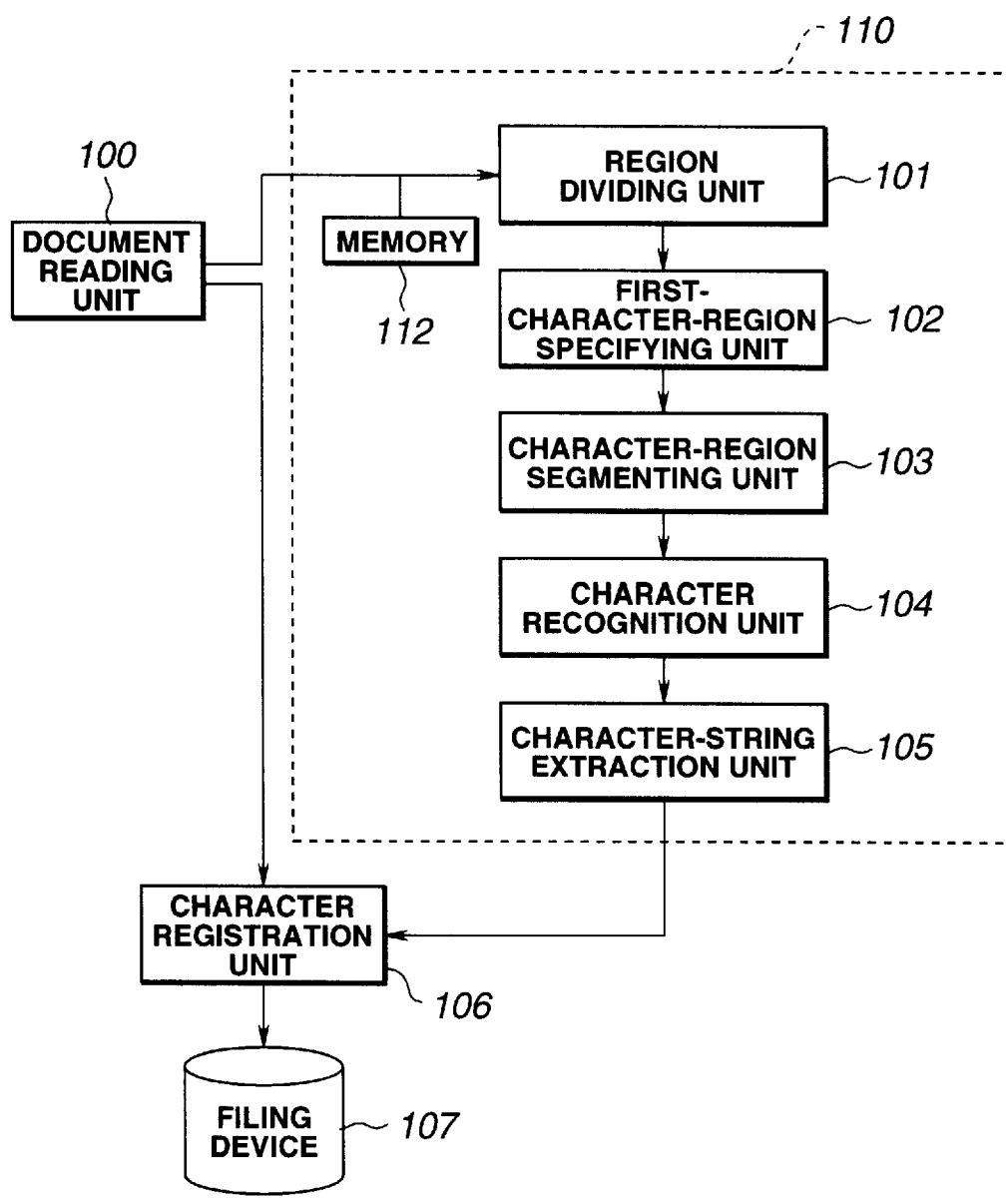
FIG. 2 is a functional block diagram illustrating the configuration of an apparatus according to a first embodiment of the present invention.

FIG. 2 is a functional block diagram illustrating the configuration of an electronic filing apparatus according to a first embodiment of the present invention. This electronic filing apparatus includes a document reading unit 100, a region dividing unit 101, a first-character-region specifying unit 102, a character-region segmenting unit 103, a character recognition unit 104, a character-string extraction unit 105, a character registration unit 106, a filing device 107, and a memory 112. The units 101–105 are included within a processing unit 110. Processing within the processing unit 110 may be performed by the CPU 1001 or by a hardware circuit (not shown).

The document reading unit 100 reads a document using a scanner device or the like, and outputs image data. The output image data is stored in the memory 112. The region dividing unit 101 divides the image data of the document stored in the memory 112 into character regions. The first-character-region specifying unit 102 performs ordering of the divided character regions, and specifies the first character region. The character-region segmenting unit 103 extracts image data of the character region specified by the first-character-region specifying unit 102. The character recognition unit 104 performs character recognition for the image data of the character region extracted by the character-region segmenting unit 103. The character-string extraction unit 105 extracts a first character string having a specific length from among character strings recognized by the character recognition unit 104. The character registration unit 106 registers the image data of the document read by the document reading unit 100 and the character string extracted by the character-string extraction unit 105 in the filing device 107 so as to correspond to each other. The filing device 107 stores document control information, comprising image data, keywords and the like of the document, so as to correspond to each other, and uses, in most cases, data bases. The electronic filing apparatus includes, in addition to the above-described components, various components for realizing functions of retrieval, display, printing and the like for information relating to the document stored in the filing device 107.

Figure 3:
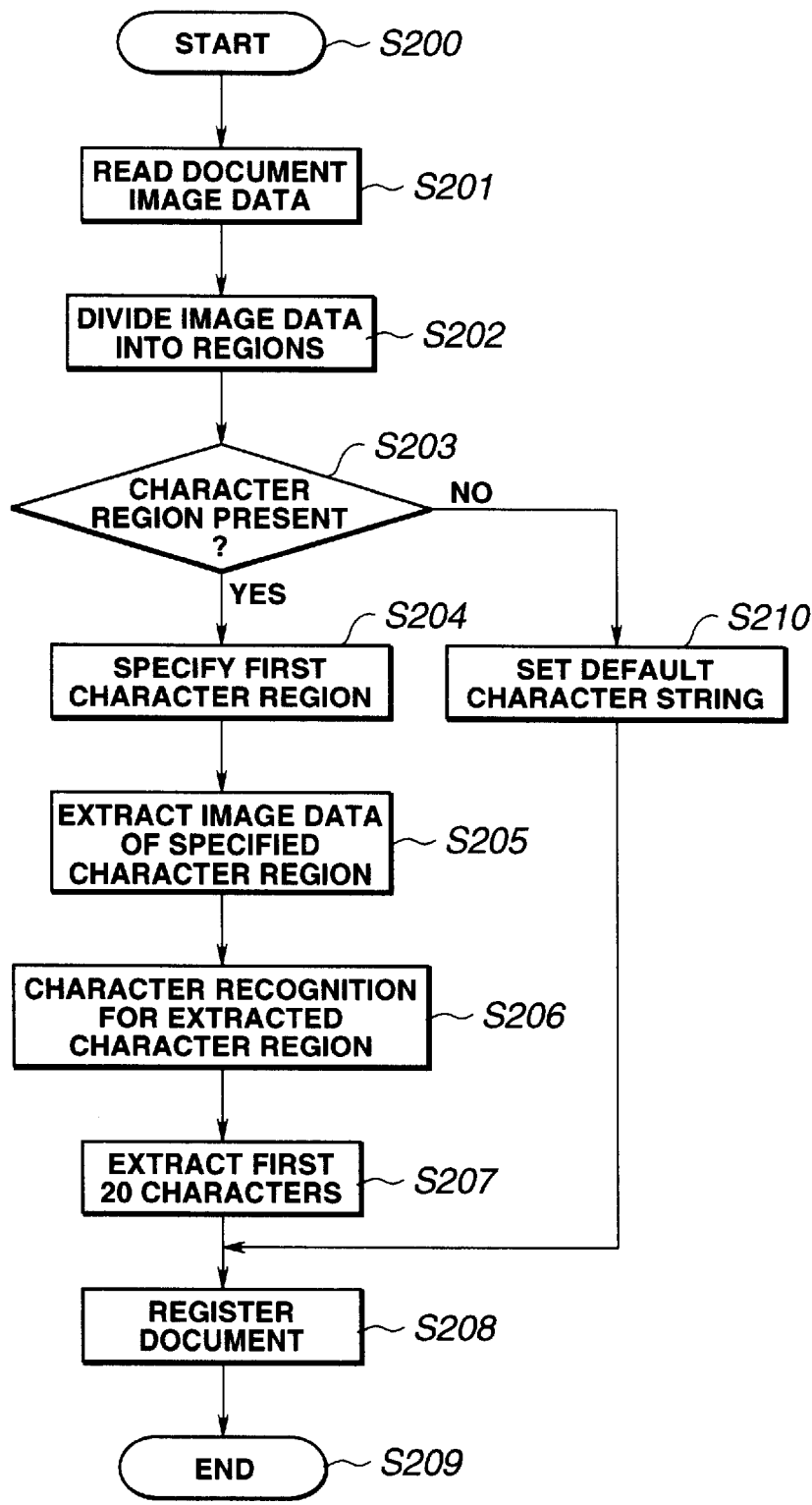
FIG. 3 is a flowchart illustrating operations of the apparatus shown in FIG. 2.

A description will now be provided of operations of the electronic filing apparatus having the above-described configuration with reference to the flowchart shown in FIG. 3.

First, processing is started in response to an instruction to start the processing initiated by the user (step S200), Then, image data of a document read by the scanner device or the like is stored in the memory 112 in the form of a bit map (step S201), and the image data is divided into regions (step S202).

In region-dividing processing, image data of the entire document is divided into regions according to attributes, such as sentences, drawings, tables and the like, and the obtained regions are extracted. Such processing is a known technique which is recently performed as preprocessing for character recognition. The regions are generally classified into character regions and image regions. For character regions, the position of a region, the size of the region, the average character size of characters within the region, and the like are extracted as attribute information. Since region-dividing methods do not relate to the primary object of the present invention, description thereof will be omitted.

Then, it is determined if a character region is present in the document (step S203). If the result of the determination is affirmative, ordering of character regions is performed, and a first character region (uppermost at the left-end side) is specified (step S204).

Ordering of character regions is performed in order to appropriately connect character strings subjected to character recognition for each of divided character regions based on context, and to reproduce the connected character strings as a sentence. This is a well-known technique which is performed as preprocessing for character recognition as well as the above-described region-dividing processing. Since ordering methods do not relate to the primary object of the present invention, description thereof will be omitted.

Figure 4:
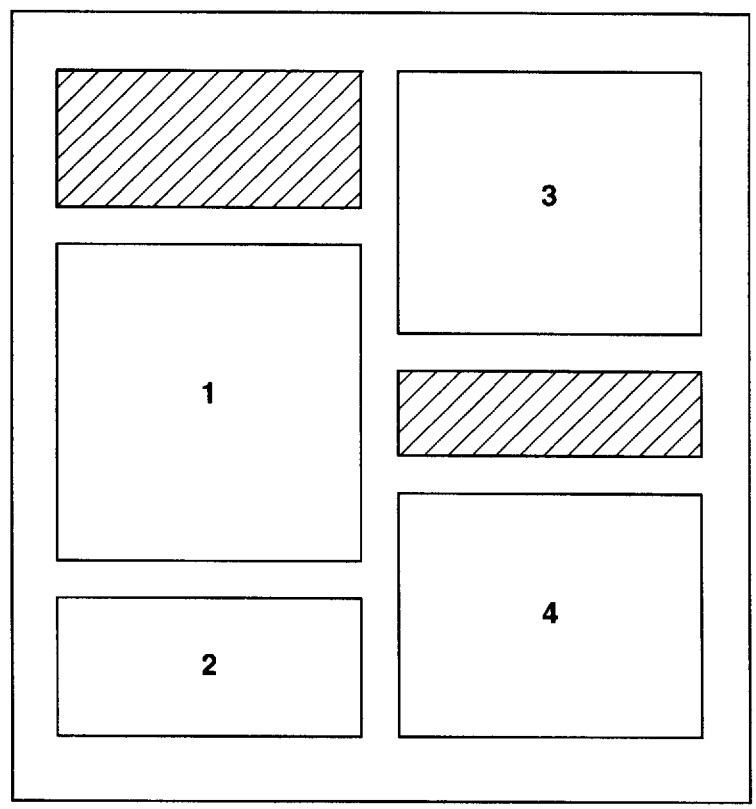
FIG. 4 is a diagram illustrating division of a document into regions and ordering of character regions.

FIG. 4 is a diagram illustrating division of a document into regions, and ordering of character regions in the document. FIG. 4 illustrates a state in which a document is divided into image regions and character regions, and the divided regions are extracted. Hatched rectangular regions are image regions, and other rectangular regions are character regions. The sequence of ordering of the character regions is indicated by numerals shown in frames representing the respective character regions.

Then, image data of the specified character region is extracted from the position and the size of the region obtained from attribute information of the region (step S205), and character recognition is performed for the extracted image data (step S206). A character string comprising the first 20 characters is extracted from a character string obtained as a result of the character recognition (step S207). The extracted character string is registered in the data base as document-comment data of document control information together with other document control information, comprising the number of pages, the date of registration and the like. The information is registered so as to correspond to storage addresses of the image data of the document in the storage device, and is stored in the storage device for the document (step S208), whereafter the process is terminated (step S209). Although the number of characters to be extracted from the character string as a result of the recognition is set to 20, any other number set by the user may be adopted. When the number of recognized characters is less than the set number, the recognized characters may be used as document-comment data.

When there is no character region in the document, a character string indicating absence of a character region in the document, such as "no text" or the like, is set as document-comment data (step S210).

Document control information, such as document-comment data and the like, can be used as indices during retrieval.

By thus performing division into regions and ordering of character regions for image data of a document, and performing character recognition for only the first character region, the user need not assign a region for character recognition in the document. As a result, the processing time required for character recognition can be shortened as compared with the case of performing character recognition for the entire document. Furthermore, since the first character string which is generally a characteristic portion of a document is registered, a character string which is useful for grasping an outline of the document can be registered. In addition, since a character string indicating absence of a character region is registered when there is no character region in a document, absence of a character region can be displayed as a characteristic of the document, for example, when displaying a summary of documents.

Second Embodiment

Figure 5:
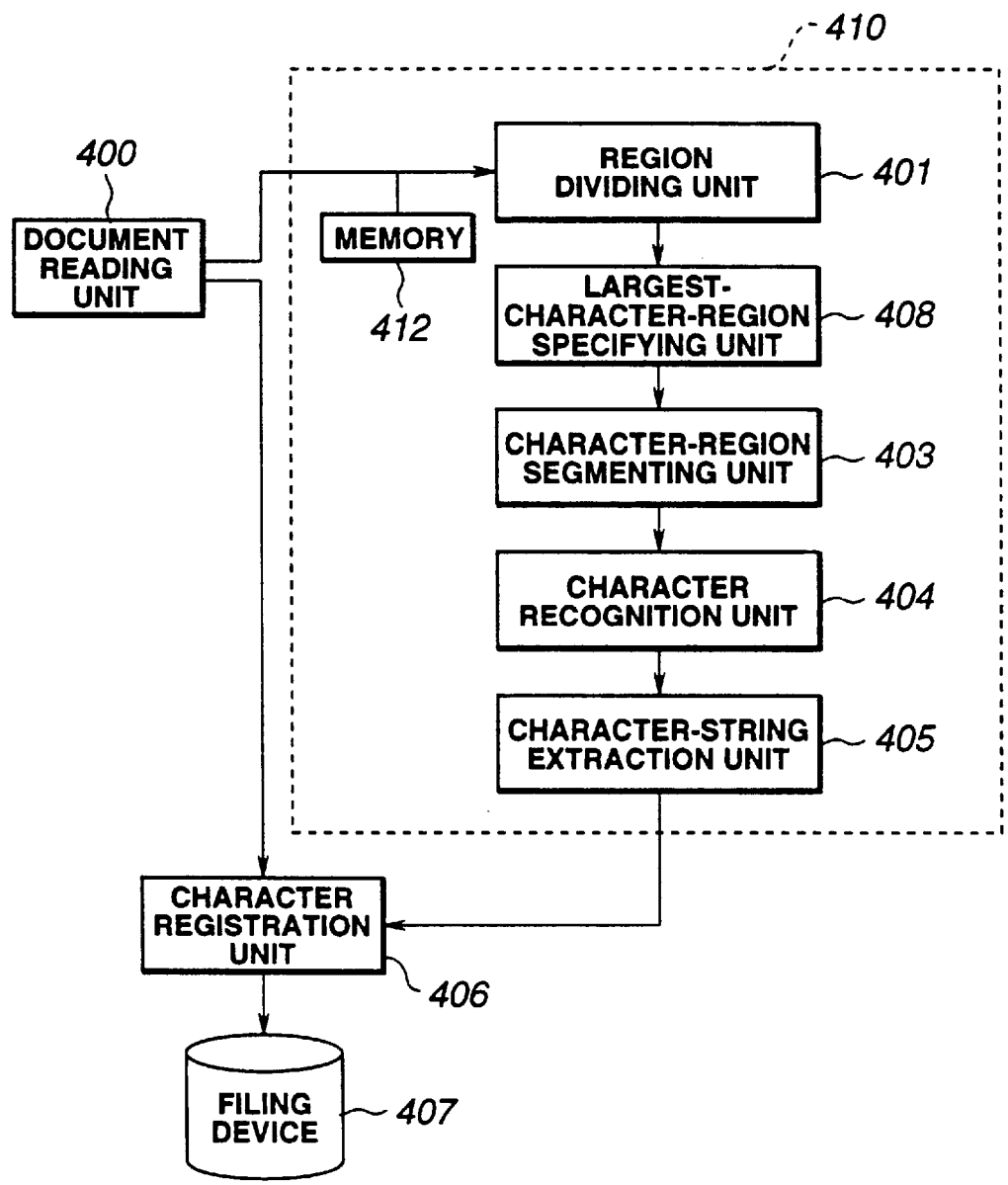
FIG. 5 is a functional block diagram illustrating the configuration of an apparatus according to a second embodiment of the present invention.

FIG. 5 is a functional block diagram illustrating the configuration of an electronic filing apparatus according to a second embodiment of the present invention. This electronic filing apparatus includes a document reading unit 400, a region dividing unit 401, a largest-character-region specifying unit 408, a character-region segmenting unit 403, a character recognition unit 404, a character-string extraction unit 405, a character registration unit 406, a filing device 407, and a memory 412. The units 401, 403 to 405 and 408 are included within a processing unit 410.

The largest-character-region specifying unit 408 specifies a character region having the largest average character size of attribute information of the region from among character regions devided by the region dividing unit 401. Components of the second embodiment which are similar to those found in the first embodiment are similarly labelled. Accordingly, a further description thereof will be omitted.

Figure 6:
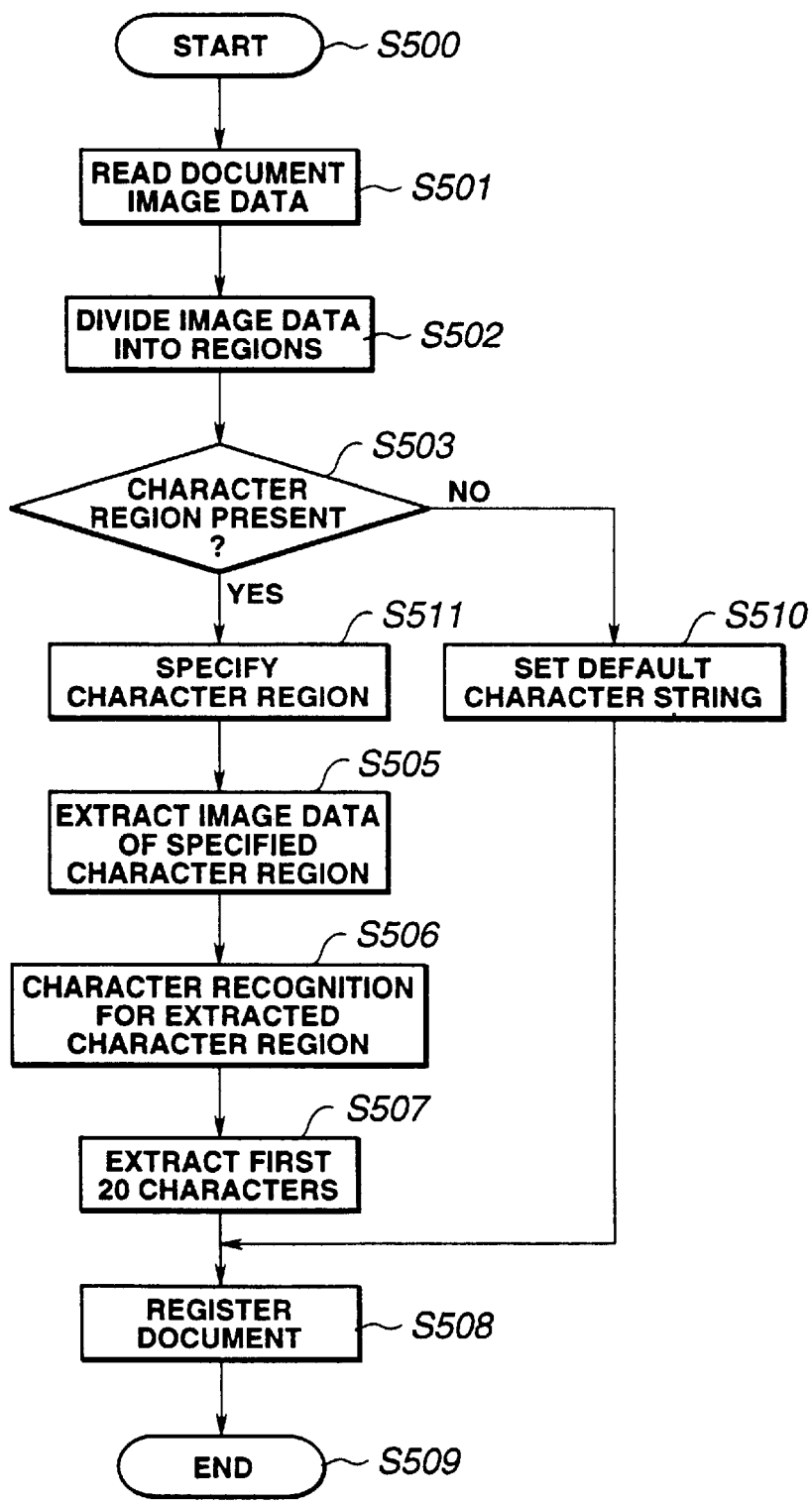
FIG. 6 is a flowchart illustrating operations of the apparatus shown in FIG. 5.

Next, a description will be provided of operations of the electronic filing apparatus having the above-described configuration with reference to the flowchart shown in FIG. 6. All of the steps in this flowchart are identical to those of FIG. 3, with the exception of step S511. In step S511, processing for specifying one character region based on the average character size and the position of the character region extracted as attribute information of the character region is performed. A further description thereof will be omitted for the sake of brevity.

Figure 7:
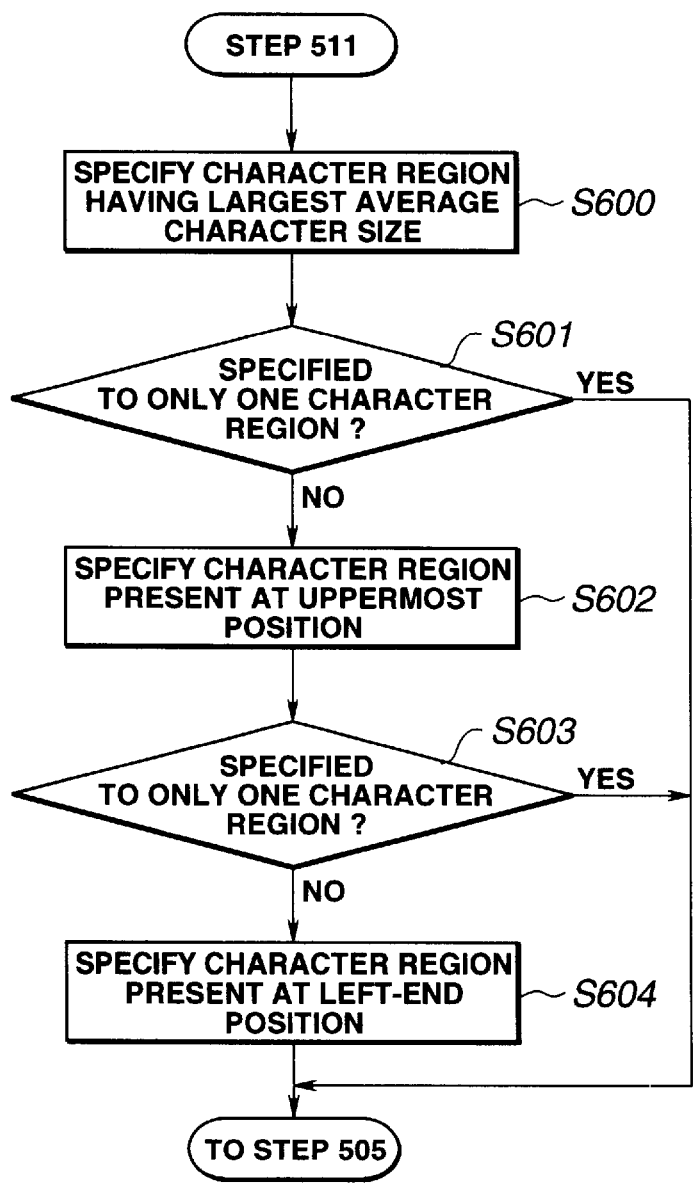
FIG. 7 is a flowchart illustrating processing of specifying a character region in the second embodiment.

Next, the operation of the character-region specifying processing of the above-described step S511 will be described in further detail with reference to the flowchart shown in FIG. 7.

First, average character sizes of respective divided character regions are compared with one another, and a character region having the largest average character size is specified (step S600). Then, it is determined whether or not only one character region having the largest average character size has been specified (step S601). If the result of the determination is negative, vertical positions of character regions specified in step S600 are compared with one another, and a character region present at the uppermost position is specified (step S602). It is then determined whether or not only one character region has been specified in step S602 (step S603). If the result of the determination in step S603 is negative, horizontal positions of character regions specified in step S602 are compared with one another, and a character region present at the left-end position is specified (step S604). One character region is specified according to one of the above-described processes of specifying a character region, and the process then proceeds to step S505.

By thus performing division into regions for image data of a document, and performing character recognition for only one character region specified based on average character sizes and the positions of character regions, the user need not assign a region for character recognition in the document. As a result, the processing time required for character recognition can be shortened compared with the case of performing character recognition for the entire document. Furthermore, since a character string having the largest character size which is generally a characteristic portion of a document is registered, a character string which is useful for grasping an outline of the document as the title of the document can be registered. In addition, since a character string indicating absence of a character region is registered when there is no character region in a document, absence of a character region can be displayed as a characteristic of the document, for example, when displaying a summary of documents.

Third Embodiment

Figure 12:
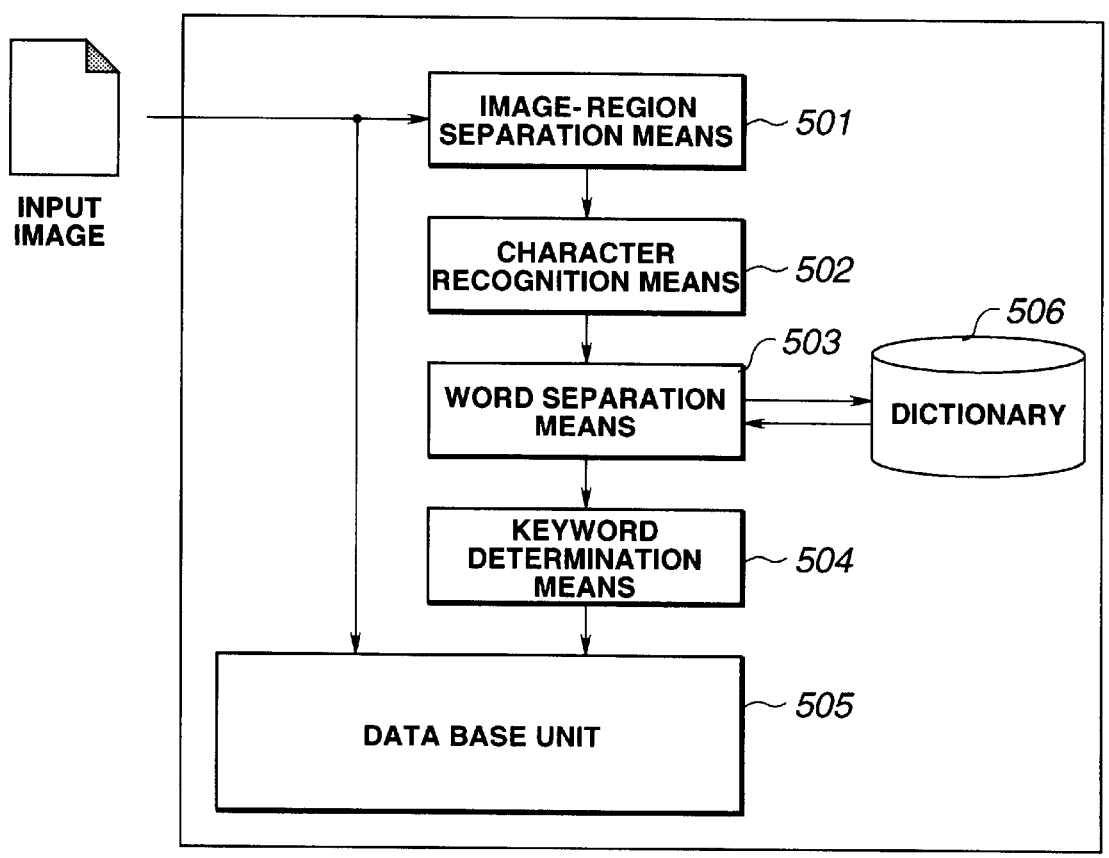
FIG. 12 is a functional block diagram illustrating the configuration of an apparatus according to a third embodiment of the present invention.

FIG. 12 is a functional block diagram illustrating the configuration of an image data base system according to a third embodiment of the present invention. In this system, image-region separation means 501 first separates an image of an original input from the scanner 1004 into image regions. Then, character recognition means 502 generates character strings as a result of recognition, and word separation means 503 analyzes the character strings input from the character recognition means 502 while referring to a dictionary 506 and separates the character strings into words. Keyword determination means 504 determines keywords. Keywords selected as a result of the determination are registered in a data base 505 together with the input image.

Figure 8:
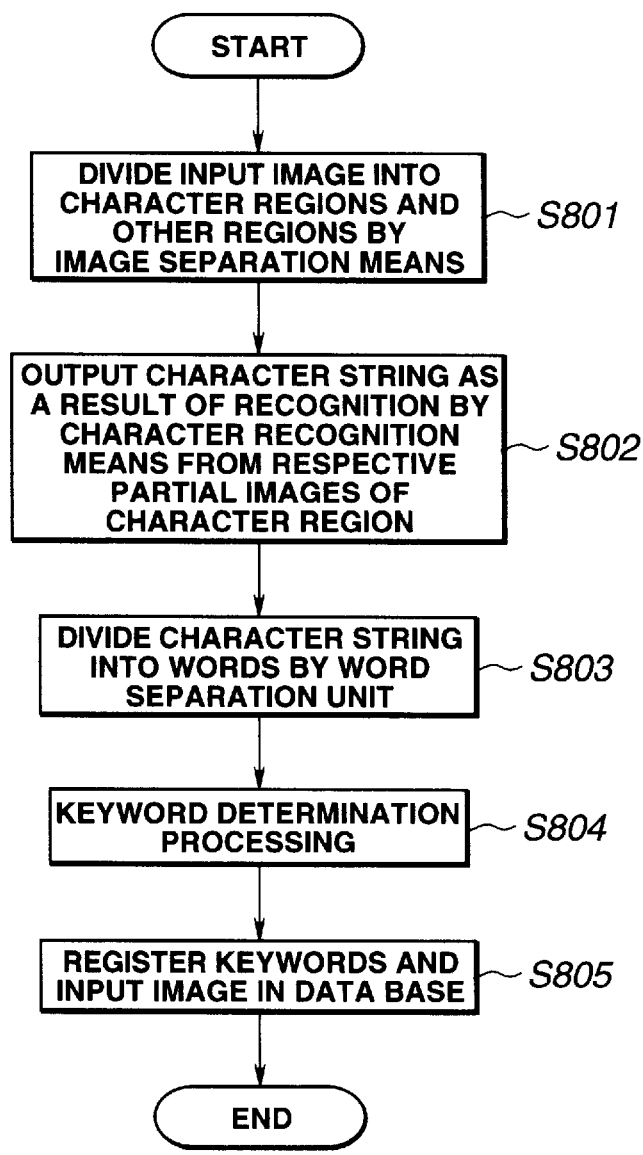
FIG. 8 is a flowchart illustrating the entire processing of a third embodiment of the present invention.
Figure 10:
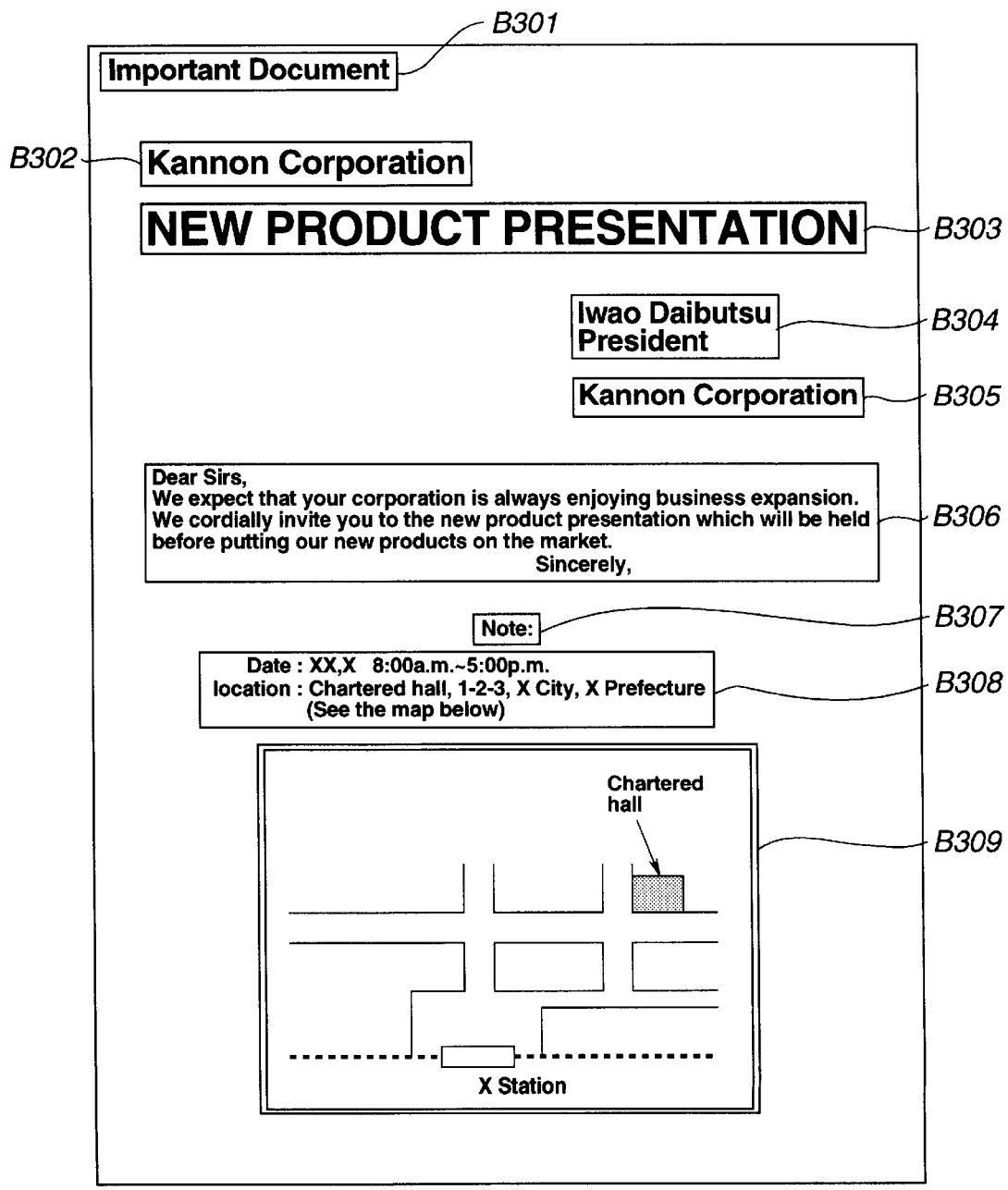
FIG. 10 is a diagram illustrating a result of processing of separating image regions.

FIG. 8 is a flowchart illustrating entire processing from data input until registration of data in a data base in the data base system of the third embodiment. First, the image-region separation means 501 analyzes an input image and forms blocks by separating portions where character data and image data are present from one another while surrounding each portion with a rectangle. The kind of each block is classified according to characteristics of the image in the block. In the present embodiment, each block extracted from the input image is classified into a character region or an image region. That is, when, for example, an input image is an image as shown in FIG. 9, blocks B301–B309 shown in FIG. 10 are extracted as a result of the processing of step S801. Each block is classified such that the blocks B301–B308 are determined to be character regions, and the block B309 is determined to be an image region. As a result of the processing of step S801, a plurality of image blocks present in the input image are extracted and separated into character regions and image regions, and character-region information is stored in the RAM 1003 and is transferred to the character recognition means 502 (step S801).

Figure 11:
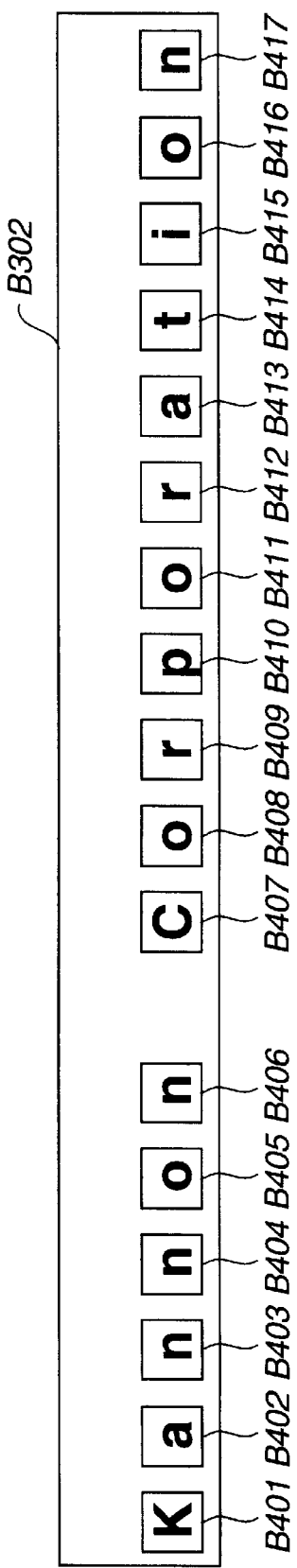
FIG. 11 is a diagram illustrating a result of processing of separating one-character images.

Then, character recognition is performed for each region determined to be a character region by the character recognition means 502. First, the image of the character region is read from the RAM 1003 and is further segmented in units of a character (character segmenting processing). In the character segmenting processing, the positions of lines are first segmented by obtaining histograms of the image of each character region in the direction of lines (the horizontal direction), and the positions of respective characters are segmented by obtaining histograms for each line in the vertical direction. For example, by performing character segmenting processing for the character region B302 shown in FIG. 10, the region B302 is separated into one-character regions B401–B417 shown in FIG. 11. Pattern matching processing is performed for the respective one-character regions using a dictionary stored in the ROM 1002 to identify characters represented by the respective one-character regions. A character string comprising the identified characters is output (step S802), and is stored in the RAM 1003 together with block information. For example, as a result of character recognition for the respective blocks shown in FIG. 10, the following character strings are obtained:

"Important document" (from B301)

"Kannon Corporation" (from B302)

"NEW PRODUCT PRESENTATION" (from B303)

"Iwao Daibutsu President" (from B304)

"Kannon Corporation" (from B305)

"Dear Sirs, We expect that your corporation is always enjoying business expansion. We cordially invite you to the new product presentation which will be held before putting our new products on the market. Sincerely," (from B306)

"Note" (from B307)

"Date: xx, x 8:00 a.m.–5:00 p.m. Location: Chartered hall, 1-2-3, x City, x Prefecture (see the map below)" (from B308).

Then, the character strings as a result of step S802 are read from the RAM 1003, and are divided into words by the word separation means 503. The word separation means 503 separates the character strings into words while referring to the dictionary 506 (configuration-element analysis) (step S803), and stores the words in the RAM 1003. When storing the words in the RAM 1003, information relating to the part of speech of each word is extracted from the dictionary 504 and is stored together with the word.

Then, the keyword determination means 504 performs keyword determination processing for all words extracted from the input image by the word separation means 503 and stored in the RAM 1003 (step S804).

Figure 13:
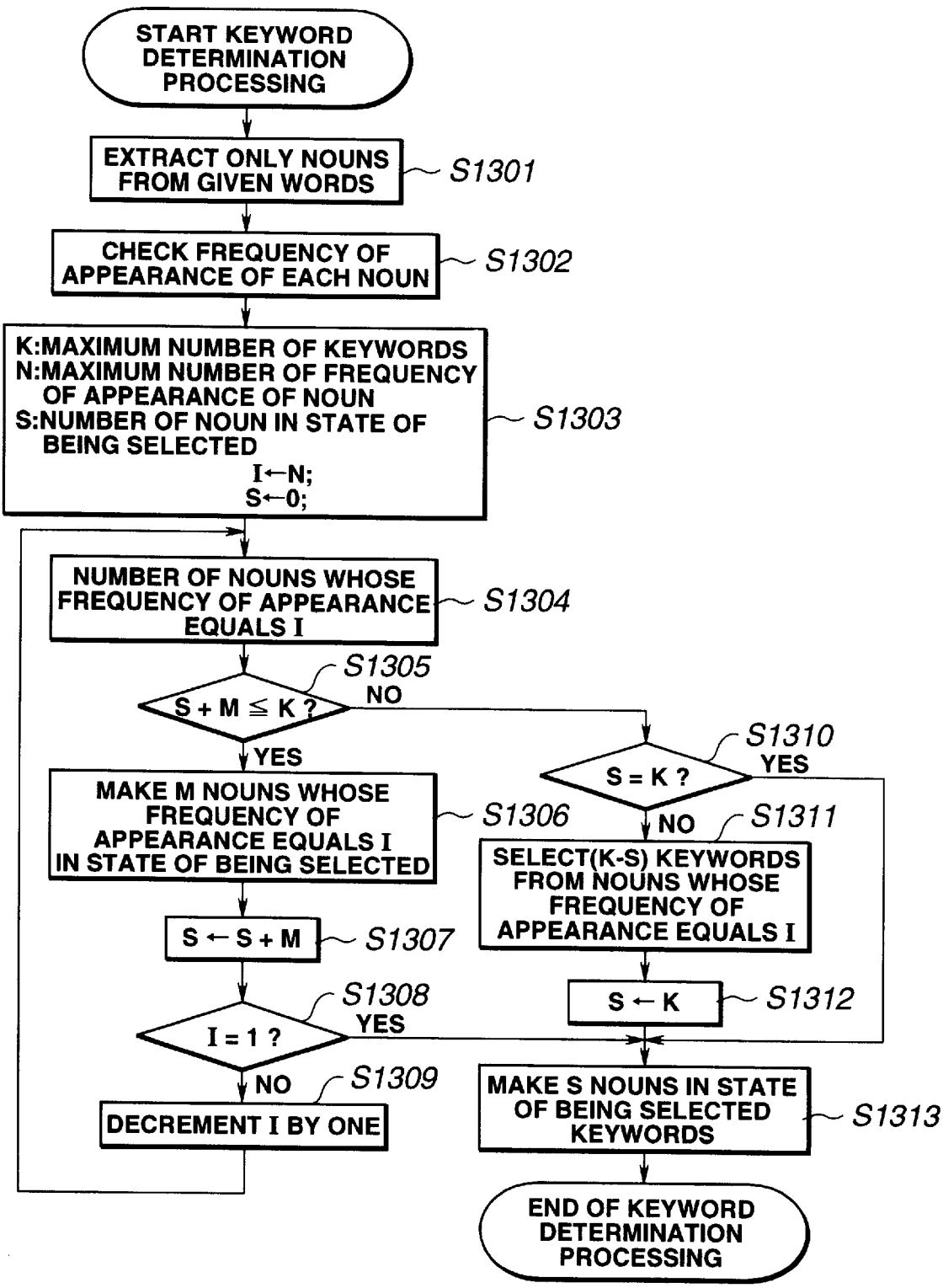
FIG. 13 is a flowchart illustrating keyword determination processing.

A description will now be provided of the detailed flow of the processing of the keyword determination processing (step S804) with reference to the flowchart shown in FIG. 13. First, part-of-speech information added to each word stored in the RAM 1003 is determined, and selection according to the part of speech is performed. In the present embodiment, nouns are extracted as objects suitable as keywords (step S1301). The following words are, for example, extracted from the character strings obtained as a result of recognition of the above-described blocks.

"important document" (from B301)

"Kannon Corporation" (from B302)

"NEW PRODUCT PRESENTATION" (from B303)

"Iwao Daibutsu" and "President" (from B304)

"Kannon Corporation" (from B305)

"your corporation", "business expansion", "new product presentation", "our new products", "market" (from B306)

"date", "location", "x City, x Prefecture", "chartered hall", "map" (from B308).

In step S1301, word strings are extracted by grammatically taking into consideration of connection between words. However, this step performed in consideration of grammatical connection between words may be omitted, and each word comprising a noun may be extracted. It can be considered that as the frequency of appearance of a word is higher, the word is more important in the document. Hence, the frequency of appearance of each word is checked (step S1302), and the following result is obtained.

Kannon Corporation (frequency 2, from B302 and B305)

new product presentation (frequency 2, from B303 and B306)

important document (frequency 1, from B301)

president (frequency 1, from B304)

Iwao Daibutsu (frequency 1, from B304)

your corporation (frequency 1, from B306)

business expansion (frequency 1, from B306)

our new products (frequency 1, from B306)

market (frequency 1, from B306)

date (frequency 1, from B308)

location (frequency 1, from B308)

x City, x Prefecture (frequency 1, from B308)

chartered hall (frequency 1, from B308)

map (frequency 1, from B308)

In the next step S1303, the maximum number of keywords (K) which can be set in one input image is assumed to be 5. The result of step S1302 indicates that the maximum number of the frequency of appearance of a noun (N) is 2. Accordingly, as a result of the processing of step S1302, the following values are obtained:

K=5, N=2, S=0, I=2, where S is the total number of nouns in a state of being selected, and I is an operational variable.

In the next step S1304, the number of nouns whose frequency of appearance equals I is checked, and the number is set to M. In the present embodiment, since there are two nouns whose frequency of appearance equals 2, i.e., "Kannon Corporation" and "new product presentation", M equals 2.

Then, it is determined whether or not the sum of S and M is equal to or less than K, i.e., whether or not the number of keywords whose frequency of appearance equals I is equal to or less than the maximum number of keywords (step S1305). In the present embodiment, since S=0 and M=2, and therefore S+M=2, the result of the determination in step S1305 is affirmative, and the process proceeds to step S1306, where the nouns whose frequency of appearance equals I (=2) are selected. The selected words are stored in a storage portion for words to be selected as keywords within the RAM 1003. Since M nouns have been selected, the value S is incremented by M (step S1307). In the present embodiment, the value S becomes 2 as a result of the processing of step S1307.

Then, it is determined whether or not I equals 1 (step S1308). An affirmative result of the determination indicates that a noun whose frequency of appearance equals 1 has been determined in step S1304, i.e., there remains no noun to be checked, and the process proceeds to step S1313. In the present embodiment, since I equals 2, the result of the determination in step S1308 is negative, and the process proceeds to step S1309, where the value I is decremented by one, and the process returns to step S1304. In step S1304, processing of selecting words to be registered as keywords from words whose frequency of appearance equals 1 is performed.

In step S1304, words whose frequency of appearance equals 1 are now to be processed. Since in the present embodiment, the value M equals 12, the result of determination in the next step S1305 is negative (S+M=14, and K=5), and the process proceeds to step S1310.

In step S1310, it is determined whether or not the number of nouns now selected equals the limit of the number of keywords. If the result of the determination is affirmative, the process proceeds to step S1313 while skipping steps S1311 and S1312. In the present embodiment, since S=2 and K=5, the result of the determination is negative, and the process proceeds to step S1311.

In step S1311, (K–S) keywords are selected from nouns whose frequency of appearance equals I. This operation is performed by the following reason. That is, although S nouns have been selected as keywords based on information relating to the frequency of appearance, (K–S) keywords can still be registered because the maximum number of keywords which can be registered equals K. Accordingly, it is intended to select (K–S) keywords from among nouns which have not been selected yet. In the present embodiment, since K=5, and S=2, three keywords are selected from among remaining 12 nouns.

The remaining (K–S) keywords may be selected in the order of nouns present at the head of a sentence (in the present embodiment, "important document", "president" and "Iwao Daibutsu" are selected). In another approach, although in the present embodiment, the character recognition means 502 does not output information relating to the size of each character, the character recognition means 502 may extract information relating to the size of each character, and the remaining (K–S) nouns may be selected in the descending order of the size of the character. Alternatively, the above-described approaches may be combined.

Since (K–S) keywords have been selected in step S1313, processing of selecting K keywords in total is terminated, and S selected nouns are made keywords.

Finally, the keywords selected in the keyword selection processing (step S804) and stored in the storage portion for words selected as keywords within the RAM 1003 are registered in the data base within the RAM 1003 together with the input image (step S805), and the process is terminated.

Since words registered as keywords are displayed in the form of a table of contents when performing image retrieval from the data base, or an image stored in the data base is displayed or printed together with a word when an instruction of retrieval of the word has been input, image retrieval can be easily performed.

Although in the present embodiment, the keyword selection means selects keywords whose number is limited by the maximum number of keywords, only one keyword may be selected, and the selected keyword may be registered in the data base as the name of an input file.

In the present embodiment, words are extracted after recognizing all characters. However, in a language, such as English or the like, in which adjacent words are separated by a space, words having high frequencies of appearance may be detected by performing matching between images in word regions before recognizing characters, and the detected words may be registered as keywords after performing character recognition.

Fourth Embodiment

Figure 15:
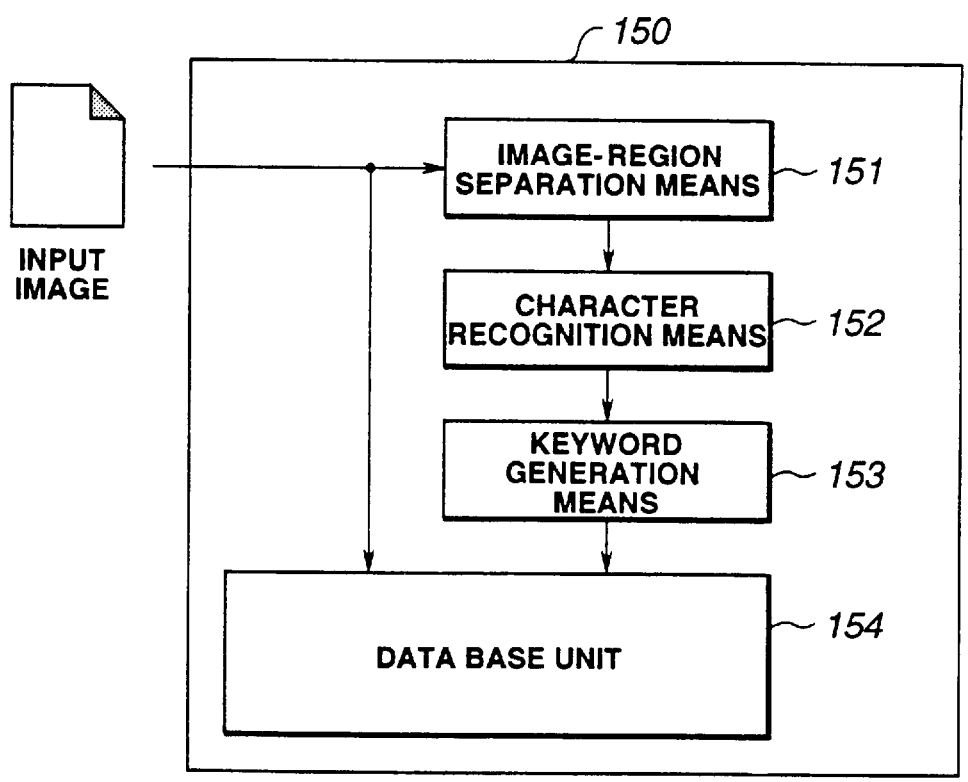
FIG. 15 is a functional block diagram illustrating the configuration of an apparatus according to a fourth embodiment of the present invention.

FIG. 15 is a functional block diagram illustrating the configuration of an image processing apparatus according to a fourth embodiment of the present invention. The portion within a frame 150 corresponds to the configuration included within the image processing apparatus of the fourth embodiment after inputting image information. Operations of respective components in the configuration are executed by the control of the CPU 1001. In FIG. 15, an image input from the scanner 1004 or the like is transmitted to image-region separation means 151, which performs image-region separation processing. Then, character recognition means 152 generates character strings. Keyword generation means 153 generates keywords, which are registered in a data base unit 154 together with the input image.

Figure 14:
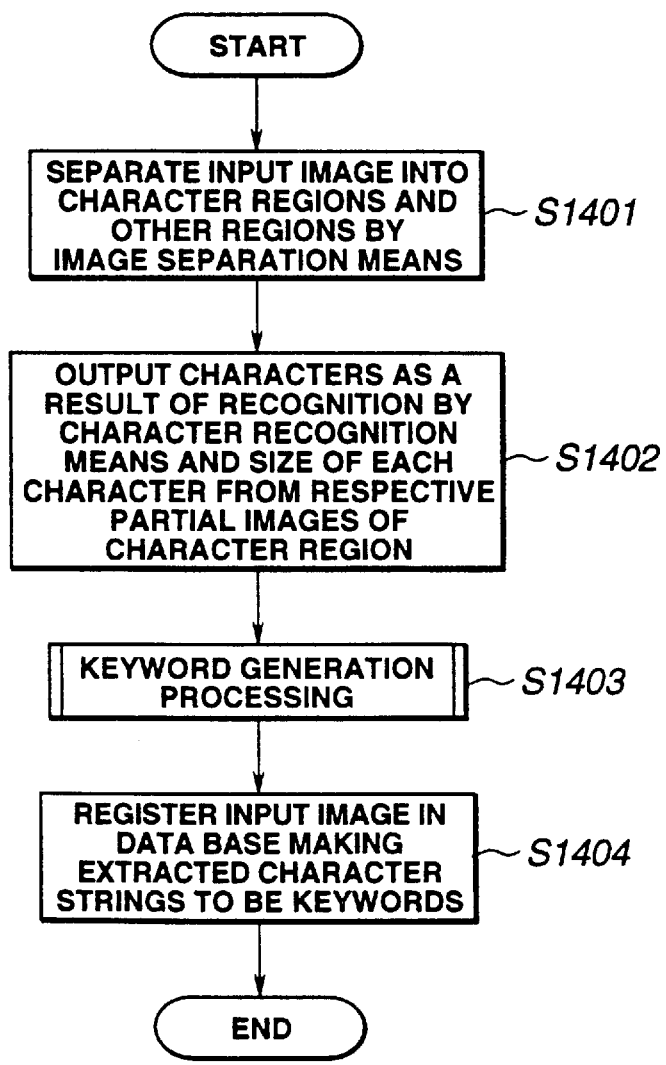
FIG. 14 is a flowchart illustrating processing of registering image information in a data base.

FIG. 14 is a flowchart illustrating an outline of processing of registering the input image in an image data base in the image processing apparatus of the fourth embodiment capable of dealing with the image data base.

First, the image-region separation means 151 separates the input image into character regions and other regions (step S1401). This processing is the same as the processing of step S801 shown in FIG. 8 in the third embodiment. Accordingly, further description thereof will be omitted.

Then, the character recognition means 152 performs character recognition for respective image regions (B301–B308 shown in FIG. 10) determined as character regions (step S1402). Although this character recognition processing is similar to the processing of step S802 shown in FIG. 8, the "size of the character" is output in addition to the "character (character code)".

Figure 16:
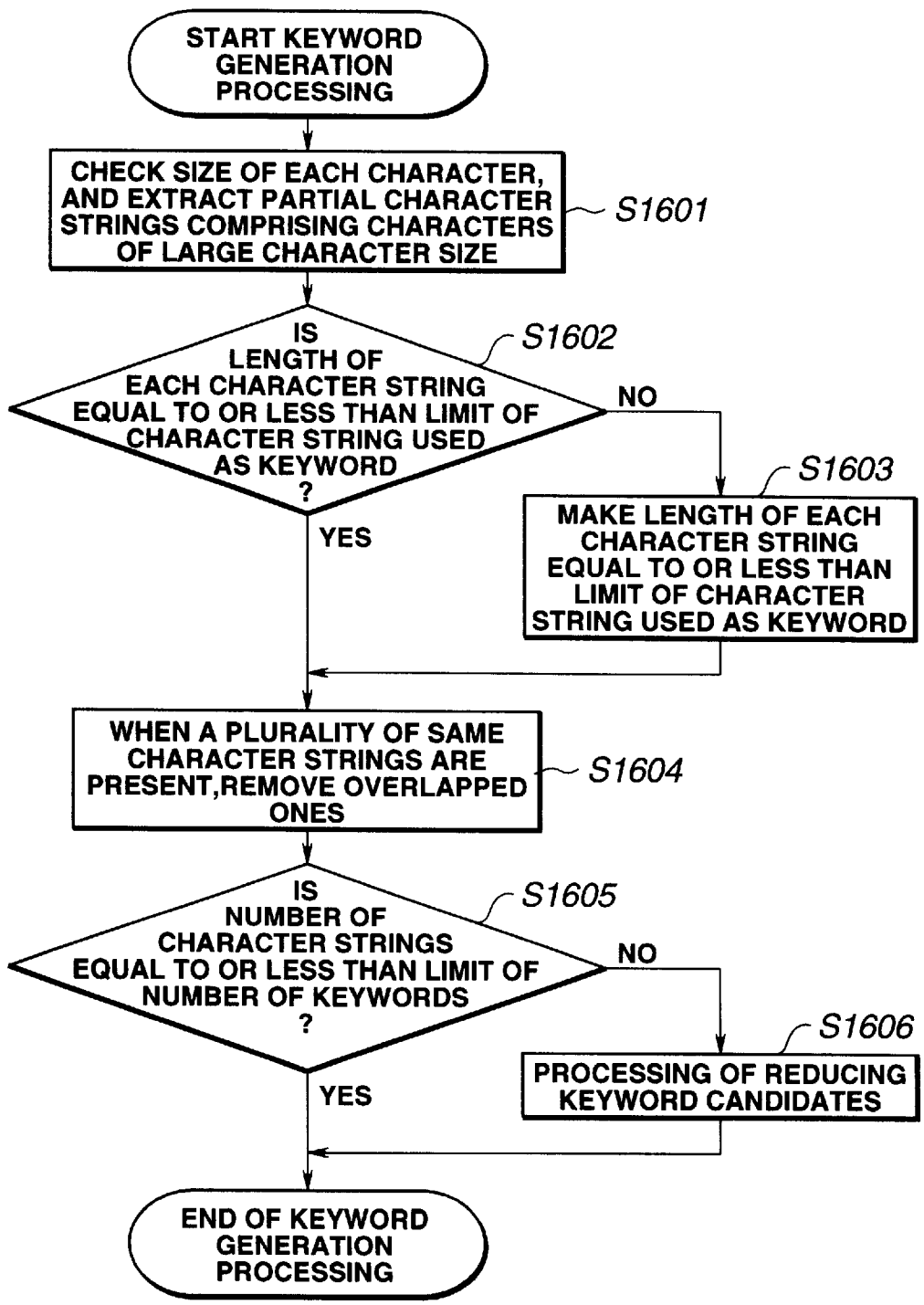
FIG. 16 is a flowchart illustrating the detail of keyword generation processing S1403 shown in FIG. 14.

Then, the keyword generation means 153 generates keywords of the input image based on the result of step S1402 (step S1403). FIG. 16 is a flowchart illustrating the detail of the keyword generation processing of step S1403. First, information relating to the sizes of respective character in each character region is checked, and character strings are generated by connecting characters having the same size. For example, suppose that information transmitted to the keyword generation means 153 as a result of analysis of the respective character regions B301–B308 shown in FIG. 10 by the character recognition means 152 indicates:

24-point characters in B301,
36-point characters (Kannon Corporation) in B302,
48-point characters (NEW PRODUCT PRESENTATION) in B303,
24-point characters in B304 and B305
18-point characters in B306, B307 and B308.

As a result, the following character strings can be extracted:
A character string "Important document" comprising 24-point characters (from B301)
A character string "Kannon Corporation" comprising 36-point characters (from B302)
A character string "NEW PRODUCT PRESENTATION" comprising 48-point characters (from B303)
A character string "Iwao Daibutsu President" comprising 24-point characters (from B304)
A character string "Kannon Corporation" comprising 24-point characters (from B305)

A character string "Dear sirs, we expect . . . " comprising 18-point characters (from B306)

A character string "Note" comprising 18-point characters (from B307)

A character string "Date: x, xx . . . " comprising 18-point characters (from B308)

Character strings having large character sizes are selected from among these character strings. This is because a large character size indicates that the writer of the document image has intended to particularly emphasize these character strings in the image, and therefore these character strings are suitable as keywords of that image information.

Figure 17:
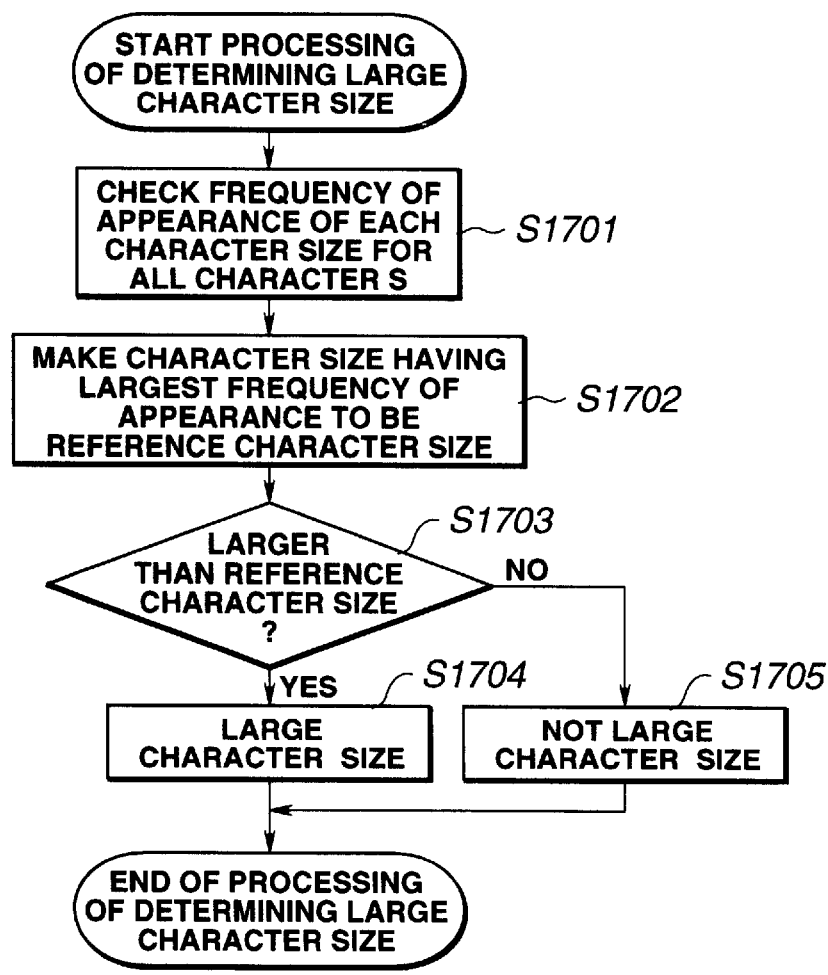
FIG. 17 is a flowchart illustrating the detail of processing of determining a large character size.

Although various methods for selecting large character sizes can be considered, in the present embodiment, the selection is achieved according to the processing indicated by the flowchart shown in FIG. 17.

First, the frequency of appearance of characters (the number of characters having each character size) of each of the character sizes (in the case of the image shown in FIG. 10, 48-point, 36-point, 24-point and 18-point character sizes) extracted from the image is checked for all of the character sizes (step S1701). The character size having the largest frequency of appearance is determined as the character size of the text of the sentence included in the image information, and that character size is made to be a reference character size (step S1702). In the case of the image shown in FIG. 10, since 18-point characters have the largest frequency of appearance, the 18 point is made to be the standard character size. After determining the reference character size, it is determined whether or not each of the character sizes extracted from the image is larger than the reference character size (step S1703). A character size is determined larger than the reference character size to be a "large character size". In the case of the image shown in FIG. 10, each of the following 24-point, 36-point and 48-point characters is determined to be a character of a "large character size":

"Important document" (from B301)
"Kannon Corporation" (from B302)
"NEW PRODUCT PRESENTATION" (from B303)
"Iwao Daibutsu President" (from B304)
"Kannon Corporation" (from B305)

These character strings are determined to be candidates for keywords.

In another approach, a certain number (for example, three) of character sizes in the descending order of the size from the largest size may be selected from among character sizes extracted from the image.

There is a limit in the number of characters for a keyword to be registered in the data base. Hence, it is determined whether or not the number of characters of each of the character strings as candidates for keywords extracted in step S1601 is equal to or less than the limit of the number of characters (step S1602). When there is a character string having a number of characters larger than the limit number of characters, a trailing portion of the character string is omitted so that the number of characters is equal to or less than the limit number of characters (step S1603). For example, when the limit number of characters of a keyword is 18, the above-described character strings as candidates for keywords become "Important document"
"Kannon Corporation"
"NEW PRODUCT PRESENTA"
"Iwao Daibutsu Presid".

In the case of a data base system in which there is no limit to the number of characters of a keyword, the steps S1602 and S1603 may be omitted.

Then, overlapped character strings are removed from the character strings as candidates for keywords determined in step S1603 (step S1604). At that time, since it can be considered that a character string having a larger character size is more important as a keyword, information having a larger character size is reserved. In the case of the image shown FIG. 10, since two character strings "Kannon Corporation" are generated both in B302 and B305, only one character string "Kannon Corporation" is reserved as a candidate for a keyword in the processing of step S1604, and information indicating that this character string is extracted from both B302 and B305 is preserved.

Character strings as candidates for keywords which remain after performing the processing of step S604 are as follows:

"Important document": frequency of appearance 1, 24-point characters (from B301)
"Kannon Corporation": frequency of appearance 2, 36-point characters (from B302 and B305)
"NEW PRODUCT PRESENTA": frequency of appearance 1, 48-point characters (from B303)
"Iwao Daibutsu Presid": frequency of appearance 1, 24-point characters (from B304)

Then, it is determined if the number of character strings as candidates for keywords is equal to or less than the limit of the number of keywords which can be registered in the data base for single image information (step S1605). If the result of the determination is negative, keywords are selected within the limited number (step S1606).

The processing of step S1606 when the number of keywords which can be registered in the data base for single image information equals two will be described. In the state of step S1605, four character strings, i.e., "Important document", "Kannon Corporation", "NEW PRODUCT PRESENTA" and "Iwao Daibutsu Presid", remain as candidates for keywords. However, since only two keywords can be registered in the data base, two character strings must be selected from the four character strings. In such a case, the selection is performed by paying attention to the size of characters of each character string. In the case of the image shown in FIG. 10, the character string "NEW PRODUCT PRESENTA" having the largest character size and the character string "Kannon Corporation" having the second largest character string are selected. If the character string "Important Document" extracted from B301 comprises 36-point characters, this character string copes with the character string "Kannon Corporation" having the same character size. In such a case, the frequencies of appearance of the respective character strings may be compared with each other, and the character string "Kannon Corporation" having a greater frequency of appearance may be selected.

Alternatively, in order to make the number of keywords within the limited number, the character strings comprising 36-point characters may be abandoned, and only the character string "NEW PRODUCT PRESENTA" comprising 48-point characters may be selected as a keyword.

Keywords generated in the keyword generation processing shown in detail in the flowchart of FIG. 16 are registered in the data base unit 154 as character-code information together with the input image.

In the present embodiment, a description has been provided of the case in which the user does not perform an input operation, because automation of registration processing in the data base is considered. However, in order to perform interactive registration processing with the user, the keywords obtained in the present embodiment may be given to the user as implicit words, and the user may modify the keywords.

Although in the present embodiment, a description has been provided of the case in which the number of keywords to be registered is limited to two, the number may be limited to one, and the obtained keyword may be used as a file name when inputting image information.

In the present embodiment, a description has been provided of the case of obtaining character-code information as a result of pattern matching of characters from one-character-image information together with character-size information. However, by not performing pattern matching in step S1402 and performing pattern matching of character images included in character strings of a large character size after extracting them in step S1601, the processing time required for pattern matching processing can be shortened.

In the present embodiment, a description has been provided of the case of extracting keywords from image information to be registered in the data base and registering the extracted keywords. Also when image information for extracting keywords is input separate from image information to be registered in the data base, keywords may be extracted from the image information for extracting keywords, and the extracted keywords may be registered together with image information for registration in the data base, as in the present embodiment.

Fifth Embodiment

Figure 18:
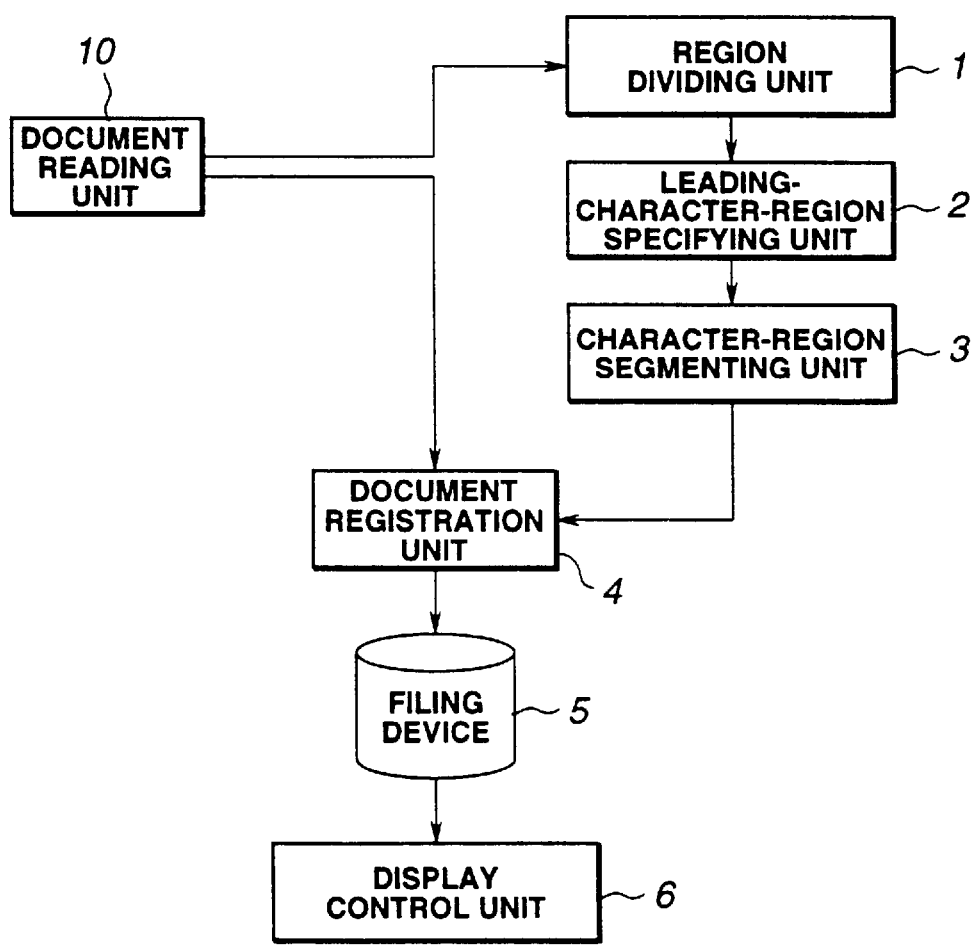
FIG. 18 is a functional block diagram illustrating the configuration of an apparatus according to a fifth embodiment of the present invention.

FIG. 18 is a functional block diagram illustrating the configuration of an electronic filing apparatus according to a fifth embodiment of the present invention. The electronic filing apparatus shown in FIG. 18 includes a document reading unit 10, a region dividing unit 1, a leading-character-region specifying unit 2, a character-region segmenting unit 3, a document registration unit 4, a filing device 5, and a display control unit 6.

The document reading unit 10 reads image data of a document read from a scanner device or the like (not shown) in an incorporated memory. The region dividing unit 1 extracts character regions, drawing regions and the like from the image data read from the document reading unit 10. The leading-character-region specifying unit 2 performs ordering of the character regions extracted by the region dividing unit 1, and specifies the first character region. The character-region segmenting unit 3 extracts image data having a specific size from the character region specified by the leading-character-region specifying unit 2.

The document registration unit 4 registers the image data of the document read by the document reading unit 10 and the image data of the character region extracted by the character-region segmenting unit 3 in the filing device 5 so as to correspond to each other. The filing device 5 stores document control information, comprising image data, keywords and the like of the document, so as to correspond to each other as a data base. The display control unit 6 controls display of the image data of the character region stored in the filing device 5 on a display or the like (not shown).

The electronic filing apparatus of the present embodiment includes, in addition to the above-described components, various components for realizing functions of retrieval, display, printing and the like for information relating to the document stored in the filing device 5, although a further description thereof will be omitted.

Figure 19:
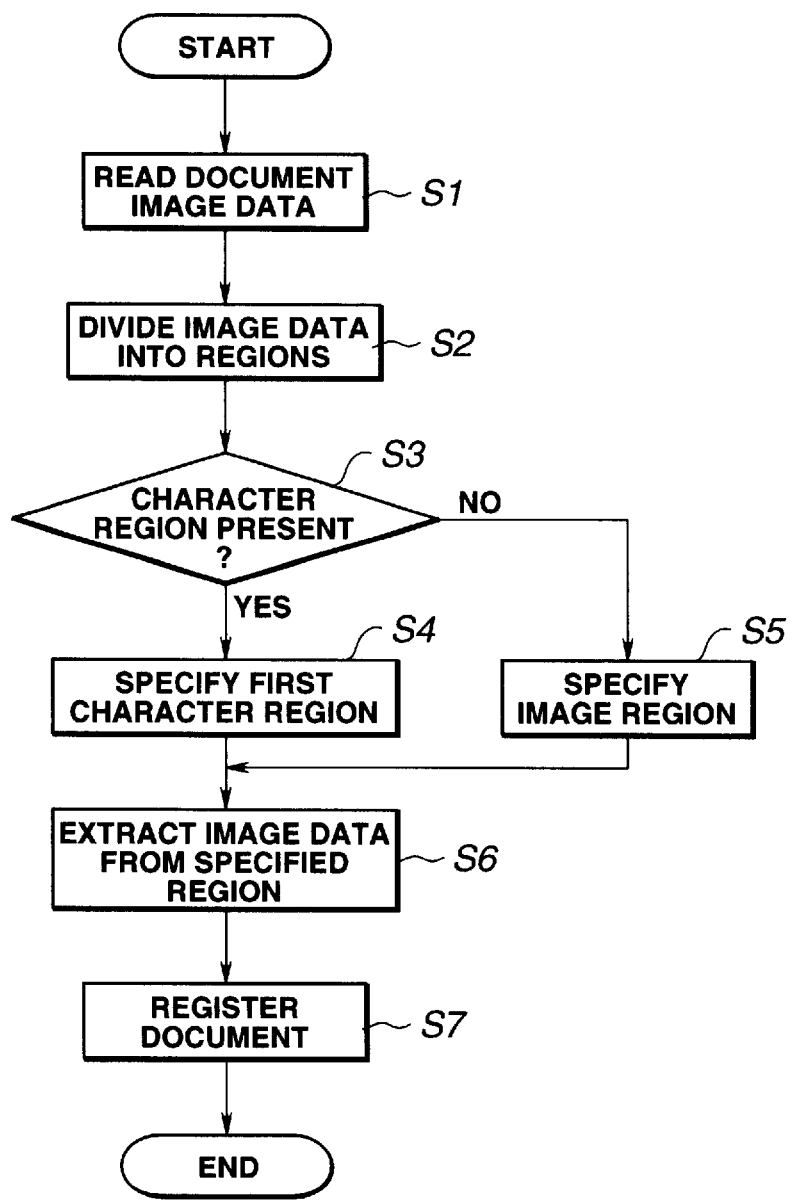
FIG. 19 is a flowchart illustrating document registration processing in the fifth embodiment.

A description will now be provided of document registration processing of the electronic filing apparatus of the present embodiment having the above-described configuration with reference to the flowchart shown in FIG. 19.

First, processing is started in response to an instruction to start the processing by the user, and image data of a document read by the scanner device or the like is stored in a memory (step S1), and the image data is divided into regions (step S2).

In region-dividing processing, image data of the entire document is divided into regions according to attributes, such as sentences, drawings, tables and the like, and the obtained regions are extracted. Such processing is a known technique which is usually performed as preprocessing for character recognition. The regions are grossly classified into character regions and image regions. For character regions, the position of a region, the size of the region, the average character size of characters within the region, and the like are extracted as attribute information. Since region-dividing methods do not relate to the primary object of the present invention, description thereof will be omitted.

Then, it is determined if a character region is present in the document (step S3). If the result of the determination is affirmative, ordering of character regions is performed, and the first character region is specified (step S4), because a characteristic sentence of the document is generally present at the first portion of the document.

The above-described ordering of character regions is performed in order to appropriately connect character strings subjected to character recognition for each of divided character regions based on the context, and to reproduce the connected character strings as a sentence. This is performed as preprocessing for character recognition as well as the above-described region-dividing processing. Since ordering methods do not relate to the primary object of the present invention, description thereof will be omitted.

FIG. 4 is a diagram illustrating division of a document into regions, and ordering of character regions in the document. FIG. 4 illustrates a state in which a document is divided into image regions and character regions, and the divided regions are extracted. Hatched rectangular regions are image regions, and other rectangular regions are character regions. The sequence of ordering of the character regions is indicated by numerals shown in frames representing the respective character regions.

If the result of the determination in step S3 is negative, i.e., if it is determined that there is no character region in the document, an appropriate image region is specified (step S5). Conditions for this specification are appropriately determined, for example, based on the position and the size of the region.

Then, image data having a width and a height not exceeding a predetermined size is extracted from the upperleft corner of the specified region based on the position and the size of the region, serving as attribute information of the specified region (step S6). The extracted image data is registered in the data base together with other document information, comprising the number of pages, the date of registration, and the like, so as to correspond to the image data of the document (step S7), and the process is terminated.

Figure 20:
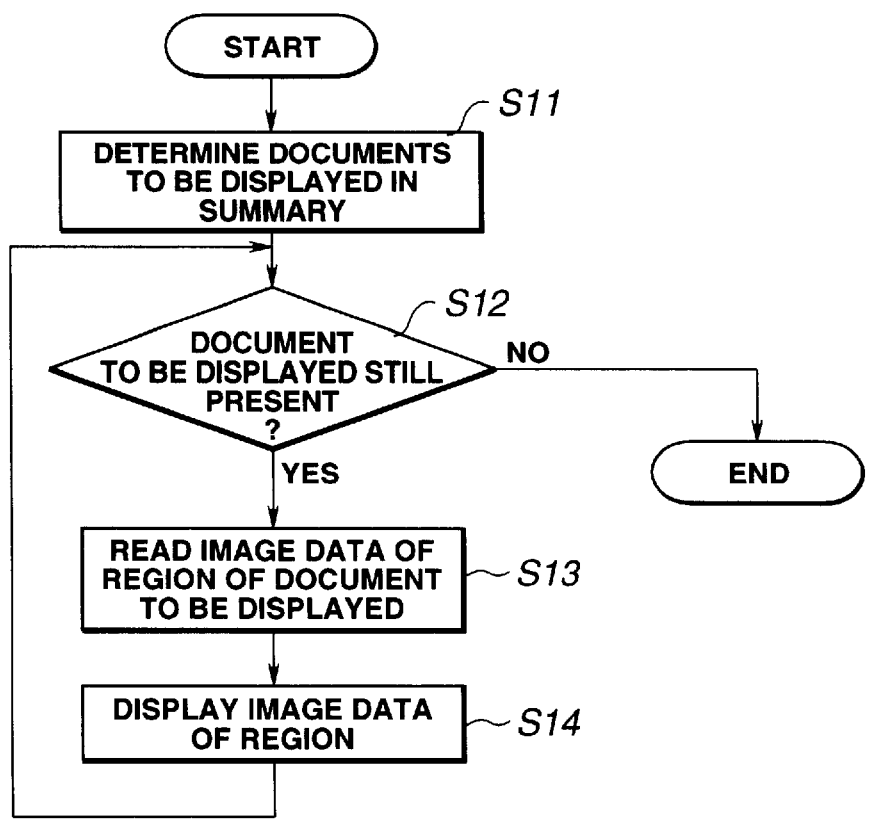
FIG. 20 is a flowchart illustrating processing of displaying a summary of image data of an image data region.

A description will now be provided of processing procedures for displaying a summary of image data of character regions or image regions in the electronic filing apparatus having the configuration shown in FIG. 8, with reference to the flowchart shown in FIG. 20.

The processing is started by an instruction to start the processing by the user, and documents to be displayed in a summary are determined based on the result of classification or the like in the document control information, comprising the date of registration and the number of pages of each document, and the like (step S11). Then, it is determined if a document which has been determined in step S11 but is not yet displayed is still present (step S12). If the result of the determination is affirmative, image data of a character region or an image region which is stored so as to correspond to that document is read (step S13).

Then, the read image data is displayed at a predetermined position (step S14). Thereafter, the process returns to step S12, and the processing of the above-described steps S12–S14 is repeated. When all of the determined documents have been displayed (NO in step S12), the process is terminated.

Figure 21:
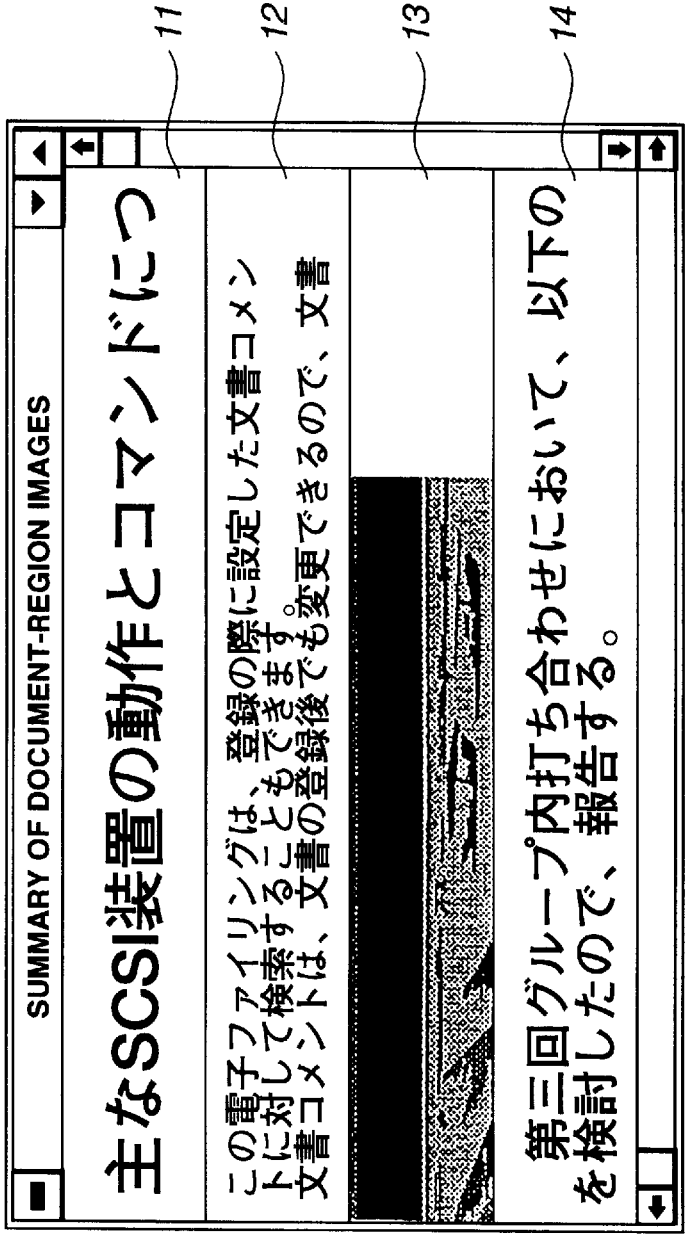
FIG. 21 is a diagram illustrating an example of display of a summary of document-region images.

FIG. 21 is an example of a display picture surface of a summary of document-region images displayed as a result of the above-described processing. As shown in FIG. 21, image data of respective character regions are displayed for three documents 11, 12 and 14, and image data of an image region is displayed for a document 13 because there is no character region in the document 13.

As described above, according to the present embodiment, by registering and displaying image data of character regions of respective documents, a part of characters described in each document can be identified on a display, such as a summary of documents, a list of the result of retrieval, or the like. It is thereby possible to easily identify a document from among documents having similar layouts, and a document having a less characteristic layout.

By registering and displaying image data of the first character region of a document which generally includes a characteristic sentence, identification of a sentence can be more easily performed.

Since the kind of displayed image data differs depending on whether a character region is present or absent in a document, it is possible to instantaneously know whether or not characters are included in the document as a characteristic of the document.

Sixth Embodiment

A description will now be described of a sixth embodiment of the present invention.

Figure 22:
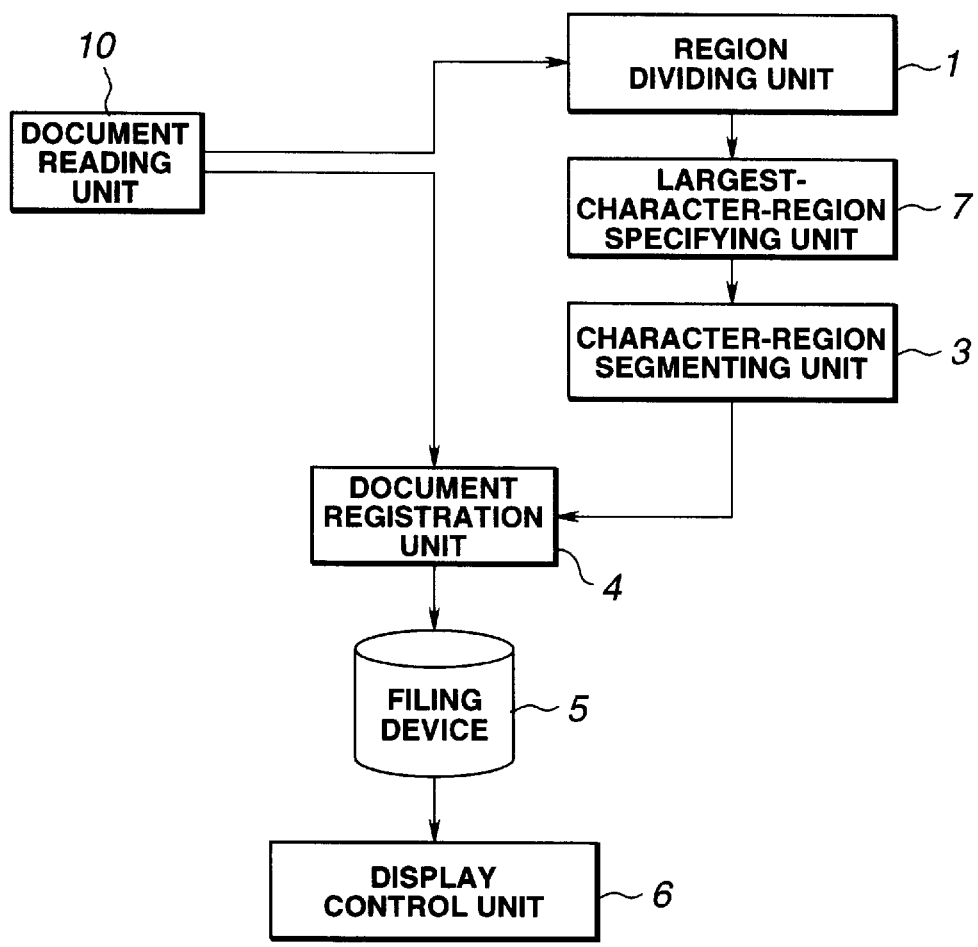
FIG. 22 is a functional block diagram illustrating the configuration of an apparatus according to a sixth embodiment of the present invention.

FIG. 22 is a functional block diagram illustrating the configuration of an electronic filing apparatus according to the sixth embodiment. In the electronic filing apparatus shown in FIG. 22, components having the same functions as in the fifth embodiment shown in FIG. 18 are indicated by the same reference numerals, and a further description thereof will be omitted.

The electronic filing apparatus of the present embodiment includes a document reading unit 10, a region dividing unit 1, a largest-character-region specifying unit 7, a character-region segmenting unit 3, a document registration unit 4, a filing device 5, and a display control unit 6. Among these components, the largest-character-region specifying unit 7 specifies a character region having the largest average character size in attribute information of the character region from among character regions divided by the region dividing unit 1.

Next, a description will be provided of document registration processing procedures in the electronic filing apparatus having the above-described configuration with reference to a flowchart. The document registration processing procedures in the present embodiment are substantially the same as the procedures shown in FIG. 19. Since step S4 is characteristic in the present embodiment, a description will be provided of this step.

In the present embodiment, instead of step S4 shown in FIG. 19, processing of specifying one character region based on the average character size and the position of the region extracted as attribute information of the character region in the above-described step S2.

Operations of character-region specifying processing of the present embodiment in the above-described step S4 will now be described in further detail according to the flowchart shown in FIG. 23.

Figure 23:
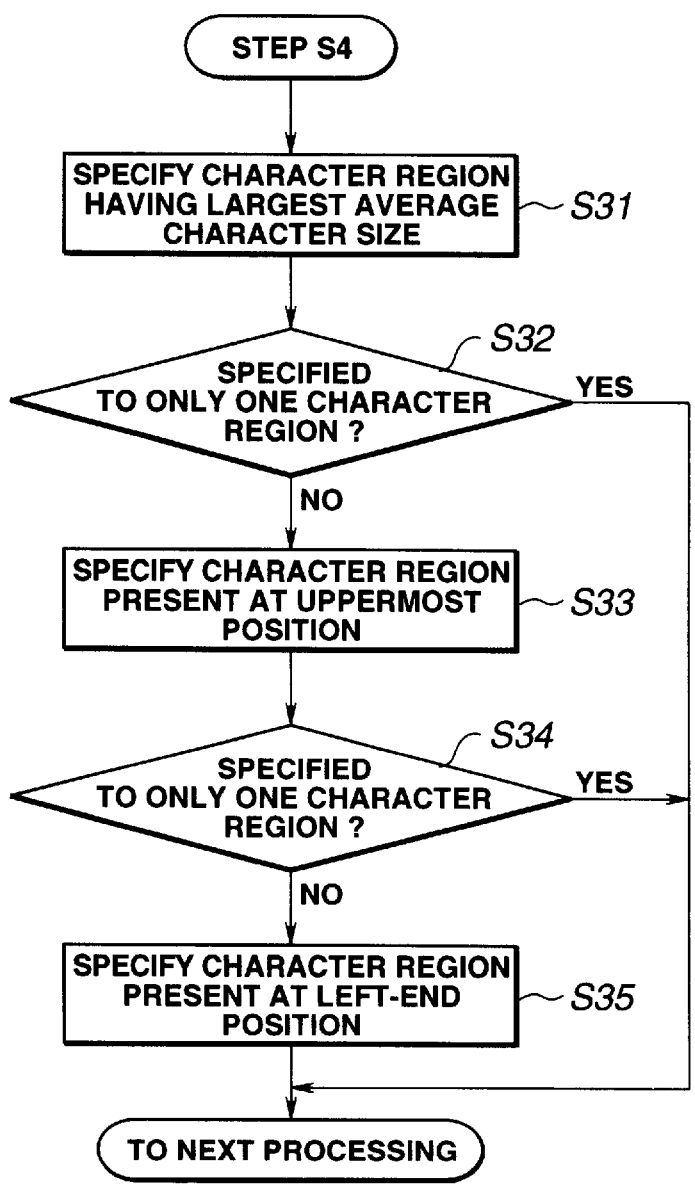
FIG. 23 is a flowchart illustrating processing of specifying a character region.

First, a character region having the largest average character size is specified by comparing the average character sizes of respective divided character regions (step S31 in FIG. 23). Then, it is determined whether or not only one character region having the largest average character size has been specified (step S32). If the result of the determination is negative, a character region present at the uppermost position is specified by comparing the vertical positions of character regions specified in step S31 (step S33).

In step S34, it is determined whether or not only one character region has been specified in step S33. If the result of the determination in step S34 is negative, a character region present at the left-end position is specified by comparing the horizontal positions of character regions specified in step S33 (step S35). Since one character region is specified in one of the above-described character-region specifying processes, the process proceeds to step S6 in FIG. 19.

Processing procedures for displaying a summary of image data of character regions or image regions in the electronic filing apparatus of the present embodiment are the same as the processing procedures for displaying region images in the fifth embodiment shown in FIG. 20. Hence, a further description thereof will be omitted.

As described above, according to the present embodiment, in addition to the effects of the fifth embodiment, by registering and displaying image data of a character region having the large character size in each document, which includes a characteristic sentence of the document, such as the title of the document or the like, a document can be more easily identified.

Seventh Embodiment

Figure 24:
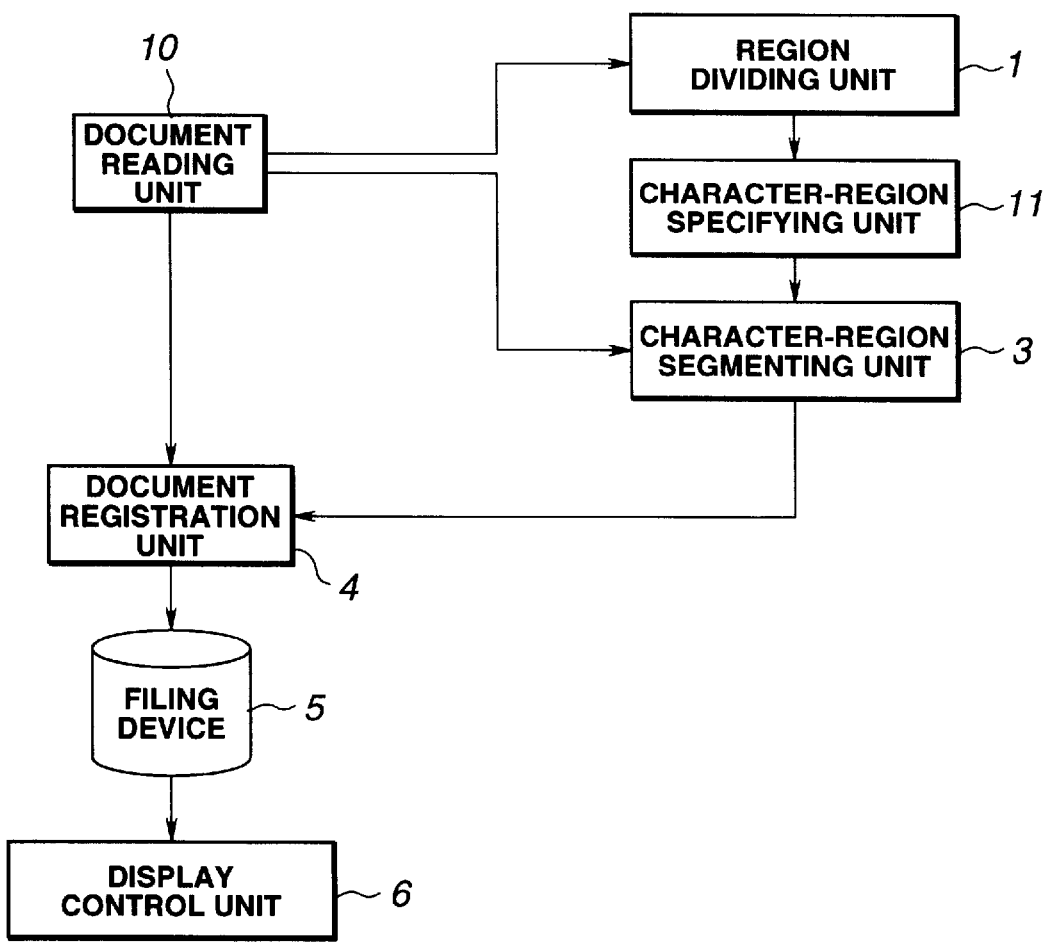
FIG. 24 is a functional block diagram illustrating the configuration of an apparatus according to a seventh embodiment of the present invention.

FIG. 24 is a functional block diagram illustrating the configuration of an electronic filing apparatus according to a seventh embodiment of the present invention. As shown in FIG. 24, the apparatus of the present embodiment includes a document reading unit 10, a region dividing unit 1, a character-region specifying unit 11, a character-region segmenting unit 3, a document registration unit 4, a filing device 5, and a display control unit 6.

Among these units, the document reading unit 10 supplies the region dividing unit 1, the character-region segmenting unit 3 and the document registration unit 4 with image data of a document read from a scanner device (not shown) or the like. The region dividing unit 1 receives the image data of the document from the document reading unit 10, and divides the image data into regions. Character regions, and the position, the size, and the direction of the set of each region, serving as attribute information of the region, are extracted, and attribute information of all of the extracted character regions is supplied to the character-region specifying unit 11.

The character-region specifying unit 11 receives the attribute information of all of the character regions from the region dividing unit 1, specifies one character region based on the attribute information, and supplies the character-region segmenting unit 3 with attribute information of the specified character region. The character-region segmenting unit 3 receives the image data of the document and the attribute information of the specified character region from the document reading unit 10 and the character-region specifying unit 11, respectively, extracts image data of the region determined based on the position, the size, and the direction of the set of the character region from the image data of the document, and supplies the document registration unit 4 with the extracted image data and information relating to the direction of the set.

The document registration unit 4 receives the image data of the document, and the image data and the information relating to the direction of the set of the character region from the document reading unit 10 and the character-region segmenting unit 3, respectively, and registers these data in the filing unit 5 so as to correspond to other document control information. The filing device 5 stores the image data of the document and document control information, comprising keywords and the like, so as to correspond to each other as a data base. The display control unit 6 reads the information relating to the direction of the set and the image data of the character region stored in the filing device 5, and controls display of the image data of the character region on a display (not shown) or the like in accordance with the read information relating to the direction of the set.

The electronic filing apparatus of the present embodiment includes, in addition to the above-described components, various components for realizing functions of retrieval, display, printing and the like for information relating to the document stored in the filing device 5, although a further description thereof will be omitted.

Figure 25:
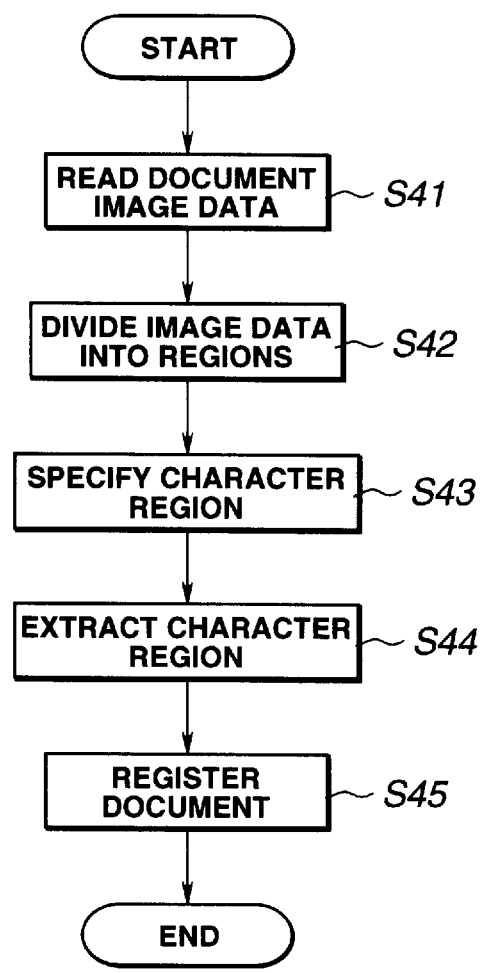
FIG. 25 is a flowchart illustrating document registration processing in the seventh embodiment.

A description will now be provided of document registration processing of the electronic filing apparatus of the present embodiment having the above-described configuration with reference to the flowchart shown in FIG. 25.

First, the processing is started in response to an instruction to start the processing by the user, and image data of a document read by a scanner device or the like (not shown) is stored in a memory (step S41), and the image data is divided into regions, and character regions and the position, the size and the direction of the set of each character region, serving as attribute information of the character region, are extracted (step S42).

In region-dividing processing, image data of the entire document is divided into regions according to attributes, such as sentences, drawings, tables and the like, and attribute information of each region is extracted. Such processing is performed as preprocessing for character recognition. A detailed description of region-dividing methods will be omitted.

In the next processing, one character region present at the left-end position is specified from among all of the extracted character regions (step S43). In addition to such a method, there are various other methods for specifying a character region, such as a method in which character regions are ordered based on attribute information thereof and the first character region is selected, or a method in which a character region having the largest average character size is selected. However, a detailed description thereof will be omitted.

Then, a region having a width and a height not exceeding a predetermined size is determined based on the position, the size and the direction of the set of the specified character region, and image data of this region is extracted from the image data of the document (step S44). The extracted image data and information relating to the direction of the set of the character region are registered in a data base together with other document control information, comprising the number of pages, the date of registration and the like, so as to correspond to the image data of the document (step S45), and the process is terminated.

The character-region segmenting processing of step S44 shown in FIG. 25 will now be described in detail with reference to the flowchart shown in FIG. 26.

First, it is determined if the character region is horizontally written based on the information relating to the direction of the set extracted in the above-described region division (step S51). If the result of the determination is affirmative, a region to be segmented which is suitable for horizontal writing is determined (step S52). If the result of the determination in step S51 is negative, i.e., if the character region is vertically written, a region to be segmented which is suitable for vertical writing is determined (step S53).

Then, image data of the determined region is extracted from the image data of the document (step S54), and the process proceeds to the processing of step S45 shown in FIG. 25.

Figure 26:
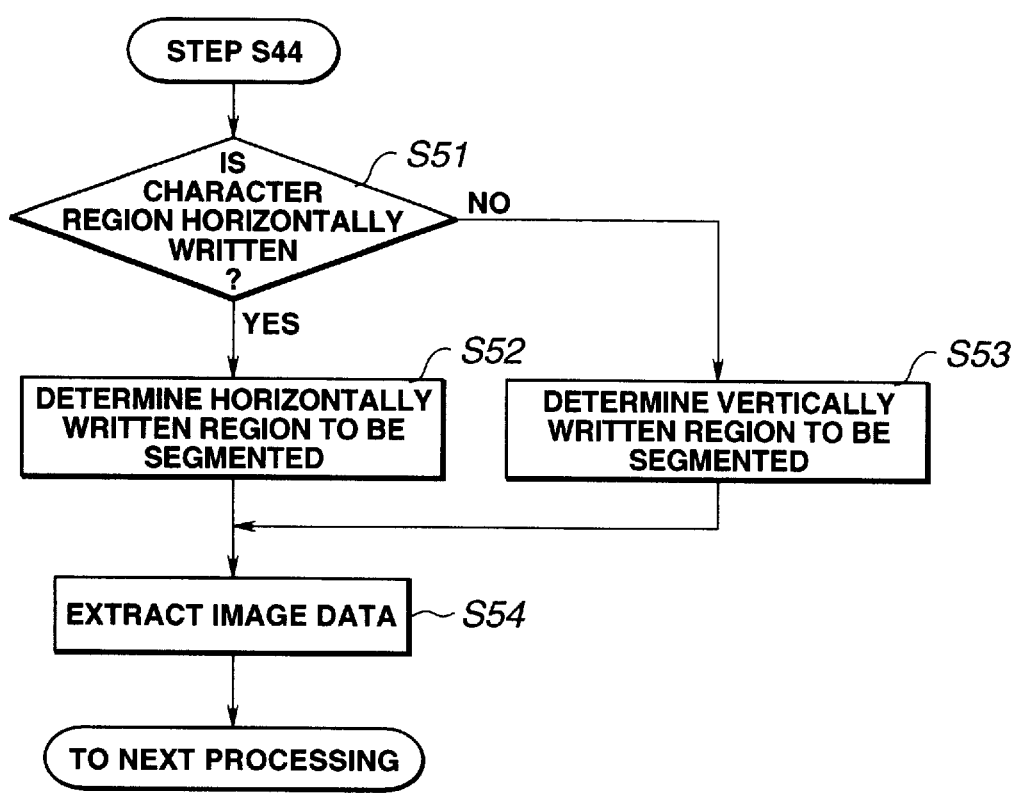
FIG. 26 is a flowchart illustrating the detail of processing of segmenting character regions.
Figure 27:
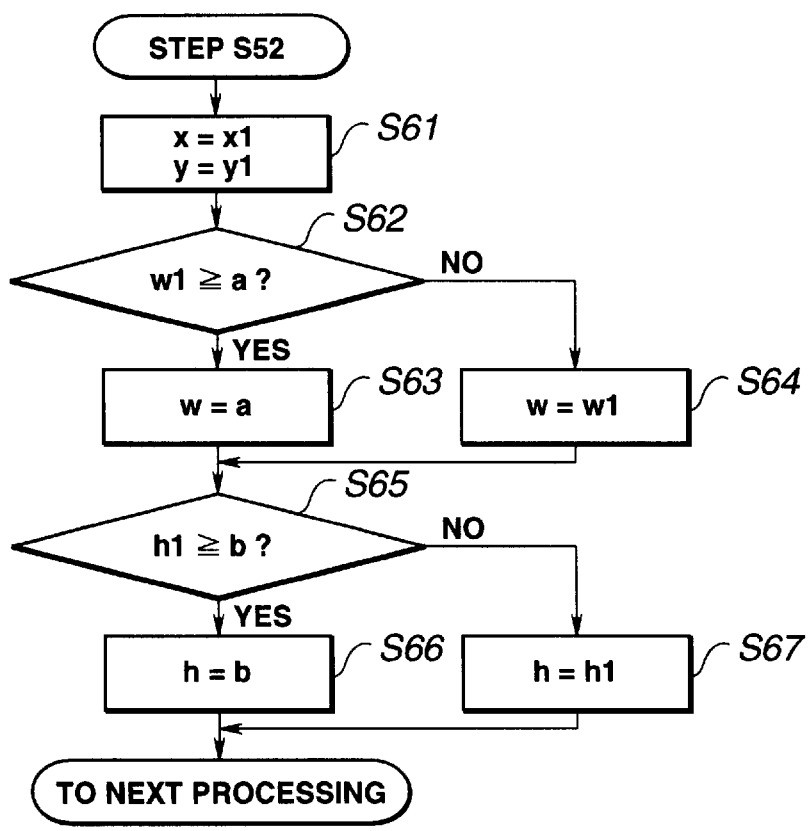
FIG. 27 is a flowchart illustrating processing of determining a region to be segmented in a horizontally-written character region.

FIG. 27 is a detailed flowchart of the processing of determining a horizontally-written character region to be segmented in step S52 shown in FIG. 26. It is assumed that in the coordinate system, the rightward direction is positive for the horizontal direction, and the downward direction is positive for the vertical direction. The horizontal position and the vertical position of the upperleft corner of the character region extracted in the region division are represented by x1 and y1, respectively, the width and the height of this region are represented by w1 and h1, the horizontal position and the vertical position of the upperleft corner of a region to be segmented are represented by x and y, respectively, the width and the height of this region are represented by w and h, respectively, and the upper limits of the width and the height of the region to be segmented from the horizontally-written character region are represented by a and b, respectively. These upper limits are predetermined values, or values determined by the user.

First, the values x and y are set to x1 and y1, respectively (step S61). Then, it is determined if the value w1 is equal to or greater than the value a (step S62). If the result of the determination is affirmative, the value w is set to the value a (step S63). If the result of the determination is negative, the value w is set to the value w1 (step S64).

Then, it is determined if the value h1 is equal to or greater than the value b (step S66). If the result of the determination is affirmative, the value h is set to the value b (step S66). If the result of the determination is negative, the value h is set to the value h1 (step S67), and the process proceeds to step S54 shown in FIG. 26.

Figure 28:
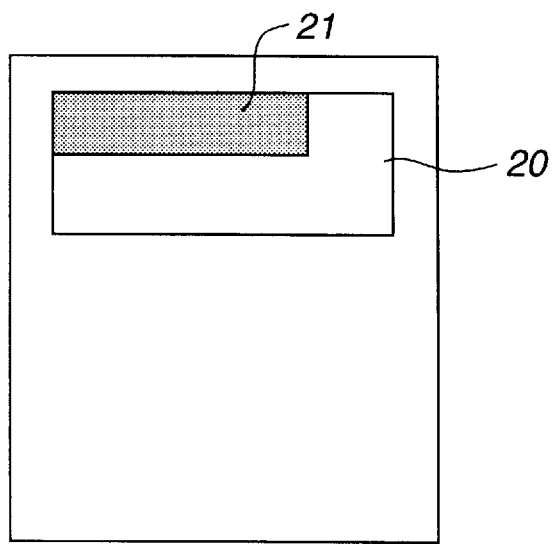
FIG. 28 is a diagram illustrating a state in which a region to be segmented is determined in a horizontally-written character region.

FIG. 28 is a diagram illustrating a state in which a region to be segmented 21 is determined in a horizontally-written character region 20 within a document.

Figure 29:
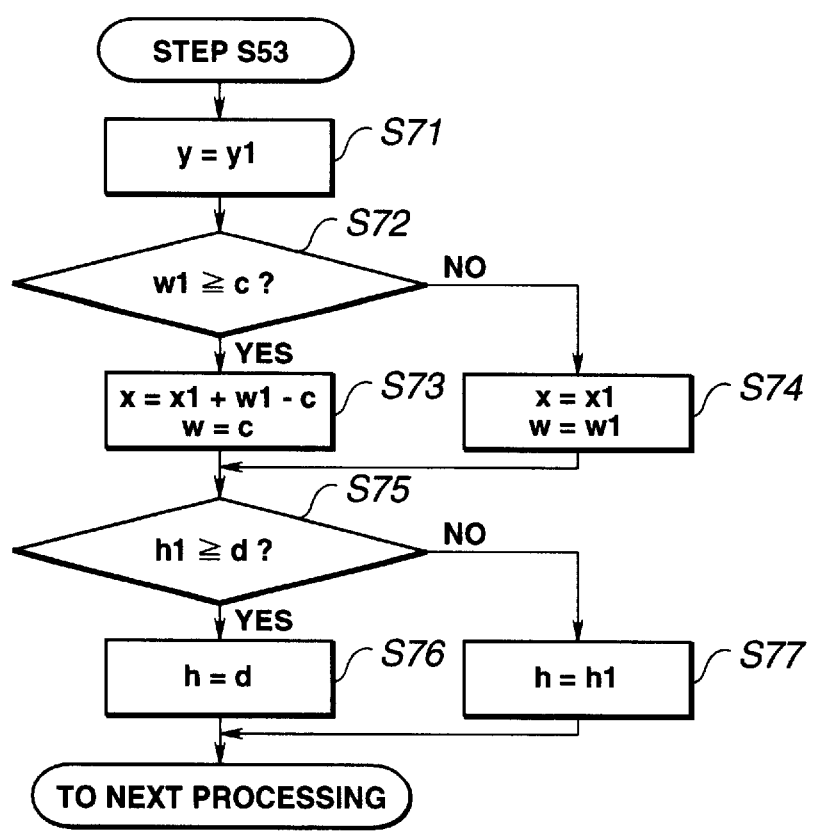
FIG. 29 is a flowchart illustrating processing of determining a region to be segmented in a vertically-written character region.

FIG. 29 is a flowchart illustrating in detail operations of processing of determining a region to be segmented in a vertically-written character region in step S53 shown in FIG. 26. In this flowchart, the upper limits of the width and the height of a region to be segmented from a vertically-written character region are represented by c and d, respectively. These upper limits are predetermined values, or values determined by the user. Other symbols have the same meaning as in FIG. 27.

In FIG. 29, first, the value y is set to the value y1 (step S71). Then, it is determined if the value w1 is equal to or greater than the value c (step S72). If the result of the determination is affirmative, the values x and w are set to the values x1+w1−c and c, respectively (step S73). If the result of the determination is negative, the values x and w are set to the values x1 and w1, respectively (step S74).

Then, it is determined if the value h1 is equal to or greater than the value d (step S75). If the result of the determination is affirmative, the value h is set to the value d (step S76). If the result of the determination is negative, the value h is set to the value h1 (step S77), and the process proceeds to step S54 shown in FIG. 26.

Figure 30:
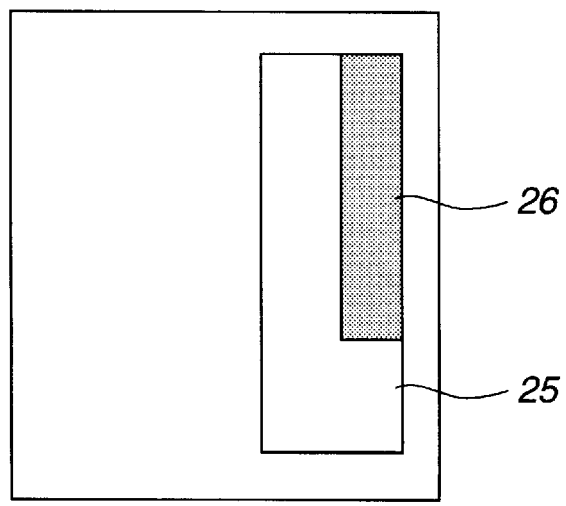
FIG. 30 is a diagram illustrating a state in which a region to be segmented is determined in a vertically-written character region.

FIG. 30 illustrates a state in which a region to be segmented 26 is determined in a vertically-written region 25 within a document.

Figure 31:
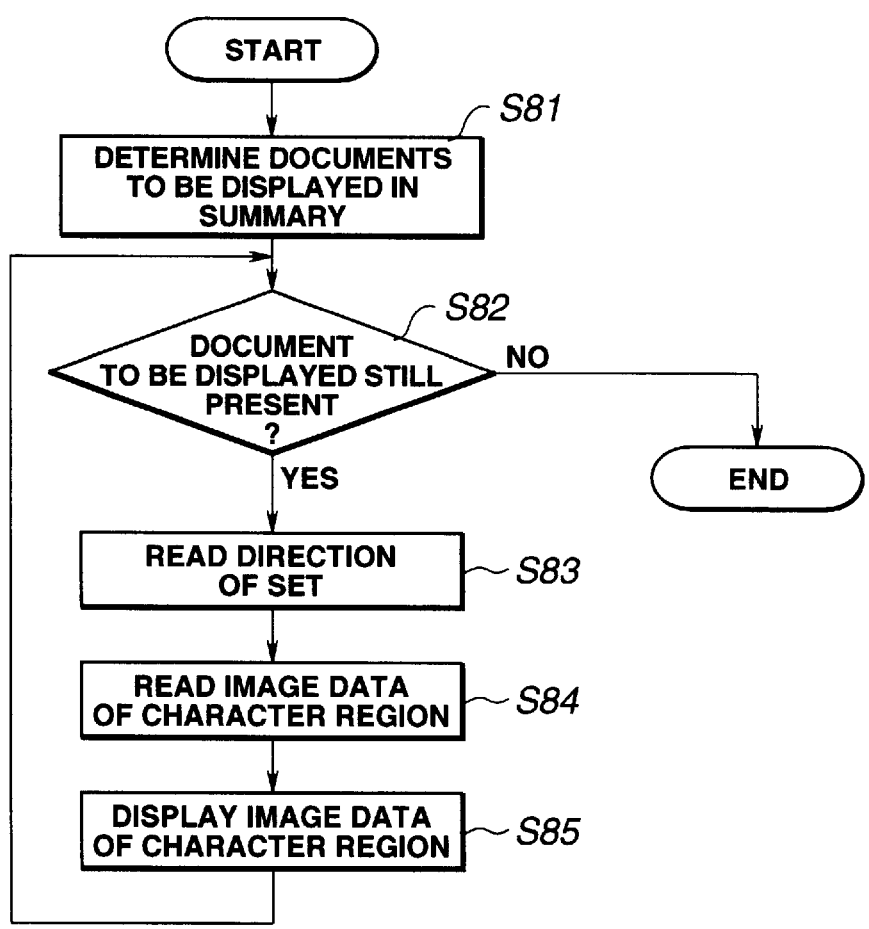
FIG. 31 is a flowchart illustrating processing of displaying a summary of image data of a character region.

Next, a description will be provided of processing procedures for displaying a summary of image data of character regions in the electronic filing apparatus of the present embodiment, with reference to the flowchart shown in FIG. 31.

First, processing is started in response to an instruction to start the processing by the user, and documents to be displayed on a summary are determined based on the result of classification in document control information, comprising the date of registration, the number of pages, and the like (step S81). Then, it is determined if a document which is not yet displayed is present from among the documents determined in step S81 (step S82). If the result of the determination is affirmative, information relating to the direction of the set and image data of a character region stored so as to correspond to that document are read (steps S83 and S84).

Then, the read image data is displayed on a predetermined separate position depending on vertical writing or horizontal writing (step S85), and the process returns to step S82. The processing of steps S82–S85 is repeated. When it has been determined in step S82 that all of the determined documents have been displayed, the process is terminated.

Figure 32:
FIG. 32 is a diagram illustrating an example of display of a summary of document-region images.

FIG. 32 illustrates an example of a display picture surface of a summary of document-region images displayed as a result of the above-described summary displaying processing. In FIG. 32, image data of vertically written character regions are displayed at the left side of the window, and image data of horizontally written character regions are displayed at the right side of the window.

As described above, according to the present embodiment, in addition to the above-described effects of the fifth embodiment, by dividing image data of a read document into regions, extracting the position, the size, and the direction of the set of each of the character regions, and extracting, storing and displaying image data of a region suitable for the direction of the set of the character region, image data of a character region can be appropriately extracted and displayed irrespective of the direction of the set of the character region.

Furthermore, by storing the direction of the set, and displaying image data of character regions separately depending on the direction of the set, image data of character regions can be displayed in a state of being easily identified.

Eighth Embodiment

Figure 33:
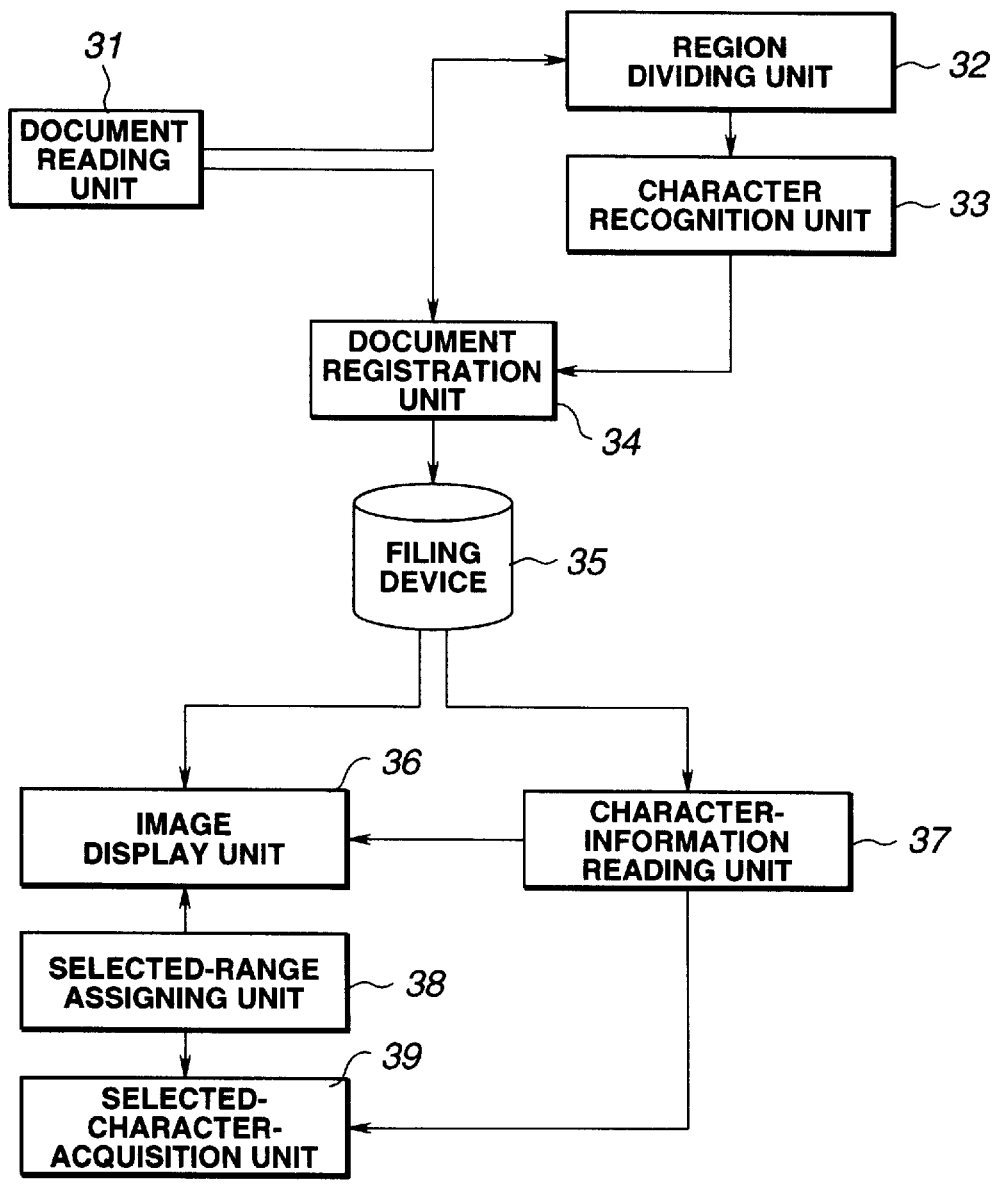
FIG. 33 is a functional block diagram illustrating the configuration of an apparatus according to an eighth embodiment of the present invention.

FIG. 33 is a functional block diagram illustrating the configuration of an electronic filing apparatus according to an eighth embodiment of the present invention. The electronic filing apparatus shown in FIG. 33 includes a document reading unit 31, a region dividing unit 32, a character recognition unit 33, a document registration unit 34, a filing device 35, a character-information reading unit 37, an image display unit 36 comprising a display device (not shown) or the like, a selected-range assigning unit 38 comprising a pointing device or the like, and a selected-character acquisition unit 39.

The document reading unit 31 supplies the region dividing unit 32 and the document registration unit 34 with image data of a document read by a scanner device or the like. The region dividing unit 32 divides the image data of the document supplied from the document reading unit 31 into regions, and extracts positional information of each character region, comprising the horizontal position and the vertical position of the upperleft corner, and the horizontal position and the vertical position of the lower right corner of each character region, and the direction of the set (vertical writing/horizontal writing) of each character region as character-region information, and supplies the character recognition unit 33 with the extracted character-region information together with the image data of the document.

The character recognition unit 33 receives from the region dividing unit 32 the image data of the document and the character-region information of all of the character regions, performs character recognition for the image data of all of the character regions, extracts character strings described in each of the character regions, and the horizontal position and the vertical position of the upperleft corner, and the horizontal position and the vertical position of the lower right corner of the image-data region of each character as character-string information, and supplies the document registration unit 34 with the extracted character-string information together with the character-region information.

The document registration unit 34 receives the image data of the document, and the character-region information and the character-string information of all of the character regions from the document reading unit 31 and the character recognition unit 33, respectively, and resisters the received information in the filing device 35 so as to correspond to other document control information. The filing device 35 stores the image data of the document, and document control information, comprising the name of the document, the date of registration and the like, in the data base so as to correspond to each other.

The character-information reading unit 37 reads the character-region information and the character-string information of all of the character regions from the filing device 35, and supplies the image display unit 36 and the selected-character acquisition unit 39 with the read character-region information and character-string information. The image display unit 36 reads the image data of the document from the filing device 35, displays the read image data, and receives the character-region information and the character-string information of all of the character regions from the character-information reading unit 37. When the operator assigns a range defined by two specific points on the display picture surface of the image display unit 36, the image display unit 36 receives the assigned range from the selected-range assigning unit 38, displays the frame of a character region including the assigned range, and performs reversal display of the portion of a character string included within the assigned range.

The selected-range assigning unit 38 acquires the range assigned on the display picture surface of the image display unit 36 by the operator, and supplies the image display unit 36 and the selected-character acquisition unit 39 with the acquired assigned range. The selected-character acquisition unit 39 acquires the character string of the character region including the assigned positions by receiving the character-region information and the character-string information of all of the character regions from the character-information reading unit 37, and receiving the assigned range from the selected-range assigning unit 38.

The electronic filing apparatus of the present embodiment includes, in addition to the above-described components, various components for realizing functions of retrieval, display, printing and the like for information relating to the document stored in the filing device 35, although a further description thereof will be omitted.

Figure 34:
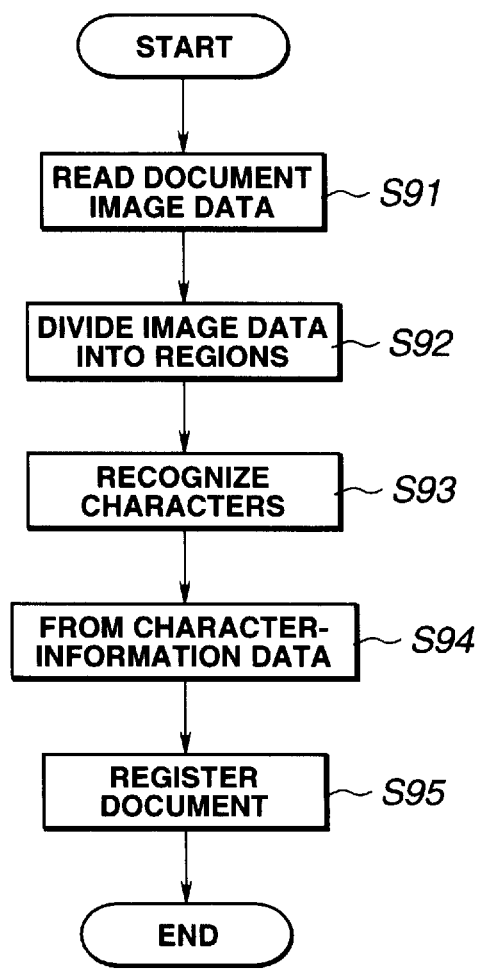
FIG. 34 is a flowchart illustrating document registration processing in the eighth embodiment.

A description will now be provided of document registration processing of the electronic filing apparatus of the present embodiment having the above-described configuration with reference to the flowchart shown in FIG. 34.

First, the processing is started in response to an instruction to start the processing by the operator, and image data of a document read by a scanner device or the like is stored in a memory (step S91). The read image data is divided into regions, and the horizontal position and the vertical position of the upperleft corner, the horizontal position and the vertical position of the lower right corner, and the direction of the set (vertical writing/horizontal writing) of each character region of the image data of the document are extracted as character-region information (step S92).

Figure 35:
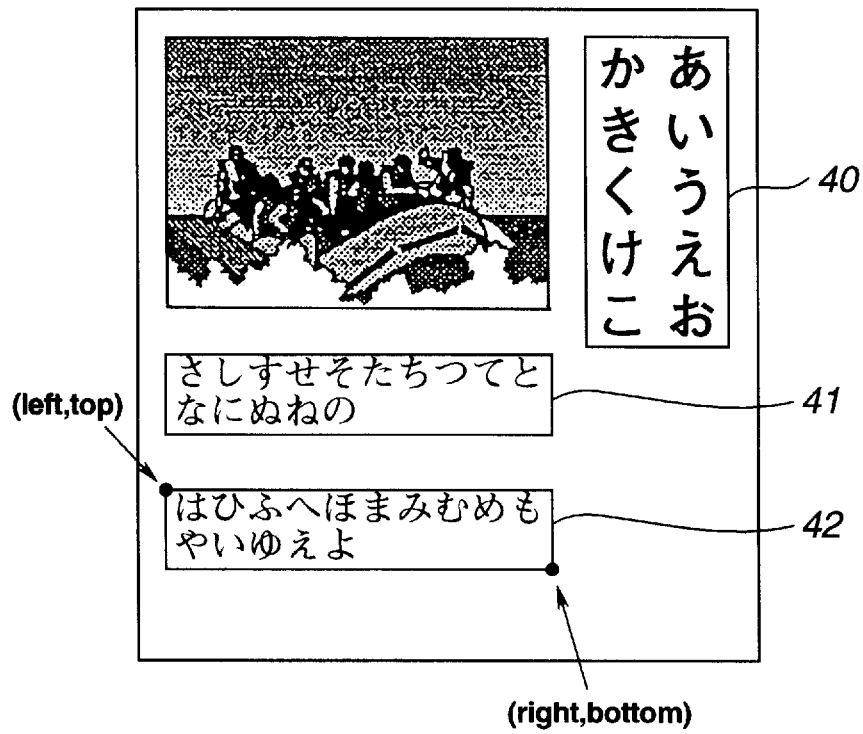
FIG. 35 is a diagram illustrating a region dividing operation in the eighth embodiment.

FIG. 35 is a diagram illustrating operations of region division in the present embodiment. FIG. 35 illustrates a state in which image data of a document is divided into regions. A region 40 is extracted as a vertically written character region, and regions 41 and 42 are extracted as horizontally written character regions. In FIG. 35, the horizontal position and the vertical position of the upperleft corner, and the horizontal position and the vertical position of the lower right corner of the character region 42 are indicated as left and top, and right and bottom, respectively.

In region-dividing processing, image data of the entire document is divided into regions according to attributes, such as sentences, drawings, tables and the like, and the divided regions and attribute information of each region is extracted. Such processing is performed as preprocessing for character recognition. A detailed description of region-dividing methods will be omitted.

Then, character recognition is performed for image data of the extracted character regions, and the horizontal position and the vertical position of the upperleft corner, and the horizontal position and the vertical position of the lower right corner of the image data region of each character, and a character code of the character are extracted as character-string information (step S93).

Figure 36:
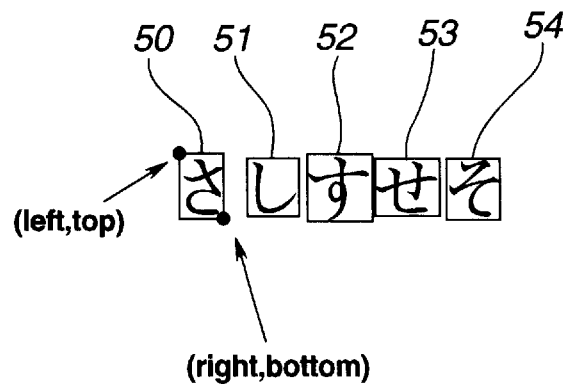
FIG. 36 is a diagram illustrating the region of each character to be extracted.

FIG. 36 is a diagram illustrating the image data region of each character extracted by character recognition in the present embodiment. In FIG. 36, a state in which regions 50, 51, 52, 53 and 54 are extracted for characters "". The horizontal position and the vertical position of the upperleft corner, and the horizontal position and the vertical position of the lower right corner of the region of the character "" are indicated as left and top, and right and bottom, respectively. Since a well-known technique can be used as a character recognition method, a detailed description thereof will be omitted.

In the document registration processing of the present embodiment, character-information data as shown in FIG. 37 is formed from the character-region information extracted in the above-described step S92, and the character-string information extracted in the above-described step S93 (step S94). The formed character-information data of the document is registered in the data base together with other document control information, comprising the number of pages, the date of registration and the like, so as to correspond to the image data of the document (step S59, and the process is terminated.

Next, a description will be provided of operations of document display processing in the electronic filing apparatus of the present embodiment having the configuration shown in FIG. 33, with reference to the flowchart shown in FIG. 38.

First, the processing is started in response to an instruction to start the processing by the operator, and a document to be displayed is determined, for example, by selection of the document on the display picture surface of a summary of documents by the operator (step S100). Then, image data and character-information data of the document determined in step S100 so as to correspond to the determined document are read from the data base (step S101), the read image data of the document is displayed (step S102), and the process is terminated.

Figure 39:
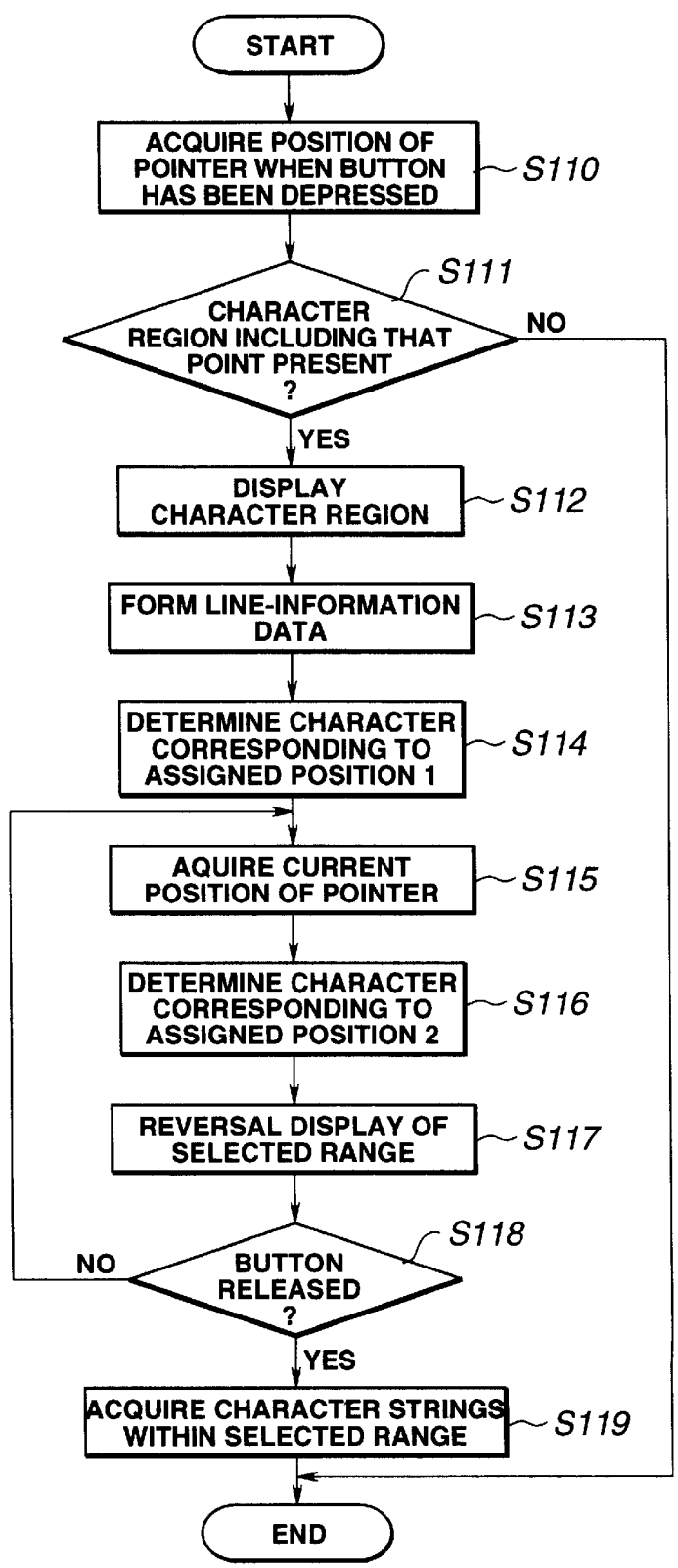
FIG. 39 is a flowchart illustrating processing of selecting a character string in a document.

Next, a description will be provided of operations of processing of selecting a character string of the document in the electronic filing apparatus of the present embodiment, with reference to the flowchart shown in FIG. 39.

First, the operator displays the image data of the document according to the above-described document display processing (see FIG. 38), and depresses the button of a pointing device (not shown) while adjusting the position of a pointer to a desired position on the display picture surface, to start the processing. The horizontal position and the vertical position of the pointer at that time are acquired in buffers startPos.x and startPos.y, respectively (step S110), and whether or not a character region including the point (startPos.x, startPos.y) is present is determined based on the positional information of each character region of character-information data (step S111).

If the result of the determination in step S111 is affirmative, i.e., if the character region including the point (startPos.x, startPos.y) is present, the frame of that character region is displayed in the character region based on the positional information (step S112), and line-information data is formed by extracting lines within the character region based on positional information of each character in the character region (step S113). A character assigned by the point (startPos.x, startpos.y) is determined based on the formed line-information data and the positional information of each character in the character region, and the number of the character is acquired in a buffer select1 (step S114).

Then, the operator moves the pointer while depressing the button of the pointing device to acquire the horizontal position and the vertical position of the pointer at that time in buffers endPos.x and endPos.y, respectively (step S115), and a character assigned by the point (endPos.x, endpos.y) is determined according to the same processing as in the above-described step S114, and the number of that character is acquired in a buffer select2 (step S116).

Then, the region of lines between select1 and select2 is subjected to reversal display (step S117), and whether or not the operator has released the button of the pointing device is determined (step S118). If the result of the determination in step S118 is negative, the process returns to step S115, and the processing from step S115 to step S118 is repeated until the operator releases the button.

If the result of the determination in step S118 is affirmative, character codes between the select1 and select2 are copied in a buffer "string" based on character-string information (step S119), and the processing is terminated. If the result of the determination in step S111 is negative, i.e., if there is no character region including the point (startPos.x, startPos.y), the process is terminated by performing no processing.

Figure 40:
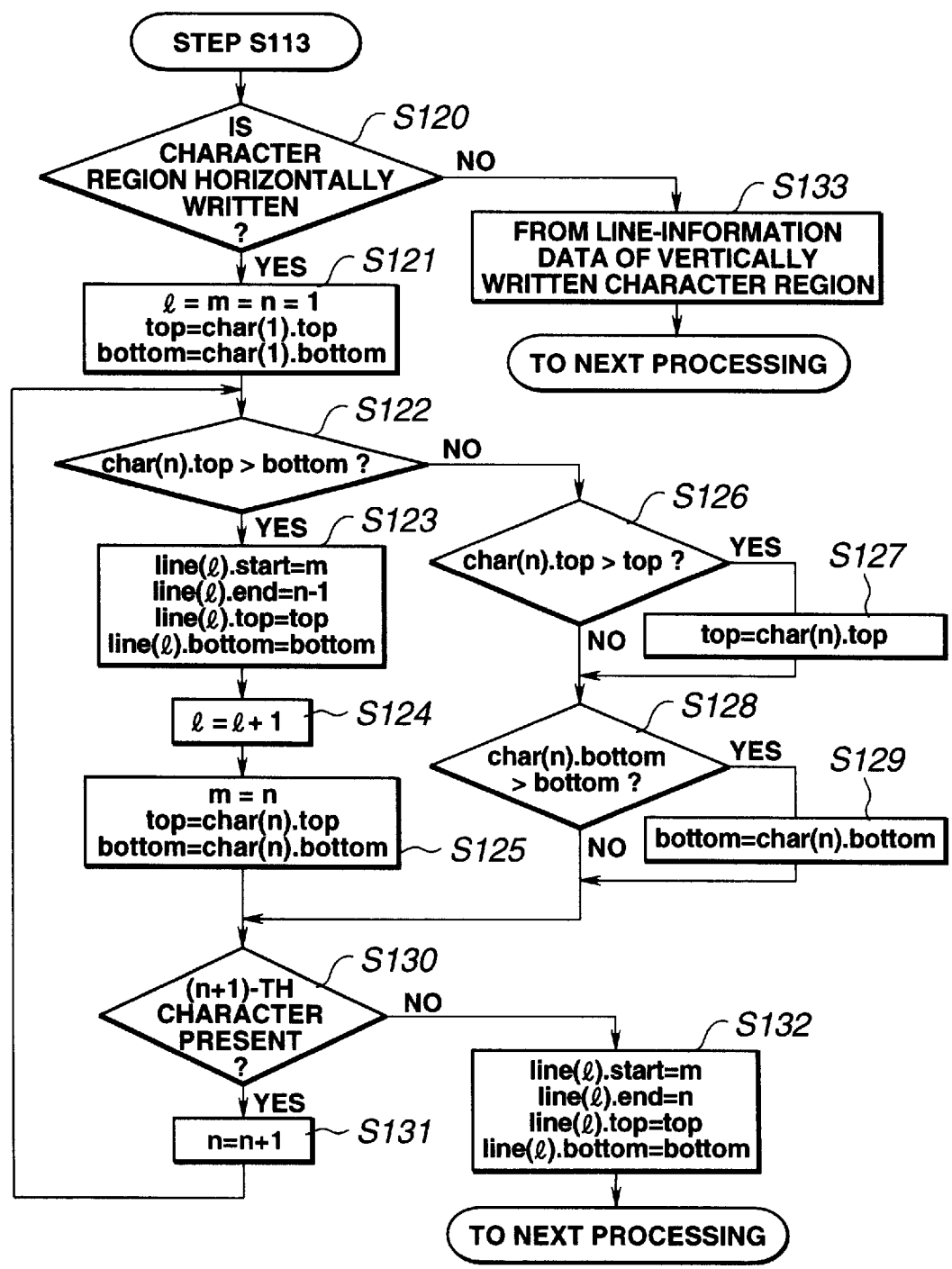
FIG. 40 is a flowchart illustrating the detail of processing of forming line-information data.

Operations of the processing of forming line-information data (step S113) in the above-described character-string selection processing will now be described in more detail with reference to the flowchart shown in FIG. 40.

It is assumed that in the coordinate system, the rightward direction is positive in the horizontal direction, and the downward direction is positive in the vertical direction. The upper position and the lower position of the i-th character in the character-string information are represented by char(i) and top, respectively. The numbers of the leading character and the trailing character in the i-th line of line-information data to be formed are represented by line(i).start and line(i).end, and the upper position and the lower position of the i-th line are represented by line(i).top and line(i).bottom, respectively. A line-number counter and character-number counters are represented by l, and m and n, respectively, and the upper position and the lower position of the line being extracted are represented by top and bottom, respectively.

First, it is determined if the direction of the set of the character region is horizontal (step S120). If the result of the determination is affirmative, the counters l, m and n are initialized to 1, and the top and bottom are initialized to char(l).top and char(l).bottom, respectively (step S121). Then, it is determined if the char(n).top is present below the bottom (step S122). If the result of the determination is affirmative, the character is assumed to be in the next line, and the m, n−1, top, and bottom are substituted for the line(l).start, line(l).end, line(l).top, and line(l).bottom, respectively (step S123).

Then, in order to extract the next line information, the value of the l is incremented by one (step S124), and the n, char(n).top, and char(m).bottom are substituted for the m, top, and bottom, respectively (step S125).

If the result of the determination in step S122 is negative, the character is assumed to be still in the same line, and it is determined if the char(n).top is present above the top (step S126). The char(n).top is substituted for the top only when the char(n).top is present above the top (step S127). The char(n).bottom is substituted for the bottom only when the char(n).bottom is present below the bottom (step S129).

In step S130, it is determined if the (n+1)-th character is present in the character region. If the result of the determination is affirmative, the value of the n is incremented by one in order to check the next character (step S131), and the process returns to step S122. The processing from step S122 to step S131 is repeated until the last character is checked. If the result of the determination in step S130 is negative, the m, n, top, and bottom are substituted for the line(l).start, line(l).end, line(l).top, and line(l).bottom, respectively (step S132), and the process returns to step S114 shown in FIG. 39.

If the result of the determination in step S120 is negative, i.e., if the direction of the set of the character region is not horizontal, line-information data of a vertically-written character region is formed (step S133), and the process proceeds to the step S114 shown in FIG. 39. Since the processing in step S133 can be performed in the same manner as in the processing of forming line-information data of a horizontally-written character region from step S121 to step S132, a further description thereof will be omitted.

Figures 41, 42, 43:
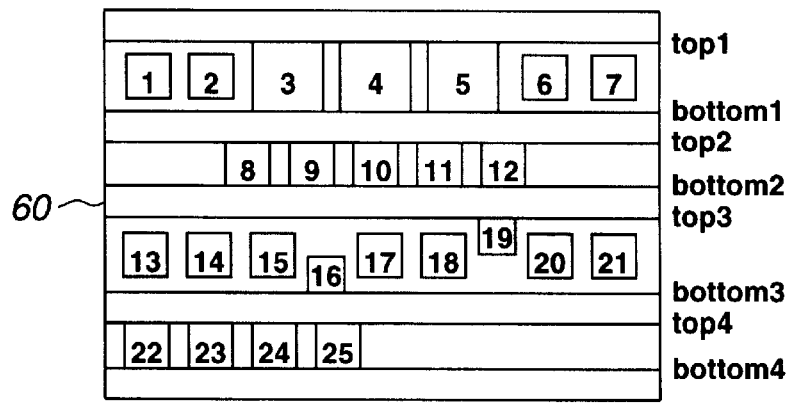
FIG. 41 is a diagram illustrating an example of the configuration of line-information data.
FIGS. 42 and 43 are diagrams illustrating line-information data in a horizontally-written character region.

FIG. 41 illustrates the configuration of line-information data formed according to the above-described processing of forming line-information data. As shown in FIG. 41, line information of each line comprises the numbers of the leading character and the last character in the line, and the upper position and the lower position of the line. Such information is provided for all lines.

FIGS. 42 and 43 are diagrams illustrating line-information data actually formed from a horizontally-written character region. FIG. 42 illustrates a state in which, in a character region 60 having horizontally written 25 characters, characters from the 1st character to the 7-th character, characters from the 8-th character to the 12-nd character, characters from the 13-th character to the 21-st character, and characters from the 22-nd character to the 25-th character are extracted as lines, and the upper positions and the lower positions of the respective lines are extracted as top1 through top4, and bottom1 through bottom4, respectively. FIG. 43 illustrates the contents of line-information data formed from the character region shown in FIG. 42.

Figure 44:
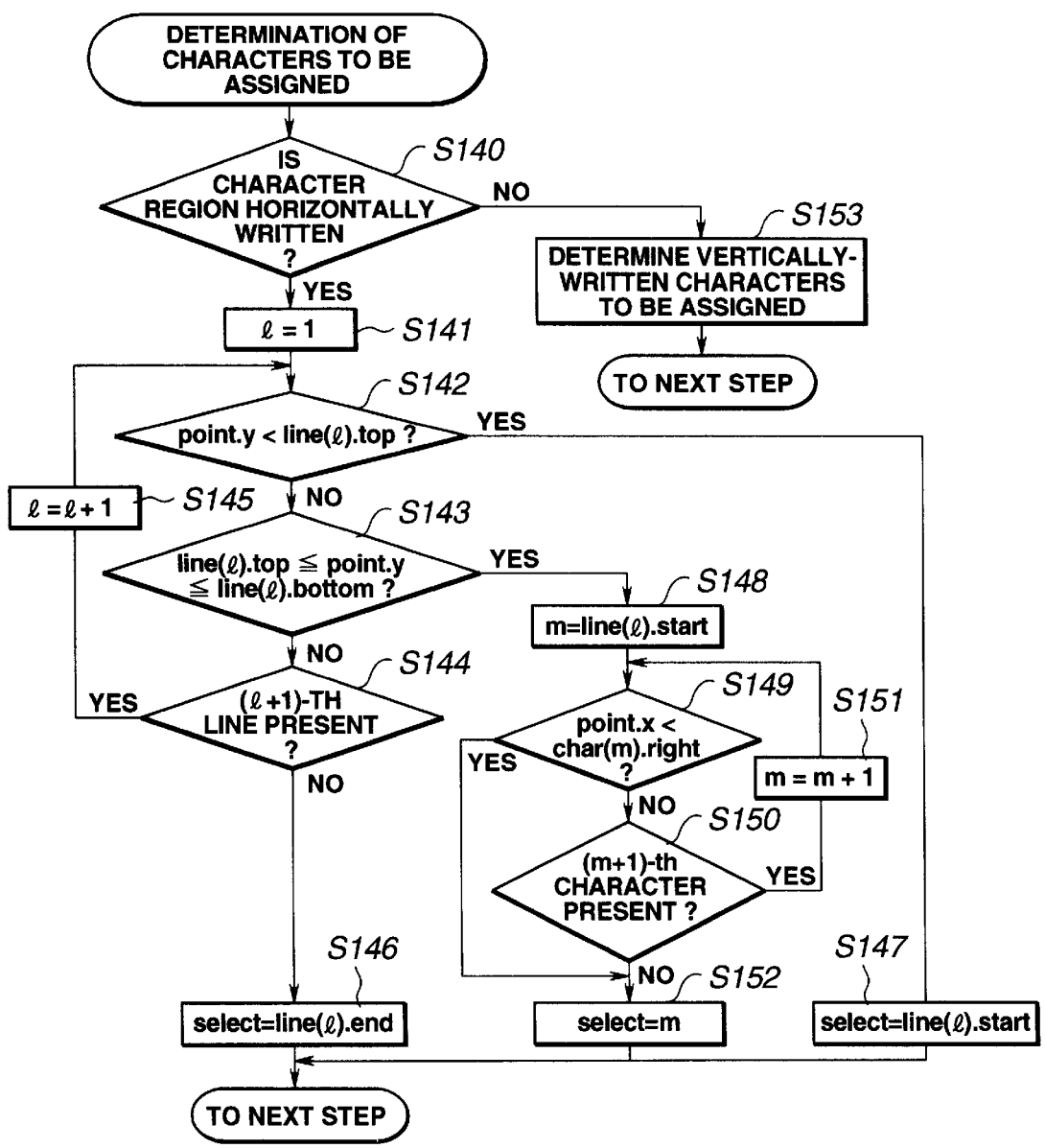
FIG. 44 is a flowchart illustrating the detail of processing of determining characters to be assigned.

Next, operations of processing of determining assigned characters in steps S114 through S116 in the above-described character-string selection processing (see FIG. 39) will be described in more detail with reference to the flowchart shown in FIG. 44.

In the present embodiment, the left position and the right position of the i-th character in the character-string information are represented by char(i).left and char(i).right, respectively. The position of the pointing device is represented by point.x and point.y, and the number of the determined character is represented by select. Other symbols are the same as those in the flowchart shown in FIG. 40.

First, it is determined if the direction of the set of the character region is horizontal (step S140). If the result of the determination is affirmative, the value of the l is set to 1 (step S141). Then, it is determined if the point.y is present above the line(l).top (step S142). If the result of the determination is negative, it is then determined if the point.y is present between the line(l).top and the line(l).bottom (step S143).

If the result of the determination in step S143 is negative, it is then determined if the (l+1)-th line is present (step S144). If the result of the determination in step S144 is affirmative, the value of the l is incremented by one in order to check the next line (step S145), and the process returns to step S142. The processing from step S142 to step S145 is repeated until the last line is checked. When the point.y is present below the last line, the number of the last character line(l).end of the character region is substituted for the select (step S146), and the process proceeds to the next step.

If the result of the determination in step S142 is affirmative, i.e., if the point.y is present above the line(l).top, the number of the first character line(l).start of the character region is substituted for the select (step S147), and the process proceeds to the next step.

If the result of the determination in step S143 is affirmative, i.e., if the point.y is present between the line(l).top and the line(l).bottom, the line(l).start is substituted for the m (step S148), and it is then determined if the point.x is present at the left of the char(m).right (step S149). If the result of the determination is negative, it is then determined if the (m+1)-th character is present in the l-th line (step S150). If the result of the determination in step S150 is affirmative, the value of the m is incremented by one in order to check the next character (step S151), and the process returns to step S149. The processing from step S149 to step S151 is repeated until the last character of the line is checked.

If the result of the determination in step S149 is affirmative, i.e., if the point.x is present at the left of the char(m).right, or if the result of the determination in step S150 is negative, i.e., if the (m+1)-th character is absent in the l-th line, the m is substituted for the select (step S152), and the process proceeds to the next step (processing succeeding the processing of determining assigned characters shown in FIG. 39).

If the result of the determination in step S140 is negative, i.e., if the direction of the set is not horizontal, characters to be assigned are determined to be in a vertically written character region (step S153), and the process proceeds to the next step. Since the processing of step S153 can be performed in the same manner as in the above-described processing of determining characters to be assigned in a horizontally written character region from step S141 to step S152, a further description thereof will be omitted.

Figure 45:
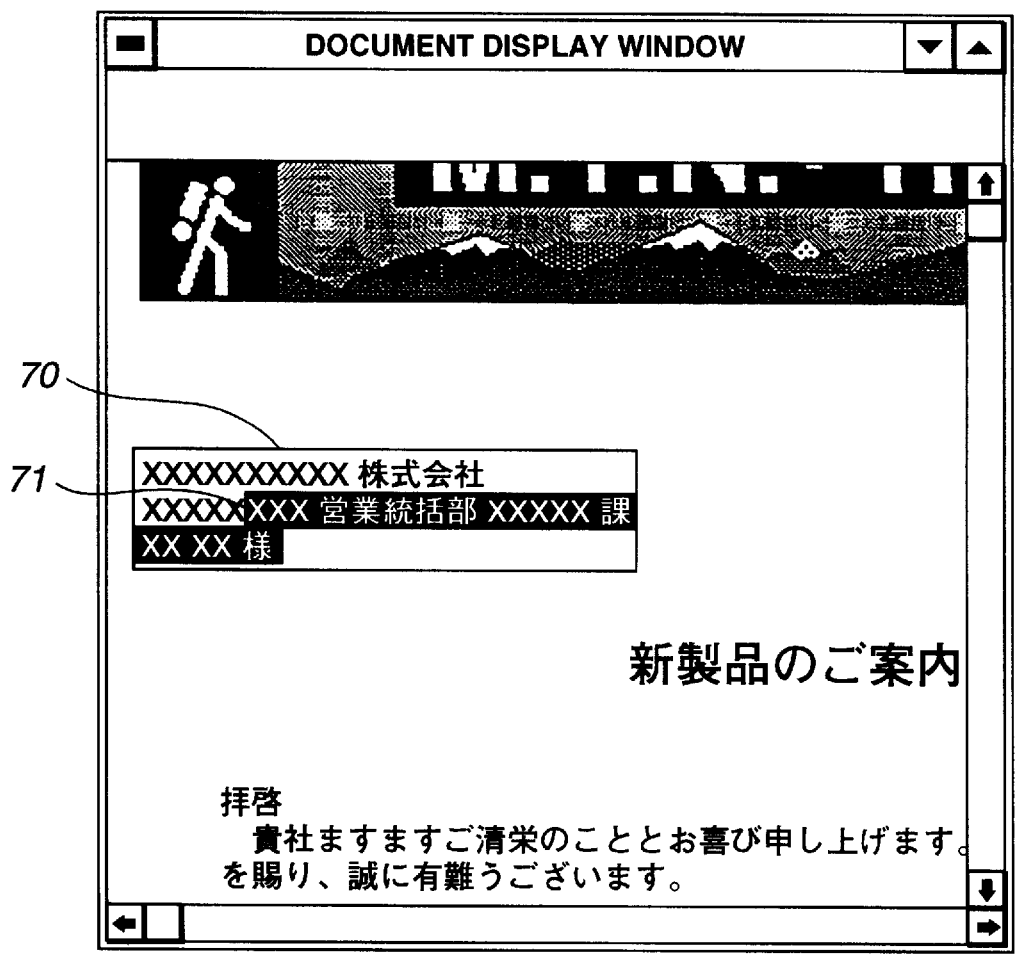
FIG. 45 is a diagram illustrating a display picture surface for character-string selection processing.

FIG. 45 illustrates an example of a display picture surface of the above-described character-string selection processing. FIG. 45 illustrates a state in which the operator assigns a character string in a range 71 within a character region 70 on the display picture surface of image data of a document.

As described above, according to the present embodiment, character-information data is formed from extracted character-region information and character-string information, the formed data is stored so as to correspond to image data and character-information data of the document, two points are assigned on the displayed image data of the document, characters at the assigned points are determined by forming line-information data within the character region including the assigned points, a region of lines between the determined two characters is subjected to reversal display, and a character string between the determined two characters is acquired. Thus, selection of characters from character strings in the document can be easily performed without newly searching and selecting a character string to be selected on the display picture surface of character strings of the document.

By determining a specific character region and selecting an arbitrary character string within the character region, the arbitrary character string can be easily selected without selecting a character string which is meaningless as a sentence extending over different character regions.

First Modification

A description will now be provided of a first modification of the above-described eighth embodiment.

Figure 46:
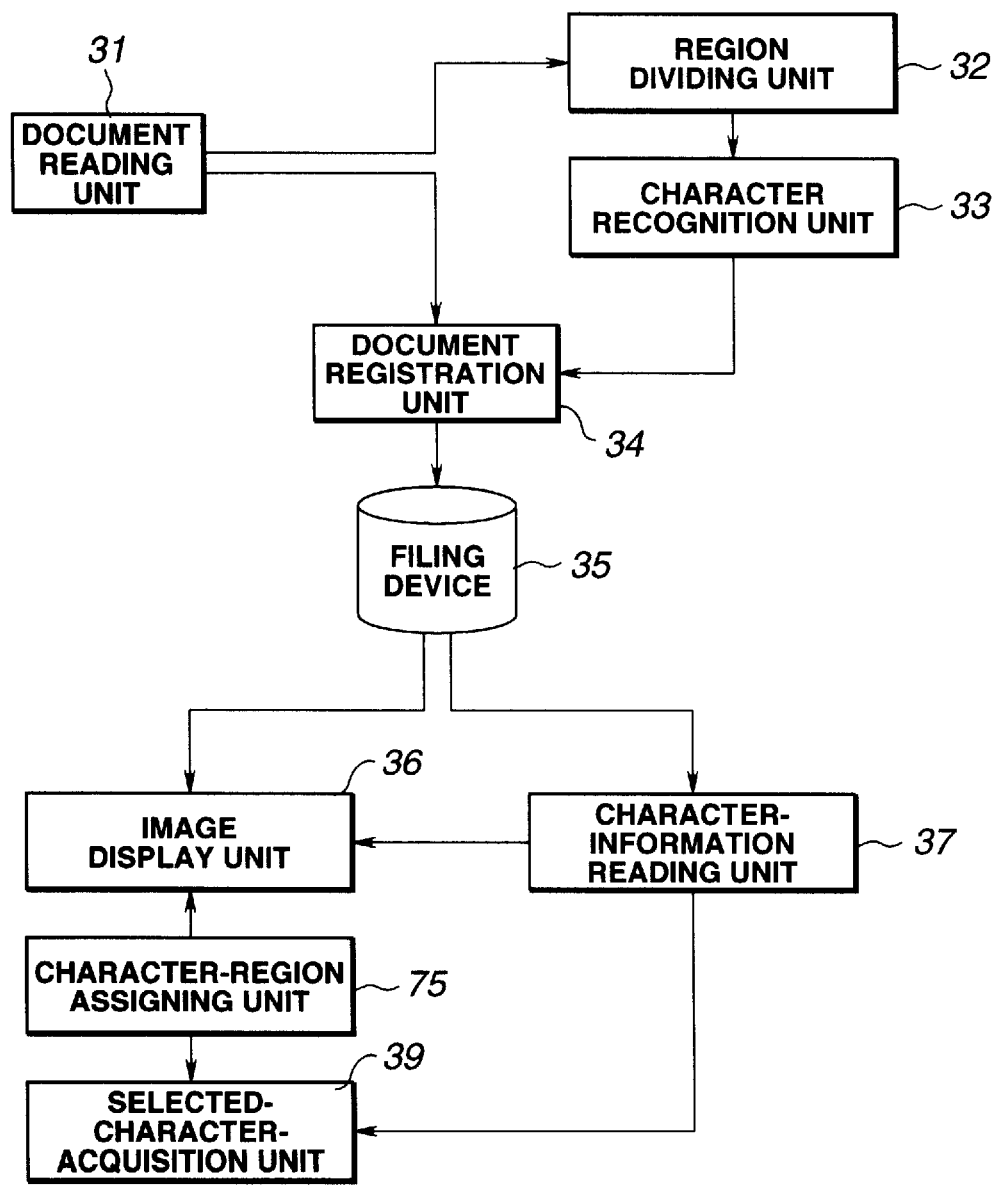
FIG. 46 is a functional block diagram illustrating the configuration of an apparatus according to a first modification of the eighth embodiment.

FIG. 46 is a functional block diagram illustrating the configuration of an electronic filing apparatus of the first modification. In FIG. 45, the same components as in the eighth embodiment shown in FIG. 33 are indicated by the same reference numerals, and a brief description thereof will be provided.

In FIG. 46, a region dividing unit 32 extracts region information comprising the horizontal position and the vertical position of the upperleft corner, and the width and the height of each character region. A character recognition unit 33 supplies a document registration unit 34 with region information and character strings of each character region. An image display unit 36 displays image data of a document and the frame of each character region in the document. When a specific position on the display picture surface of the image display unit 36 is assigned, the image display unit 36 receives the assigned position from a character-region assigning unit 75, and performs emphasis display of the frame of a character region including the assigned position.

Next, a description will be provided of operations of document registration processing in the electronic filing apparatus of the first modification having the above-described configuration with respect to the flowchart shown in FIG. 47.

First, the processing is started in response to an instruction to start the processing by the operator, and image data of a document read by a scanner device or the like in a memory (step S161). The read image data is divided into regions, and region information, comprising the horizontal position and the vertical position of the upperleft corner, and the width and the height of each character region of the image data of the document, is extracted (step S162).

Since the region division processing is the same as that described in the fifth embodiment, a further description thereof will be omitted.

Then, character recognition is performed for image data of each extracted region to extract character strings described in the character region, and character-information data comprising region information and character strings of each character region is formed (step S163). The character-information data of the document formed in step S163 is registered in a data base together with other document control information, comprising the number of pages, the date of registration and the like, so as to correspond to the image data of the document (step S164), and the process is terminated.

Since document display processing in the first modification is the same as the processing in the eighth embodiment shown in FIG. 38, a further description thereof will be omitted.

Figure 49:
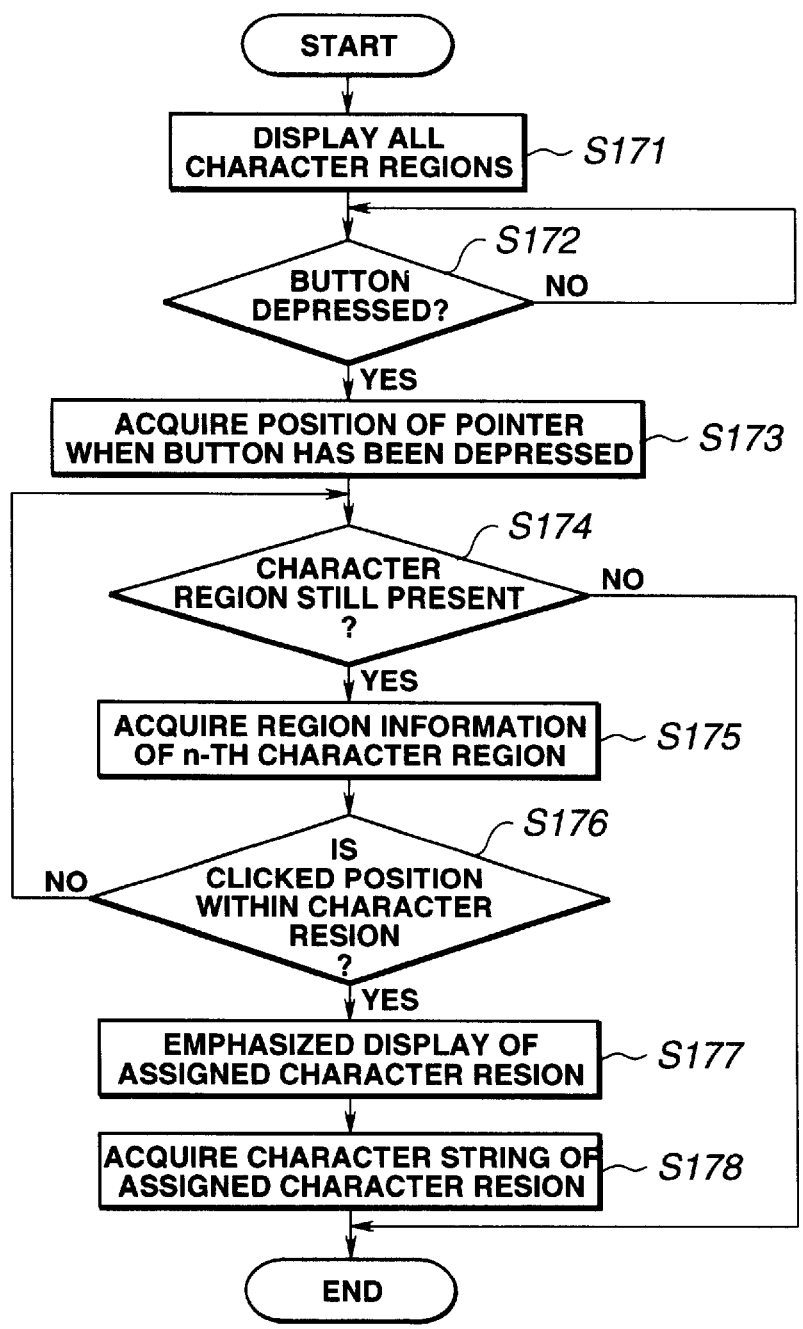
FIG. 49 is a flowchart illustrating processing of selecting a character string in a document.

Next, a description will be provided of operations of processing of selecting a character string of the document in the electronic filing apparatus having the configuration shown in FIG. 46, with reference to the flowchart shown in FIG. 49.

First, the processing is started in response to an instruction to start the processing by the operator, and rectangular frames of all character regions are displayed while being superposed on the image data of the document based on the region information of the character regions of the character-information data read in the document display processing (step S171). Then, it is determined if the operator has depressed the button of a pointing device by adjusting the position of a pointer to a desired position on the display picture surface of the image data of the document (step S172). If the result of the determination is negative, the processing of step S172 is repeated until the operator depresses the button.

If the result of the determination in step S172 is affirmative, the depressed position of the button is acquired in a buffer selectPoint (step S173).

Then, it is determined if character-information data which is not yet subjected to processing starting from step S174 (to be described) is present (step S174). If the result of the determination is affirmative, i.e., if unprocessed character-information data is present, region information of the first character region is acquired (step S175), and it is then determined if the character region, having the horizontal position, the vertical position, the width and the height, includes the selectPoint (step S176).

If the result of the determination in step S176 is negative, the process returns to step S174, and the processing from step S174 to step S176 is repeated for the next character region. When region information of the last character region has been checked, the process is terminated.

If the result of the determination in step S176 is affirmative, the frame of that character region is subjected to emphasis display (step S177), character strings in that character region is acquired (step S178), and the process is terminated.

Figure 50:
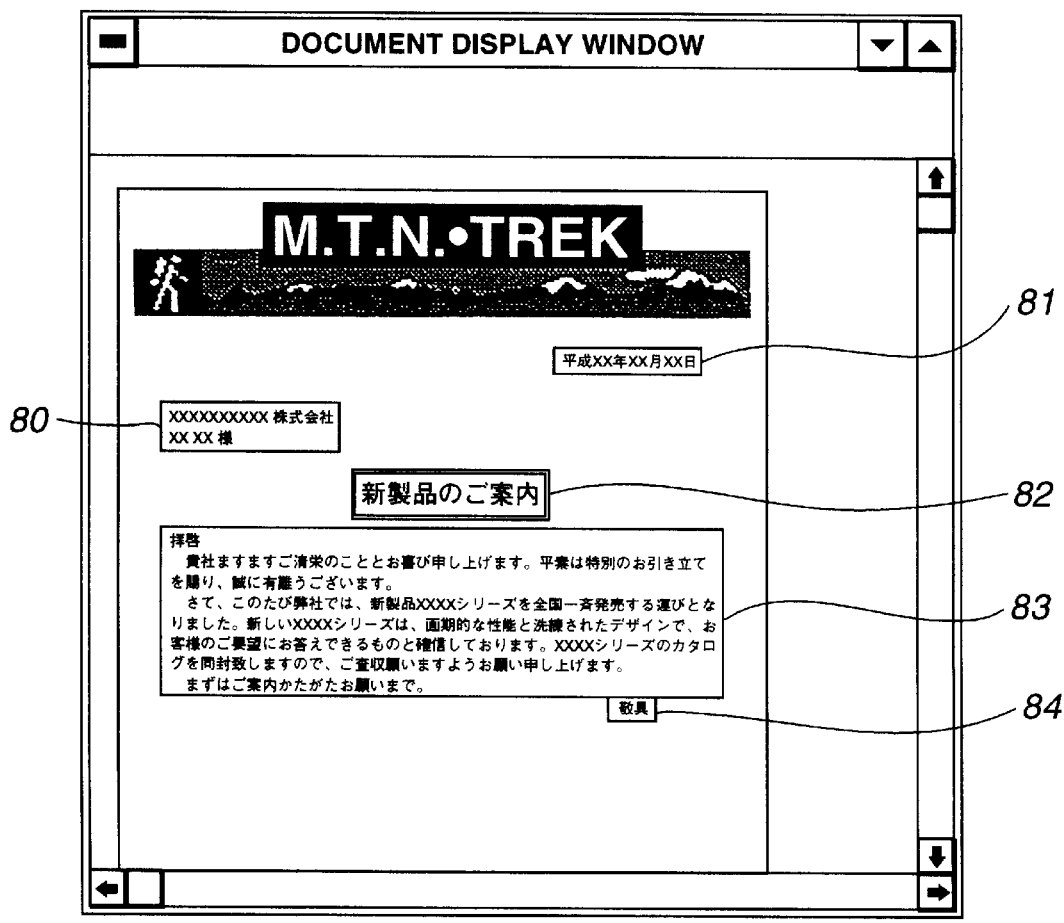
FIG. 50 is a diagram illustrating a display picture surface for character-string selection processing.

FIG. 50 illustrates an example of a display picture surface of the above-described character-string selection processing. In FIG. 50, frames 80, 81, 82, 83 and 84 indicating character regions are displayed on the image data of the document. When the operator assigns a character region 82, that character region is subjected to emphasis display, and a character string in that character region is selected.

As described above, in the first modification, positional information of character regions of a document and character strings described in the character regions are extracted, the frame of a character region assigned by the operator using a pointing device is subjected to emphasis display on a picture surface on which image data of the document and the frames of character regions are displayed while being superposed, and character strings of the assigned character region are acquired. Hence, selection of characters from a character string on the display picture surface of the image data of the document can be easily performed without newly searching and selecting the character string to be selected on the display picture surface of character strings of the document.

Since a character string can be selected for each character region, selection of characters of a meaningful sentence can be easily performed.

Second Modification

A description will now be provided of a second modification of the eighth embodiment.

Figure 51:
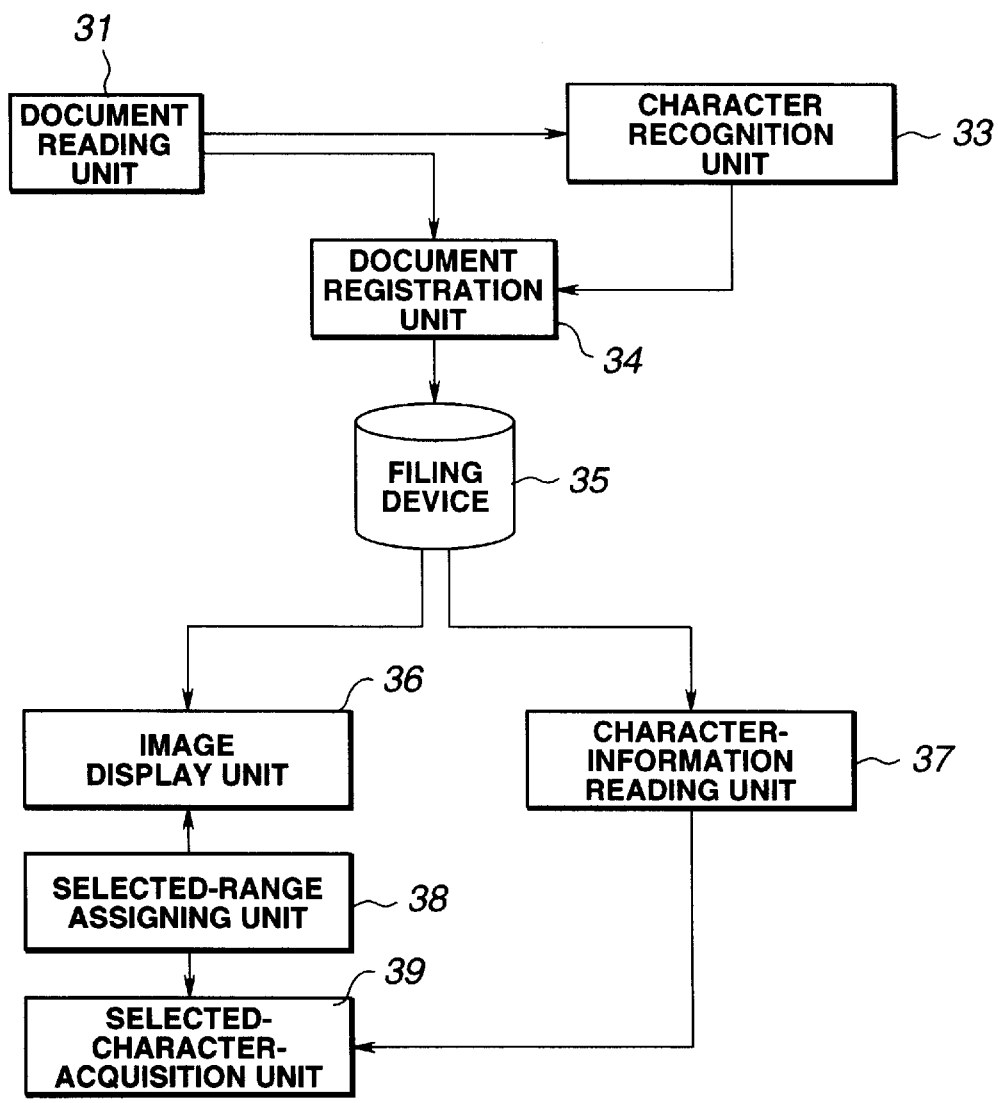
FIG. 51 is a functional block diagram illustrating the configuration of an apparatus according to a second modification of the eighth embodiment.

FIG. 51 is a functional block diagram illustrating the configuration of an electronic filing apparatus according to the second modification. In the electronic filing apparatus shown in FIG. 51, the same components as in the eighth embodiment shown in FIG. 33 are indicated by the same reference numerals, and a brief description thereof will be provided.

In FIG. 51, a character recognition unit 33 receives image data of a document from a document reading unit 31, performs character recognition for the image data, extracts character strings described in the document and positional information comprising the position and the size of image data of each character, and supplies a document registration unit 34 with the extracted character strings and positional information.

The document registration unit 34 receives the image data of the document, and the character strings and the positional information from the document reading unit 31 and the character recognition unit 33, respectively, and registers the received data in a filing device 35 together with other document control information so as to correspond to each other.

A character-information reading unit 37 reads the character strings and the positional information from the filing device 35, and supplies a selected-character acquisition unit 39 with the received data. An image display unit 36 reads the image data of the document from the filing device 35, and displays the read image data. When the operator selects a specific region, the image display unit 36 receives positional information of the selected region from a selected-range assigning unit 38, and displays the frame of that region while superposing it on the image data of the document.

The selected-range assigning unit 38 supplies the image display unit 36 and a selected-character acquisition unit 39 with the positional information of the selected range assigned by the operator. The selected-character acquisition unit 39 receives the character strings and the positional information of the document and character-string information, and the positional information of the selected range from the character-information reading unit 37 and the selected-range assigning unit 38, respectively, and acquires character strings of the selected range from the character strings of the document.

Figures 52, 53:
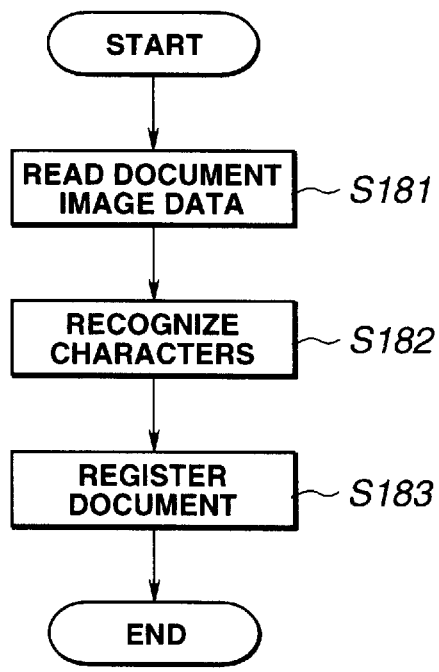
FIG. 52 is a flowchart illustrating document registration processing in the second modification of the eighth embodiment.
FIG. 53 is a diagram illustrating an example of character-information data of a document.

A description will now be provided of operations of document registration processing in the electronic filing apparatus of the second modification having the above-described configuration with reference to the flowchart shown in FIG. 52.

First, the processing is started in response to an instruction to start the processing by the operator, and image data of a document read by a scanner device or the like is stored in a memory (step S181). Character recognition is performed for the read image data, character strings described in the document and the image region of each character are extracted, and character-information data of the document, comprising character codes, the horizontal position and the vertical position of the upperleft corner, and the width and the height of the image region of each character, as shown in FIG. 53, is formed (step S182).

Conventionally, in the above-described character recognition processing, the image region of each character is extracted according to processing called character segmenting, character recognition is performed for image data of the image region of the character, and the character code of the character is extracted. However, a detailed description of such character recognition methods will be omitted.

Then, the character-information data of the document formed in step S182 is registered in the data base together with other document control information, comprising the number of pages, the date of registration and the like, so as to correspond to each other (step S183), and the process is terminated.

Since document display processing of the second modification is the same as the above-described document display processing in the eighth embodiment shown in FIG. 38, a further description thereof will be omitted.

Figure 54:
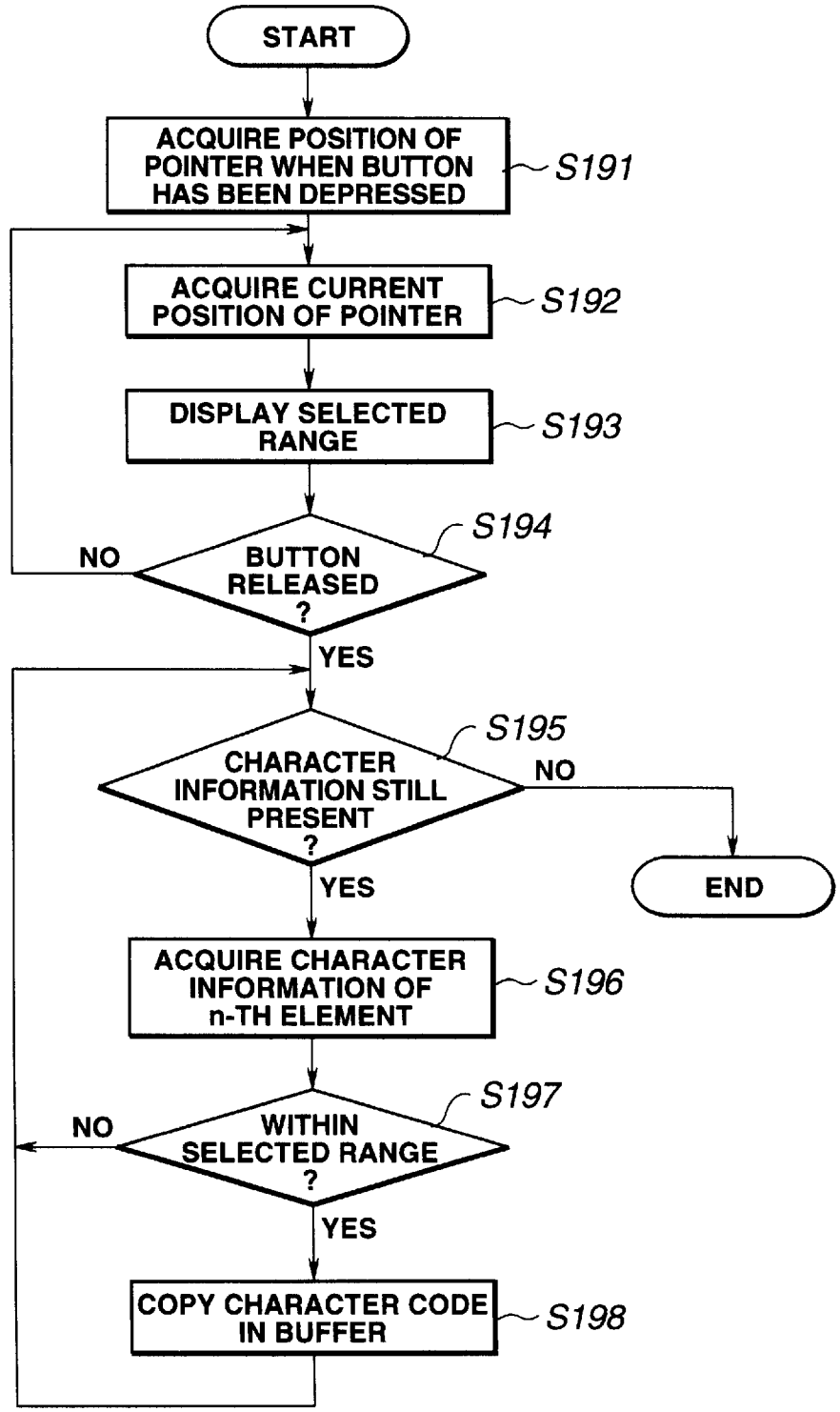
FIG. 54 is a flowchart illustrating processing of selecting a character string in a document in the second modification of the eighth embodiment.

Operations of processing of selecting character strings of the document in the electronic filing apparatus of the second modification will now be described with reference to the flowchart shown in FIG. 54.

First, the operator starts the processing by depressing the button of a pointing device while adjusting the position of a pointer to a desired position on the display picture surface of the image data of the document according to the document display processing. The horizontal position and the vertical position of the pointer at that time are acquired in buffers startPos.x and startPos.y, respectively (step S191). Then, the operator moves that position while depressing the button of the pointing device to acquire the horizontal position and the vertical position of the pointer at that time in buffers endPos.x and endPos.y, respectively (step S192). The frame of a rectangular region formed by the startPos.x, startPos.y, endPos.x and endPos.y is displayed while being superposed on the image data of the document (step S193).

Then, whether or not the operator has released the button of the pointing device is determined (step S194). If the result of the determination is negative, the process returns to step S192, and the processing from step S192 to step S194 is repeated until the operator releases the button.

If the result of the determination in step S194 is affirmative, it is determined if data not yet subjected to processing starting from step S195 (to be described) is present in the character-information data read by the document display processing (step S195). If the result of the determination in step S195 is affirmative, character information of the first element is acquired in a structure textInfo comprising the character code, the horizontal position, the vertical position, the height and the width of the character (step S196).

Then, it is determined if the region of the character having the above-described horizontal position, vertical position, height and width is completely included in the selected region comprising the startPos.x, startPos.y, endPos.x and endPos.y (step S197). If the result of the determination is affirmative, the character code of that character is copied to a buffer "string" (step S198), and the process returns to step S195.

If the result of the determination in step Step S197 is negative, no processing is performed, and the process returns to step S195. The above-described processing from step S195 to step S198 is repeated for all elements in the character-information data. When the last element has been checked, the process is terminated. At that time, character codes of all characters completely included in the selected region have been acquired in the "string".

Figure 55:
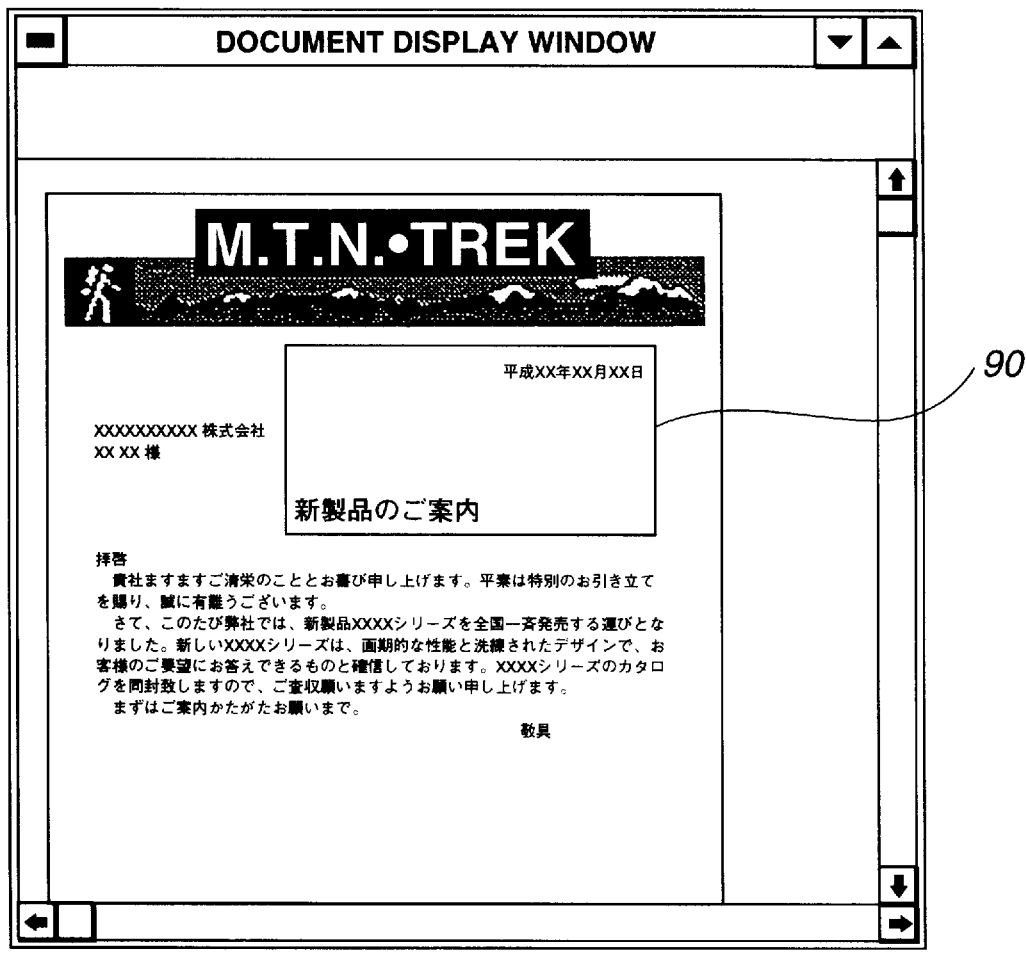
FIG. 55 is a diagram illustrating a display picture surface in character-string selection processing.
Figure 56:
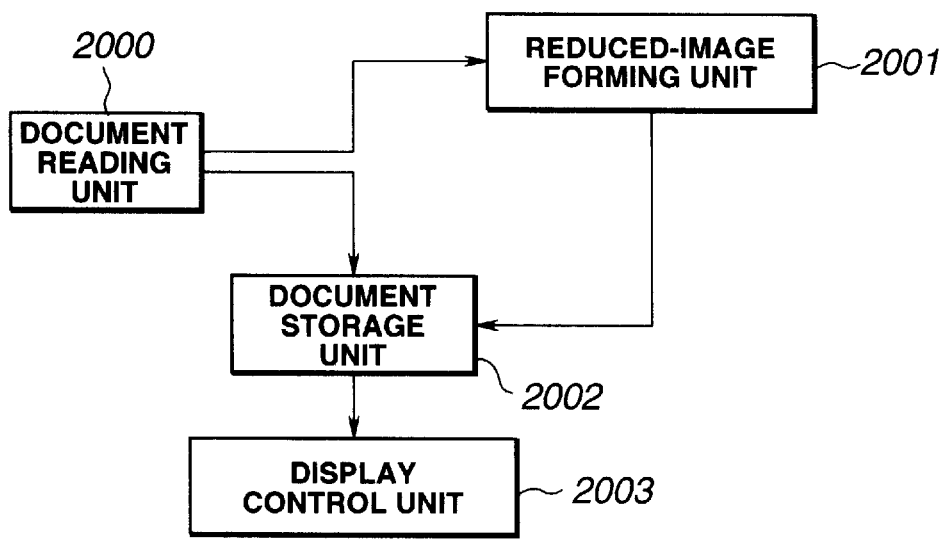
FIG. 56 is a functional block diagram illustrating the configuration of a conventional electronic filing apparatus.
Figure 57:
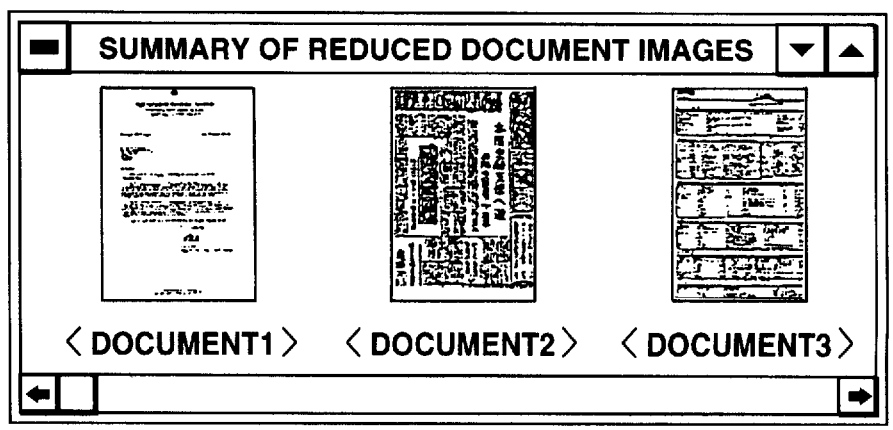
FIG. 57 is a diagram illustrating display of a summary of reduced document images in the conventional apparatus shown in FIG. 56.
Figure 58:
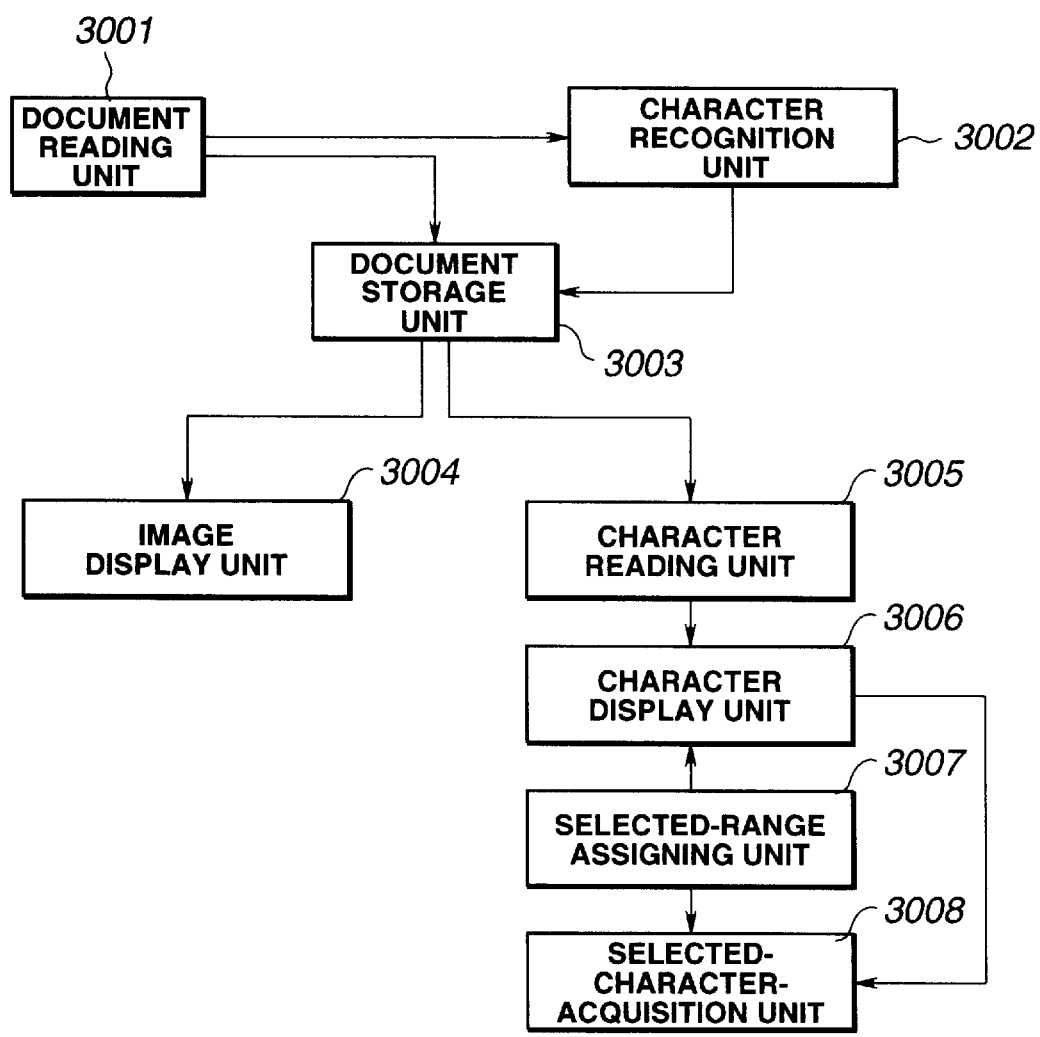
FIG. 58 is a functional block diagram illustrating the configuration of another conventional electronic filing apparatus.
Figure 59:
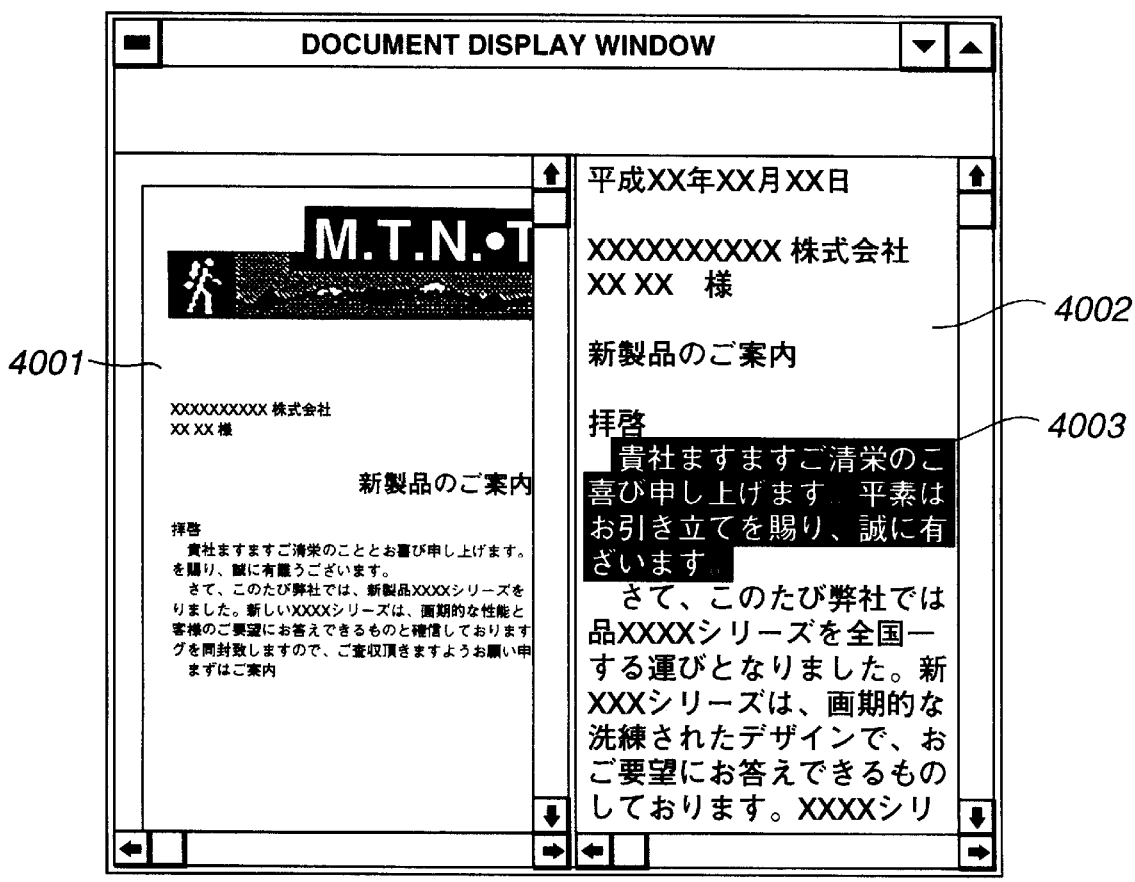
FIG. 59 is a diagram illustrating a display picture surface of a document in the conventional electronic filing apparatus shown in FIG. 58.

FIG. 55 illustrates an example of the display picture surface in the above-described character-string selection processing. FIG. 55 illustrates a state in which the operator assigns a region 90 on the display picture surface of image data of a document, and character strings within that region are selected.

As described above, by performing character recognition from image data of a document, extracting character strings of the document and positional information of the image region of each character, and acquiring a selected character from positional information and character information of a selected region on a display picture surface of the image data of the document, a character string of the document can be directly selected on the display picture surface of the image data of the document without newly searching and selecting the character string to be selected on the display picture surface of the image data of the document, and selection of a character from character strings described in the document can be easily performed.

The present invention may be applied to a system comprising a plurality of apparatuses, or to an apparatus comprising a single unit. The present invention may, of course, be applied to a case in which the object of the invention is achieved by supplying a system or an apparatus with programs.

The individual components designated by blocks in the drawings are all well known in the image processing method and apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method comprising the steps of:
   inputting a document image;
   extracting a specific character region from the document image in accordance with image characteristics of the document image;
   registering information relating to the document image together with the document image such that the information relating to the document image corresponds to the document image, the information relating to the document image comprising information derived from data within the specific character region; and
   reading the document image in accordance with an assignment of the information relating to the document image.

2. A method according to claim 1, wherein the specific character region comprises a region of a first character image which is extracted from the document image.

3. A method according to claim 1, wherein the specific character region comprises a character region having a largest average character size from among a plurality of character-string regions extracted from the document image.

4. A method according to claim 1, wherein the specific character region comprises a region which includes characters of a character size having a largest frequency of appearance among a plurality of characters extracted from the document image.

5. A method according to claim 1, wherein an image of the specific character region is subjected to character recognition, and wherein a result of the character recognition is used as the information relating to the document image.

6. A method according to claim 1, wherein said registering step registers in a filing device.

7. A method according to claim 1, wherein said read document image is printed.

8. An apparatus according to claim 1, wherein said read document image is displayed.

9. A method according to claim 1, wherein said input image is input by a scanner.

10. An image processing apparatus comprising:
    image input means for inputting a document image;
    image registration means for registering information relating to the document image together with the document image such that the information relating to the document image corresponds to the document image;
    image reading means for reading the information registered by said image registration means in accordance with an assignment of the information registered by said image registration means; and
    specific-character-region extraction means for extracting a specific character region from the document image in accordance with image characteristics of the document image, wherein information derived from data within the specific character region is among the information relating to the document image.

11. An apparatus according to claim 10, wherein the specific character region extracted by said specific-character-region extraction means comprises a region of a first character image which is extracted from the document image.

12. An apparatus according to claim 10, wherein the specific character region extracted by said specific-character-region extraction means comprises a character region having a largest average character size from among a plurality of character-string regions extracted from the document image.

13. An apparatus according to claim 10, wherein the specific character region extracted by said specific-character-region extraction means comprises a region including characters of a character size having a largest frequency of appearance from among a plurality of characters extracted from the document image.

14. An apparatus according to claim 10, further comprising:
    character recognition means for performing character recognition of the image of the specific character region extracted by said specific-character-region extraction means,
    wherein a result of recognition performed by said character recognition means comprises the information relating to the document image.

15. An apparatus according to claim 10, wherein said image registration means registers in a filing device.

16. A method according to claim 10, wherein said read document image is printed.

17. An apparatus according to claim 10, wherein said read document image is displayed.

18. An apparatus according to claim 10, wherein said input image is input by a scanner.

19. An image processing method comprising the steps of:
reading a document image;
detecting a character string in a specific character region of the document image in accordance with image characteristics of the document image;
performing character recognition on a character string of the specific character region detected in said detecting step; and
registering the character string recognized in said character recognition step together with the document image read in said reading step such that the character string corresponds to the document image.

20. A method according to claim 19, wherein in said step of detecting the specific character region, a character region present at a leftend column and at an uppermost side in character regions within the document image is detected as the specific character region.

21. A method according to claim 19, wherein in said step of detecting the specific character region, a character region including characters having a largest average character size in a plurality of character regions is detected as the specific character region.

22. A method according to claim 19, wherein said registering step registers in a filing device.

23. A method according to claim 19, wherein said read image is input by a scanner.

24. A method according to claim 19, further comprising reading the document image in accordance with an assignment of the character string.

25. A method according to claim 24, wherein said read document image is printed.

26. A method according to claim 24, wherein said read document image is displayed.

27. An image processing apparatus comprising:
reading means for reading a document image;
detection means for detecting a character string in a specific character region of the document image in accordance with image characteristics of the document image;
recognition means for performing character recognition on a character string of the specific character region detected by said detection means; and
registration means for registering a character string together with the document image read in said reading means such that the character string corresponds to the document image.

28. An apparatus according to claim 27, wherein said detection means detects a character region present at a leftend column and at an uppermost side in character regions within the document image as the specific character region.

29. An apparatus according to claim 27, wherein said detection means detects a character region including characters having a largest average character size in a plurality of character regions as the specific character region.

30. An apparatus according to claim 27, wherein said registration means registers in a filing device.

31. An apparatus according to claim 27, wherein said read image is input by a scanner.

32. An apparatus according to claim 27, further comprising reading the document image in accordance with an assignment of the character string.

33. An apparatus according to claim 32, wherein said read document image is printed.

34. An apparatus according to claim 32, wherein said read document image is displayed.

35. An image processing method comprising the steps of:
recognizing characters included in an input image;
extracting words from the characters recognized in said recognizing step;
determining a frequency of appearance of each of the words extracted in said extracting step; and
registering a word having a high frequency of appearance together with the input image such that the registered word corresponds to the input image.

36. A method according to claim 35, wherein the word having a high frequency of appearance is a word which comprises a specific part of speech.

37. A method according to claim 36, wherein the specific part of speech is a noun.

38. A method according to claim 35, wherein a summary of words is registered together with the input image and is displayed in response to an instruction.

39. A method according to claim 35, wherein a word assigned to be retrieved is registered together with the input image, and wherein image information of the word assigned to be retrieved is read and output.

40. A method according to claim 35, wherein the input image comprises an image input from a scanner.

41. A method according to claim 35, wherein said registering step registers in a filing device.

42. A method according to claim 35, wherein said input image is input by a scanner.

43. A method according to claim 35, further comprising reading the image in accordance with an assignment of the registering word.

44. A method according to claim 43, wherein said document image is printed.

45. A method according to claim 43, wherein said document image is displayed.

46. An image processing apparatus comprising:
recognition means for recognizing characters included in an input image;
word extraction means for extracting words from the characters recognized by said recognition means;
appearance-frequency determination means for determining a frequency of appearance of each of the words extracted by said word extraction means; and
registration means for registering words having high frequencies of appearance together with the input image such that the registered word corresponds to the input image.

47. An apparatus according to claim 46, wherein said word extraction means extracts words which comprise a specific part of speech in the input image.

48. An apparatus according to claim 46, wherein said word extraction means extracts nouns.

49. An apparatus according to claim 46, wherein a summary of the words having high frequencies of appearance registered by said registration means together with the input image is displayed in response to an instruction.

50. An apparatus according to claim 46, further comprising:
retrieval assigning means for assigning retrieval of a word;
retrieval means for retrieving the word assigned to be retrieved by said retrieval assigning means from the words having high frequencies of appearance registered by said registration means; and output means for, when a word corresponding to the word assigned to be retrieved by said retrieval means has been found, reading and outputting image information registered together with the word corresponding to the word assigned to be retrieved.

51. An apparatus according to claim 46, wherein the input image is input using a scanner.

52. An apparatus according to claim 46, wherein said registration means registers in a filing device.

53. An apparatus according to claim 46, wherein said input image is input by a scanner.

54. An apparatus according to claim 46, further comprising reading the image in accordance with an assignment of the registering word.

55. An apparatus according to claim 54, wherein said document image is printed.

56. An apparatus according to claim 54, wherein said document image is displayed.

57. An image processing method comprising the steps of:
inputting an image;
identifying a size of each character present in the image;
extracting images of characters in accordance with sizes identified in said identifying step; and
registering the images of characters extracted in said extracting step together with the image such that the images of characters correspond to the input image.

58. A method according to claim 57, wherein the images of characters selected in said selecting step comprise characters having sizes greater than a reference size determined according to character sizes identified from the image information.

59. A method according to claim 57, wherein registered image information is used as a data base.

60. A method according to claim 57, wherein character codes obtained by recognizing the images of characters selected in said selecting step are used as the keywords.

61. A method according to claim 57, wherein the keywords are used in units of a character string.

62. A method according to claim 57, wherein the images of characters selected in said selecting step are selected again in accordance with a predetermined limit for a number of keywords.

63. A method according to claim 57, wherein the images of characters selected in said selecting step are selected in a descending order based on an identified size of the characters.

64. A method according to claim 57, wherein the keywords comprise a file name.

65. A method according to claim 57, wherein the character images selected in said selecting step have a specific character size.

66. A method according to claim 57, wherein said registering step registers in a filing device.

67. A method according to claim 57, wherein said input image is input by a scanner.

68. A method according to claim 57, further comprising reading the image in accordance with an assignment of the images of characters.

69. A method according to claim 68, wherein said document image is printed.

70. A method according to claim 68, wherein said document image is displayed.

71. An image processing apparatus comprising:
image input means for inputting an image;
character-size identification means for identifying a size of each character present in the image input by said image input means;
extracting means for extracting images of characters in accordance with sizes identified in said character-size identification means; and
keyword determination means for determining keywords to be registered together with the image using the character images extracted by said extracting means.

72. An apparatus according to claim 71, wherein said character-image selection means selects character images having sizes greater than a reference value determined according to the character sizes identified from the image information.

73. An apparatus according to claim 71, wherein the image information registered together with the keywords is used as a data base.

74. An apparatus according to claim 71, further comprising:
recognition means for performing character recognition on the character images selected by said character-image selection means,
wherein said keyword determination means determines the keywords using character codes obtained as a result of recognition by said recognition means.

75. An apparatus according to claim 71, wherein said keyword determination means determines the keywords in units of a character string.

76. An apparatus according to claim 71, wherein the character images selected by said character-image selection means are selected again in accordance with a predetermined limit for a number of keywords.

77. An apparatus according to claim 71, wherein said character-image selection means selects the character images in descending order based on sizes of characters identified by said character-size identification means.

78. An apparatus according to claim 71, further comprising file-name determination means for determining a file name to be registered together with the image information using the character images selected by said character-image selection means.

79. An apparatus according to claim 71, wherein said character-image selection means selects character images having a specific character size.

80. An apparatus according to claim 71, wherein said keyword determination means registers in a filing device.

81. An apparatus according to claim 71, wherein said input image is input by a scanner.

82. An apparatus according to claim 71, further comprising reading the image in accordance with an assignment of the images of characters.

83. An apparatus according to claim 82, wherein said document image is printed.

84. An apparatus according to claim 82, wherein said document image is displayed.

85. An electronic filing method for retrieving a plurality of read documents, said method comprising the steps of:
dividing image data of a read document into divided regions;
discriminating character regions from among the divided regions;
specifying, when a plurality of character regions are present in the divided regions, one character region from among the plurality of character regions in accordance with region characteristics of the character region;
extracting image data having a specific size from the one character region specified in said specifying step;
storing the image data extracted in said extracting step together with the image data of the read document so that the image data extracted in said extracting step corresponds to the image data of the read document; and outputting the image data stored in said storing step in accordance with a retrieval.

86. A method according to claim 85, further comprising the step of:

ordering the plurality of character regions, wherein the one character region specified in said specifying step is a first character region obtained as a result of said ordering step.

87. A method according to claim 85, further comprising the steps of:

extracting average character sizes in each of the plurality of character regions; and comparing the average character sizes to one another, wherein the character region specified in said specifying step comprises a character region having a largest average character size from among average character sizes compared in said comparing step.

88. A method according to claim 85, further comprising the step of:

extracting region information and a direction of a set of character regions, wherein the image data extracted in said step of extracting image data comprises image data of a region determined by the region information extracted in said step of extracting region information and the direction of the set of character regions.

89. A method according to claim 88, wherein the direction of the set of character regions is stored so as to correspond to the image data, and wherein when outputting the image data, the image data stored in said storing step is output in a direction corresponding to the direction of the set of character regions.

90. A method according to claim 85, wherein the image data is output on a display unit.

91. A method according to claim 85, wherein the image data is output using a printer.

92. A method according to claim 85, wherein said storing step stores in a filing device.

93. A method according to claim 85, wherein said read image is input by a scanner.

94. A method according to claim 85, further comprising reading out the image of the read document in accordance with an assignment of the image data.

95. A method according to claim 94, wherein said read out image of the read document is printed.

96. A method according to claim 94, wherein said read out image of the read document is displayed.

97. An electronic filing apparatus for retrieving a plurality of read documents, said apparatus comprising:

region division means for dividing image data of the read documents into regions;

character-region discrimination means for discriminating character regions from among the regions divided by said region division means;

character-region specification means for specifying, when a plurality of character regions discriminated by said character-region discrimination means are present, one character region from among the plurality of character regions in accordance with region characteristics of the character region;

image-data extraction means for extracting image data having a specific size from the character region specified by said character-region specification means;

storage means for storing the image data extracted by said image-data extracting means together with the image data of the read document so that the image data corresponds to the image data of the plurality of read documents; and output means for outputting the image data stored by said storing means in accordance with a retrieval.

98. An apparatus according to claim 97, further comprising:

ordering means for ordering the plurality of character regions, wherein said character-region specification means specifies a first character region obtained as a result of ordering by said ordering means.

99. An apparatus according to claim 97, further comprising:

character-size extraction means for extracting an average character size in each of the plurality of character regions; and comparison means for comparing the character sizes extracted by said character size extraction means to one another, wherein said character-region specification means specifies a character region having a largest average character size from among the character sizes compared by said comparison means.

100. An apparatus according to claim 97, further comprising:

extracting means for extracting region information and a direction of a set of the character region extracted by said character-region extraction means, wherein said image-data extraction means extracts image data of a region determined by the region information extracted by said extracting means and the direction of the set of the character region.

101. An apparatus according to claim 97, wherein the direction of the set of character regions is stored in said storage means so as to correspond to the image data, and wherein said output means outputs the image data stored in said storage means in a direction corresponding to the direction of the set of character regions.

102. An apparatus according to claim 97, wherein said output means outputs the image data on a display unit.

103. An apparatus according to claim 97, wherein said output means outputs the image data using a printer.

104. An apparatus according to claim 97, wherein said storage means stores in a filing device.

105. An apparatus according to claim 97, wherein said read image is input by a scanner.

106. An apparatus according to claim 97, further comprising reading out the image of the read document in accordance with an assignment of the image data.

107. An apparatus according to claim 106, wherein said read out image of the read document is printed.

108. An apparatus according to claim 106, wherein said read out image of the read document is displayed.

109. A computer-readable memory medium which stores computer-executable process steps, the computer-executable process steps to process an image, the computer-executable process steps comprising:

an input step to input a document image;

an extracting step to extract a specific character region from the document image in accordance with image characteristics of the document image;

a registering step to register information relating to the document image together with the document image such that the information relating to the document image corresponds to the document image, the information relating to the document image comprising information derived from data within the specific character region; and a reading step to read the document image in accordance with an assignment of the information relating to the document image.

110. A computer-readable memory medium which stores computer-executable process steps, the computer-executable process steps to process an image, the computer-executable process steps comprising:

a reading step to read a document image;

a detecting step to detect a specific character region in the document image in accordance with image characteristics of the document image;

a performing step to perform character recognition on an image of the specific character region detected in said detecting step; and a registering step to register the character string recognized in said character recognition step together with the document image read in said reading step such that the character string corresponds to the document image.

111. A computer-readable memory medium which stores computer-executable process steps, the computer-executable process steps to process an image, the computer-executable process steps comprising:

a recognizing step to recognize characters included in an input image;

an extracting step to extract words from the characters recognized in said recognizing step;

a determining step to determine a frequency of appearance of each of the words extracted in said extracting step; and a registering step to register a word having a high frequency of appearance together with the input image such that the registering word corresponds to the input image.

112. A computer-readable memory medium which stores computer-executable process steps, the computer-executable process steps to process an image, the computer-executable process steps comprising:

an inputting step to input image;

an identifying step to identify a size of each character present in the image;

an extracting step to extract images of characters in accordance with sizes identified in said identifying step; and a registering step to register the images of characters extracted in said extracting step together with the image information such that the images of characters correspond to the input image.

113. A computer-readable memory medium which stores computer-executable process steps, the computer-executable process steps for retrieving a plurality of read documents, the computer-executable process steps comprising:

a dividing step to divide image data of a read document into divided regions;

a discriminating step to discriminate character regions from among the divided regions;

a specifying step to specify, when a plurality of character regions are present in the divided regions, one character region from among the plurality of character regions in accordance with region characteristics of the character region;

an extracting step to extract image data having a specific size from the one character region specified in said specifying step;

a storing step to store the image data extracted in said extracting step together with the image data of the read document so that the image data extracted in said extracting step corresponds to the image data of the read document; and an outputting step to output the image data stored in said storing step in accordance with a retrieval.

* * * * *

UNITED STATES PATENT AND TRADEMARK OFFICE
CERTIFICATE OF CORRECTION

PATENT NO. : 5,821,929

DATED : October 13, 1998

INVENTORS : Takayuki Shimizu                    Page 1 of 2

It is certified that error appears in the above-identified patent and that said Letters Patent is hereby corrected as shown below:

IN THE DRAWINGS

Sheet 35, Figure 38, "INFORMATOIN" should read --INFORMATION--;

Sheet 38, Figure 41, "POSITOIN" should read --POSITION--; and

Sheet 43, Figure 49, RESION" (all three occurrences), should read --REGION--.

COLUMN 3

Line 20, "relatine" should read --relating--.

COLUMN 9

Line 4, "first" should read --the first--.

COLUMN 10

Line 66, "The" should read --This--.

UNITED STATES PATENT AND TRADEMARK OFFICE
CERTIFICATE OF CORRECTION

PATENT NO. : 5,821,929

DATED : October 13, 1998

INVENTORS : Takayuki Shimizu

It is certified that error appears in the above-identified patent and that said Letters Patent is hereby corrected as shown below:

COLUMN 27

Line 47, "characters""." should read --さしすせそ--; and
Line 50, "character "" should read --さ--.

Signed and Sealed this

Twentieth Day of July, 1999

Attest:

Q. TODD DICKINSON

*Attesting Officer*  *Acting Commissioner of Patents and Trademarks*